United States Patent [19]
Kawabe et al.

[11] Patent Number: 6,110,224
[45] Date of Patent: *Aug. 29, 2000

[54] PROGRAM ANALYZING APPARATUS WHICH CATEGORIZES VARIABLES INTO DOMAINS AND METHOD THEREOF

[75] Inventors: Keiko Kawabe; Kenji Nagahashi; Sanya Uehara; Minako Kimura; Akihiko Matsuo, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/794,368

[22] Filed: Feb. 4, 1997

[30] Foreign Application Priority Data

Feb. 8, 1996 [JP] Japan .................................. 8-022295
Apr. 22, 1996 [JP] Japan .................................. 8-099745

[51] Int. Cl.[7] ............................................ G06F 9/44
[52] U.S. Cl. ........................... 717/4; 717/2; 717/7; 717/8
[58] Field of Search ................................. 395/704, 708, 395/183.14, 703; 714/38; 707/101; 717/4

[56] References Cited

U.S. PATENT DOCUMENTS

| | | | |
|---|---|---|---|
| 4,931,928 | 6/1990 | Greenfeld ................................ | 395/708 |
| 5,339,433 | 8/1994 | Frid-Nielsen ........................... | 395/705 |
| 5,432,942 | 7/1995 | Trainer .................................... | 395/708 |
| 5,459,866 | 10/1995 | Akiba et al. ............................ | 395/708 |
| 5,485,621 | 1/1996 | Schwanke ............................... | 395/703 |
| 5,586,020 | 12/1996 | Isozaki .................................... | 395/707 |
| 5,740,446 | 4/1998 | Fujiwara ................................. | 395/709 |
| 5,742,827 | 4/1998 | Ohkubo et al. ......................... | 395/701 |
| 5,794,048 | 8/1998 | Brady ...................................... | 395/705 |
| 5,838,979 | 11/1998 | Hart et al. ............................... | 395/707 |
| 5,978,582 | 11/1999 | McDonald et al. ..................... | 395/702 |
| 5,987,253 | 11/1999 | Brady et al. ............................ | 395/704 |

OTHER PUBLICATIONS

Kawabe, K.; Matsuo, A.; Uehara, S.; Ogawa, A.; "Variable Classification Technique for Software Maintenance and Application to the Year 2000 Problem"; Proceedings of the Second Euromicro Conference on Software Maintenance and Reengineering; pp. 44–50, Mar. 1998.

Matsuo, A.; Uehara, S.; Kimura, M.; "A Maintenance Support System Based on High–Level Control Flow and Data Dependnecy"; Proceedings of the 1995 Asia Pacific Software Engineering Conference; pp. 390–398, Dec. 1995.

Chen, X.; Tsai, W.; Joiner, J.; Gandamenani, H.; Sun, J.; "Automatic Variable Classification for COBOL Program"; Proceedings of the Eighteenth Annual Computer Software and Applications Conference; pp. 432–437, Nov. 1994.

Joiner, J.; Tsai, W.; Chen, X.; Subramanian, S.; Sun, J.; Gandamaneni, H.; "Data–Centered Program Understanding"; Proceedings of the International Conference on Software Maintenance; pp. 272–281, Sep. 1994.

Sullo, G.; "Object Engineering: Designing Large–Scale Object–Oriented Systems"; John Wiley & Sons, Inc. pp. 60–61 and 144–145, Apr. 1994.

*Primary Examiner*—Eric W. Stamber
*Assistant Examiner*—Todd Ingberg
*Attorney, Agent, or Firm*—Staas & Halsey LLP

[57] ABSTRACT

A restricting condition extracting unit analyzes an error determination portion included in a program to be analyzed and extracts a restricting condition of a particular variable. A variable categorizing unit analyzes the relation among variables used in an executable statement in the program to be analyzed and categorizes the variables corresponding to the analyzed result. A domain definition extracting unit outputs domain relation information representing a domain to which a plurality of variables belong and the relation among variables that belong to the domain using the output of the restricting condition extracting unit and the variable categorizing unit. The domain definition information is graphically displayed so that the user can easily understand the content thereof.

21 Claims, 53 Drawing Sheets

```
DATA DIVISION.
 01    ORDERED DATE.
        02   ORDERED YEAR     PIC9(4).
        02   ORDERED MONTH    PIC9(2).
        02   ORDERED DAY      PIC9(2).
 01    DELIVERED DATE
        02   DELIVERED YEAR   PIC9(4).
        02   DELIVERED MONTH  PIC9(2).
        02   DELIVERED DAY    PIC9(2).
```

FIG. 1A                    PRIOR ART

| DATA NAME | TYPE | SIZE |
|---|---|---|
| ORDERED DATE. | | 8 |
| ORDERED YEAR | NUMERIC | 4 |
| ORDERED MONTH | NUMERIC | 2 |
| ORDERED DAY | NUMERIC | 2 |
| DELIVERED DATE | | 8 |
| DELIVERED YEAR | NUMERIC | 4 |
| DELIVERED MONTH | NUMERIC | 2 |
| DELIVERED DAY | NUMERIC | 2 |

FIG. 1B                    PRIOR ART

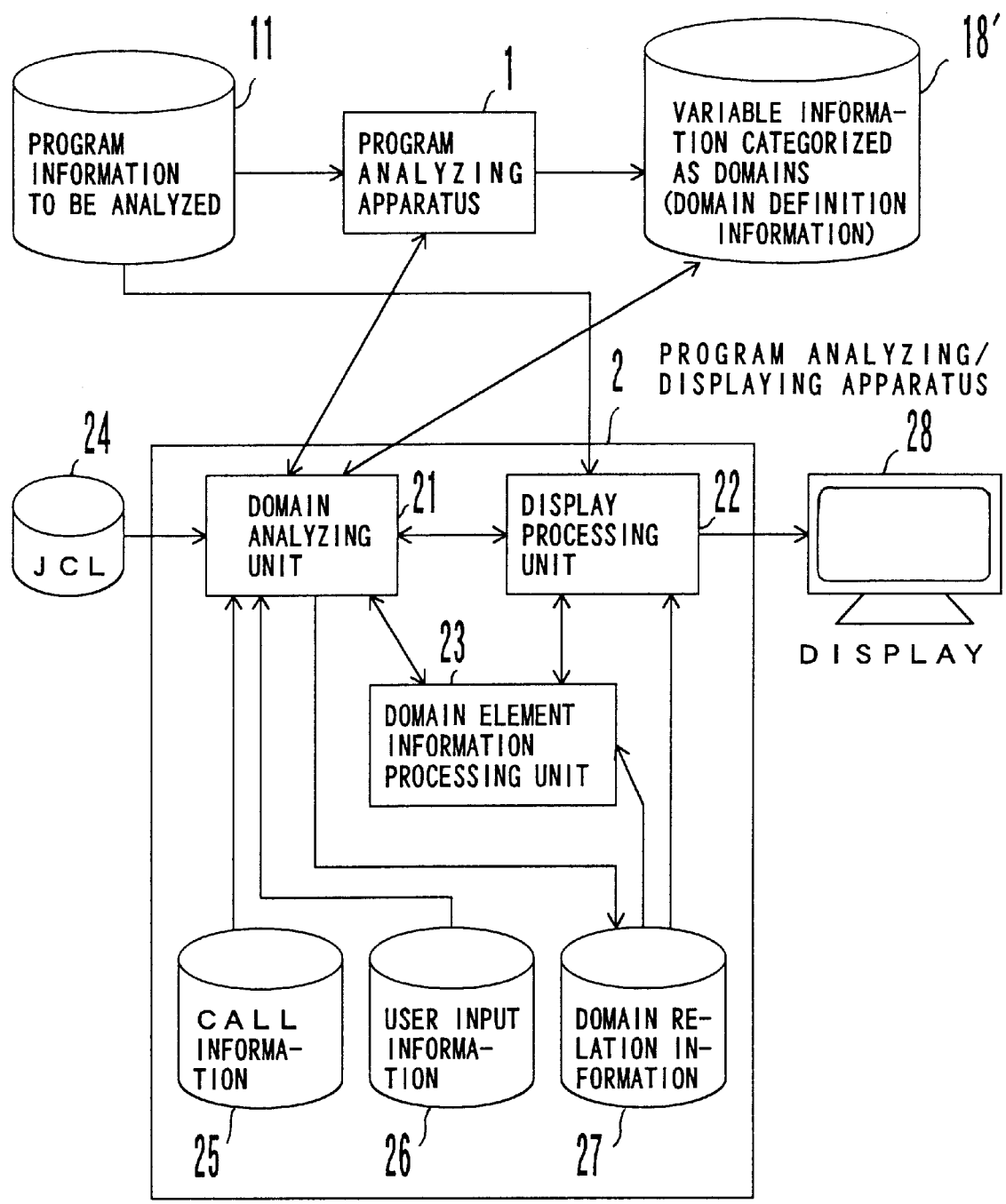
F I G. 3

FIG. 7A
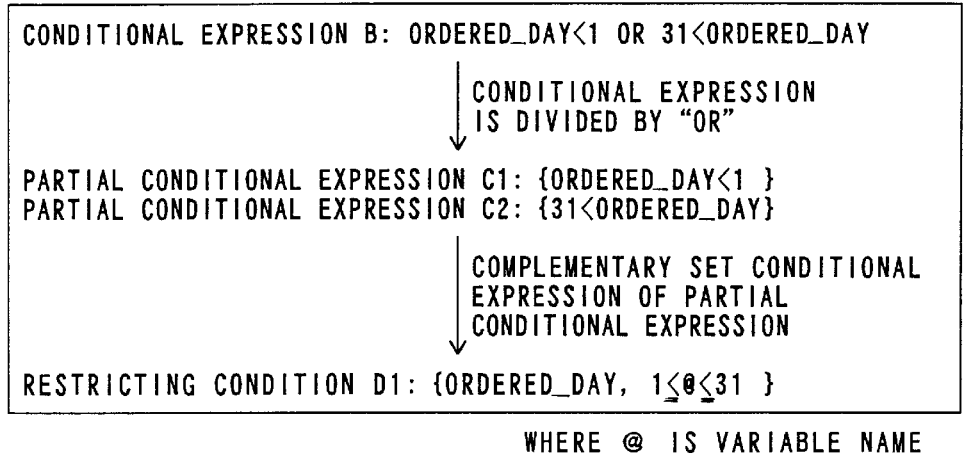
FIG. 7B
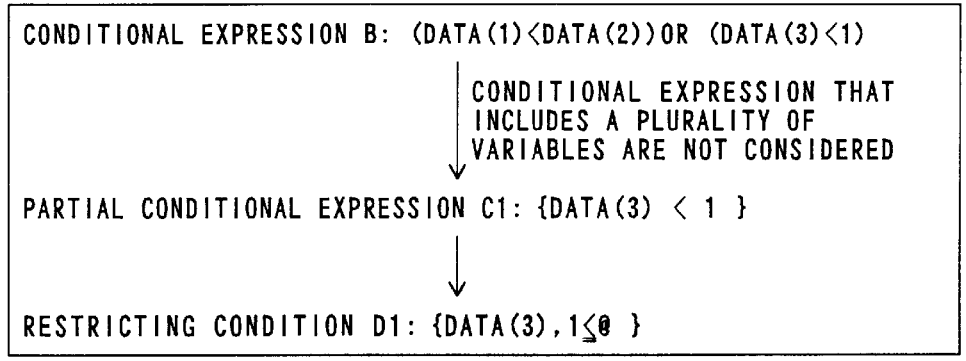
FIG. 7C
| DATA | RESTRICTING CONDITION | 4 |
|---|---|---|
| ORDERED DAY | $1 \leq @ \leq 31$ | |
| DATA (3) | $1 \leq @$ | |
| ⋮ | ⋮ | |

EXECUTABLE STATEMENT A: DateError( );

CONDITIONAL EXPRESSION B: acceptDate < 1 || 31 < acceptDate

```
                    ┌─────────┐
                    │  START  │
                    └────┬────┘
                         ▼
    ┌─────────────────────────────────────────────┐
    │ REPEAT STEP S41 FOR ALL UPDATE-TYPE    S41  │
    │ STATEMENTS OF EXECUTABLE STATEMENT          │
    │  ┌───────────────────────────────────────┐  │
    │  │ ASSUMING THAT ASSIGNED VARIABLE AND   │  │
    │  │ REFERRED VARIABLE BELONG TO SAME      │  │
    │  │ DOMAIN, THEY ARE CATEGORIZED AND      │  │
    │  │ STORED IN VARIABLE CATEGORY TABLE.    │  │
    │  │ WHEN IT CANNOT BE SECURELY DETERMINED │  │
    │  │ WHETHER OR NOT VARIABLES BELONG TO    │  │
    │  │ THE DOMAIN, THEY ARE TREATED AS       │  │
    │  │ DOMAIN ALTERNATIVES                   │  │
    │  └───────────────────────────────────────┘  │
    └──────────────────────┬──────────────────────┘
                           ▼
    ┌─────────────────────────────────────────────┐
    │ REPEAT STEP S42 FOR ALL COMPARISON     S42  │
    │ STATEMENTS IN EXECUTABLE STATEMENT          │
    │  ┌───────────────────────────────────────┐  │
    │  │ ASSUMING THAT VARIABLES ON LEFT SIDE  │  │
    │  │ OF RELATIONAL CHARACTER AND VARIABLES │  │
    │  │ ON RIGHT SIDE OF THEREOF BELONG TO    │  │
    │  │ THE SAME DOMAIN, THEY ARE CATEGORIZED │  │
    │  │ AND STORED IN VARIABLE CATEGORY       │  │
    │  │ TABLE. WHEN IT CANNOT BE SECURELY     │  │
    │  │ DETERMINED WHETHER OR NOT VARIABLES   │  │
    │  │ BELONG TO DOMAIN, THEY ARE TREATED    │  │
    │  │ AS DOMAIN ALTERNATIVES.               │  │
    │  └───────────────────────────────────────┘  │
    └──────────────────────┬──────────────────────┘
                           ▼
                    ┌─────────┐
                    │   END   │
                    └─────────┘
```

| | | EXAMPLE OF EXECUTABLE STATEMENT HAVING ONE OPERAND | OBTAINED DOMAIN |
|---|---|---|---|
| UPDATE-TYPE | 1 | MOVE A TO B | [A, B] |
| | 2 | ADD C TO D | [C, D] |
| | 3 | SUBSTRUCT E FROM F | [E, F] |
| | 4 | SORT G TO H | [G, H] |
| COMPARISON-TYPE | 5 | IF L < M+1 | [L, M] |
| | 6 | EVALUATE N O<br>WHEN P Q<br>WHEN R S | [N, P, R]<br>[O, Q, S] |

FIG. 15B

| | | EXAMPLE OF EXECUTABLE STATEMENT HAVING A PLURALITY OF OPERANDS | OBTAINED DOMAIN |
|---|---|---|---|
| UPDATE-TYPE | 7 | COMPUTE A = B + C | [A, {B, C}] |
| | 8 | COMPUTE A = B * C | NONE |
| | 9 | ADD C TO D GIVING E | [{C, D}, E] |
| | 10 | MULTIPLY I BY CONSTANT GIVING K | [I, K] |
| COMPARI-SON-TYPE | 11 | IF (D > (E+F)) | [D, {D, F}] |

[ ] : VARIABLE BELONGING TO THE SAME DOMAIN
{ } : DOMAIN ALTERNATIVE

FIG. 16A

| | | EXAMPLE OF EXECUTABLE STATEMENT HAVING ONE OPERAND | OBTAINED DOMAIN |
|---|---|---|---|
| UPDATE-TYPE | 1 | a = b ; | [a, b] |
| | 2 | c = c + d ; | [c, d] |
| | 3 | e = e − f ; | [e, f] |
| COMPARI-SON-TYPE | 4 | if (l < m + 1) | [l, m] |
| | 5 | switch (n) {<br>case p :<br>case q : | [n, p, q] |

FIG. 16B

| | | EXAMPLE OF EXECUTABLE STATEMENT HAVING A PLURALITY OF OPERANDS | OBTAINED DOMAIN |
|---|---|---|---|
| UPDATE-TYPE | 6 | a = b + c ; | [a, {b, c}] |
| | 7 | a = b * c ; | NONE |
| COMPARI-SON-TYPE | 8 | if (d > e + f) | [d, {e, f}] |

[ ] : VARIABLE BELONGING TO THE SAME DOMAIN
{ } : DOMAIN ALTERNATIVE

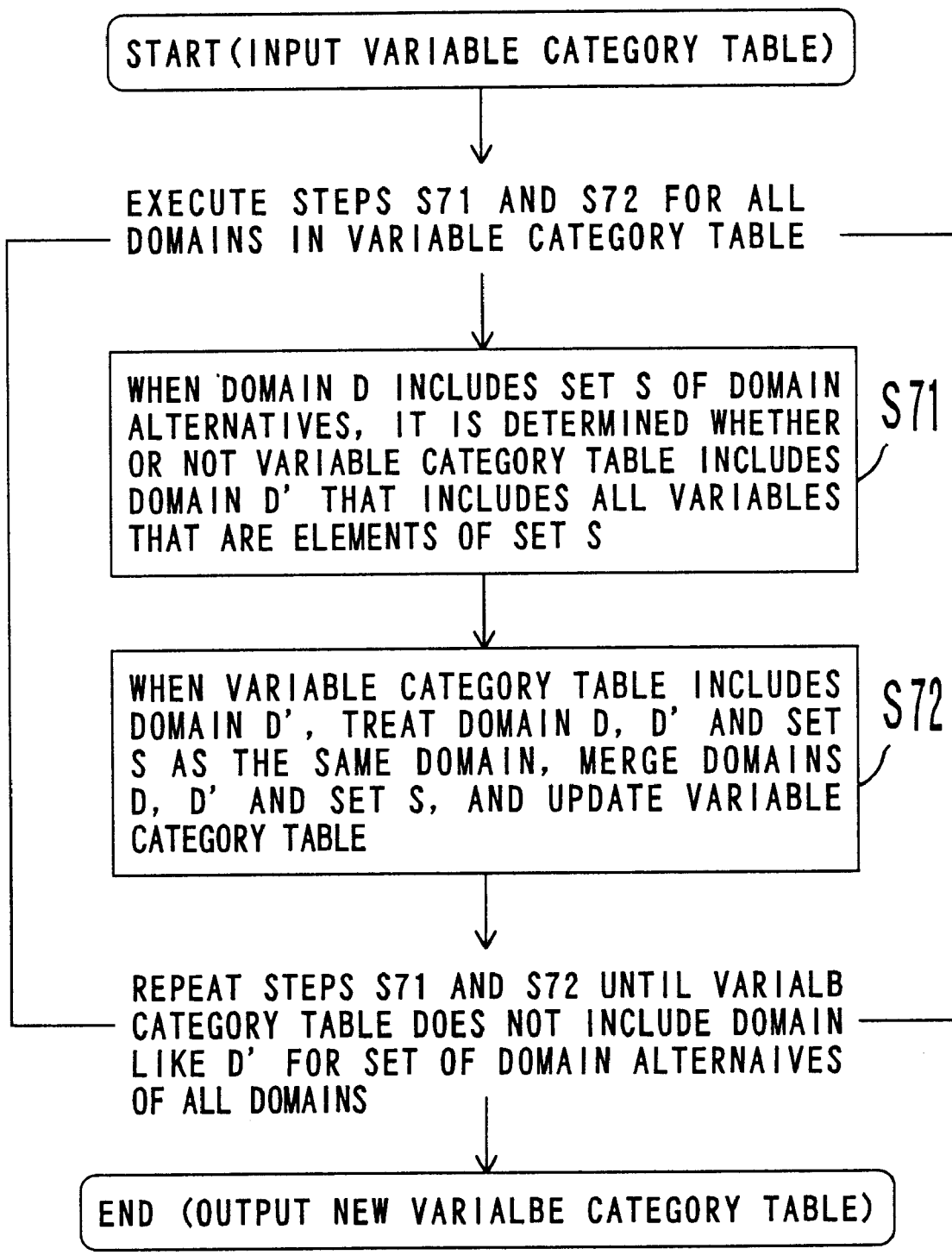
F I G. 1 7

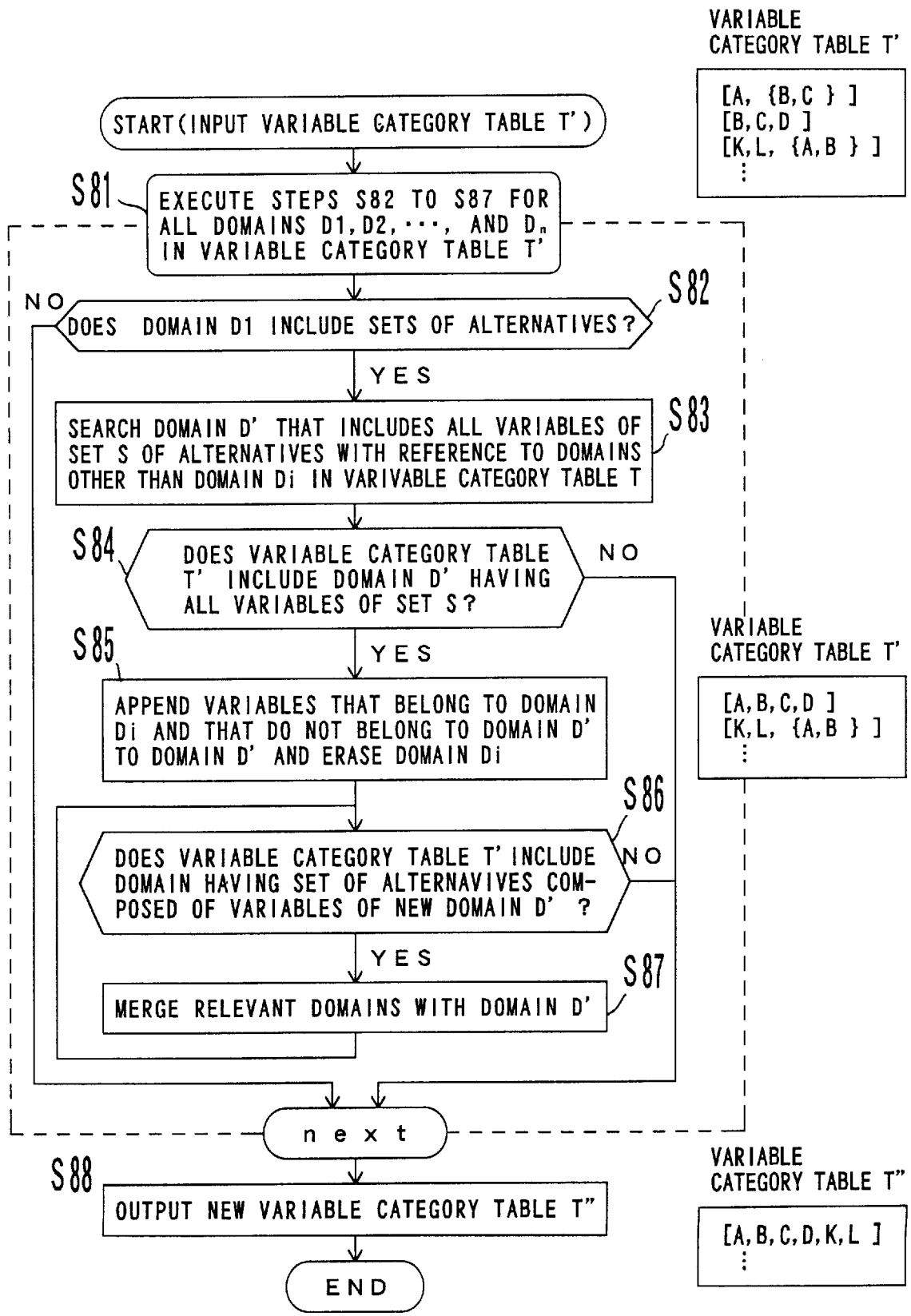
F I G. 1 8

```
IDENTIFICATION              DIVISION.
PROGRAM-ID                  SAMPLE01.
ENVIRONMENT                 DIVISION.
DATA                        DIVISION.
FILE                        SECTION.
FD      ORDERED ENTRY.
01      ORDERED ENTRY RECORD.
        02  SCREEN PF KEY      PIC X(04).
        02  ORDERED NUMBER E   PIC 9(08).
        02  ITEM NUMBER E      PIC 9(16).
        02  BRANCH CODE E      PIC X(06).
        02  CUSTOMER CODE E    PIC X(06).
        02  SCHEDULED DELIVERY DATE(YEAR/MONTH/DAY) E   PIC 9(08).
        02  ORDERED DATE (YEAR/MONTH/DAY) E    PIC 9(08).
        02  ORDERED QUANTITY E    PIC 9(02).
        02  MESSAGE E    PIC X(16).
*
FD      ORDERED MASTER.
01      ORDERED MASTER RECORD.
        02  ORDERED MASTER DATA.
            10  ORDERED NUMBER EM    PIC X(08).
            10  ITEM NUMBER EM       PIC 9(16).
            10  BRANCH CODE EM       PIC X(06).
            10  CUSTOMER CODE EM     PIC X(06).
            10  SCHEDULED DELIVERY DATE(YEAR/MONTH/DAY) EM  PIC 9(08).
            10  ORDERED DATE (YEAR/MONTH/DAY) EM     PIC 9(08).
            10  ORDERED QUANTITY EM         PIC 9(02).
            10  DELIVERED QUANTITY EM       PIC 9(02).
*
FD      INVENTORY MASTER.
01      INVENTORY MASTER RECORD.
        02  INVENTORY MASTER DATA.
            10  ITEM NUMBER SM        PIC 9(16).
            10  ITEM NAME SM          PIC N(10).
            10  ITEM CODE SM          PIC X(10).
            10  ITEM CATEGORY SM      PIC X(01).
            10  CURRENT INVENTORY QUANTITY SM       PIC 9(07)V9(02).
            10  UNASSIGNED INVENTORY QUANTITY SM    PIC 9(07)V9(02).
            10  ASSIGNED INVENTORY QUANTITY SM      PIC 9(07)V9(02).
*
```

F I G. 2 0

```
WORKING-STORAGE             SECTION.
01  CONTROL AREA.
    02  SECTION INFORMATION     PIC X(01)  VALUE '2'.
    02  SCREEN DESTINATION 1    PIC X(08)  VALUE SPACE.
    02  FORMAT NAME             PIC X(08)  VALUE 'MENU'.
01  DATE SAVE.
    02  DATE AREA
        10  YEAR/MONTH/DAY      PIC 9(08).
01  ORDERED NUMBERING.
    02  ORDERED NUMBERING AREA.
        10  ORDERED NUMBER GET  PIC 9(08).
*
PROCEDURE
    OPEN    I-O     ORDERED ENTRY.
    OPEN    OUTPUT  ORDERED MASTER.
    OPEN    I-O     INVENTORY MASTER.
    ACCEPT  YEAR/MONTH/DAY      FROM      DATE.
    READ    ORDERED ENTRY
    IF      SCREEN PF KEY   =   "F010"
            WRITE       ORDERED ENTRY RECORD
    ELSE
            PERFORM     ORDERED INPUT
    END-IF.
    CLOSE   ORDERED ENTRY.
    CLOSE   ORDERED MASTER.
    CLOSE   INVENTORY MASTER
    EXIT PROGRAM.
*
ORDERED INPUT                   SECTION.
    MOVE    ZERO     TO      ORDERED NUMBER GET.
    CALL    "SAIBAN" USING   ORDERED NUMBERING.
    IF      ORDERED NUMBER GET <= 0
            GO TO   ERROR PROCESS
    END-IF.
    MOVE    ORDERED NUMBER GET TO ORDERED NUMBER E.
    MOVE    YEAR/MONTH/DAY     TO  ORDERED DATE(YEAR/MONTH/DAY).
    IF      ITEM NUMBER <= 0 OR  ITEM NUMBER IS NOT NUMERIC
            GO TO   ERROR PROCESS
    END-IF.
    MOVE    ITEM NUMBER E     TO   ITEM NUMBER SM
    READ    INVENTORY MASTER.
    IF      (ORDERED QUANTITY E> UNASSIGNED INVENTORY QUANTITY SM) AND
            (COMMODITY CATEGORY="0")
            GO TO ERROR PROCESS
    END-IF.
```

FIG. 21

```
IF      (SCHEDULED DELIVERY DATE (YEAR/MONTH/DAY)
        E<ORDERED DATE(YEAR/MONTH/DAY) E+14) AND
        (COMMODITY CATEGORY SM ="1")
        GO TO  ERROR PROCESS
END-IF.
IF      ORDERED QUANTITY E <= UNASSIGNED INVENTORY QUANTITY SM
        COMPUTE    UNASSIGNED INVENTORY QUANTITY SM
                   =UNASSIGNED INVENTORY QUANTITY SM
                   −ORDERED QUANTITY E
        COMPUTE    ASSIGNED INVENTORY QUANTITY SM
                   =ASSIGNED INVENTORY QUANTITY SM
                   +ORDERED QUANTITY E
END-IF.
REWRITE INVENTORY MASTER RECORD.
MOVE    ORDERED NUMBER E   TO    ORDERED NUMBER EM.
MOVE    BRANCH CODE E      TO    BRANCH CODE EM.
MOVE    ITEM NUMBER E      TO    ITEM NUMBER EM.
MOVE    CUSTOMER CODE E    TO    CUSTOMER CODE EM.
MOVE    SCHEDULED DELIVERY DATE(YEAR/MONTH/DAY) E
                           TO    SCHEDULED DELIVERY DATE(YEAR/MONTH/DAY) EM.
MOVE    ORDERED DATE(YEAR/MONTH/DAY) E
                           TO    ORDERED DATE(YEAR/MONTH/DAY) EM.
MOVE    ZERO               TO    DELIVERY QUANTITY EM.
WRITE   ORDERED MASTER RECORD.
MOVE    "CORRECTLY ACCEPTED"  TO    MESSAGE E,
WRITE   ORDERED ENTRY RECORD.
GO      TO         ORDERED INPUT EXIT,
ERROR PROCESS.
  MOVE    "ERROR"      TO
  WRITE   ORDERED ENTRY RECORD.
 ORDERED INPUT EXIR.
    EXIT.
```

FIG. 22

| DOMAIN (VARIABLE NAME LIST) | RESTRICTING CONDITION |
|---|---|
| ORDERED_NUMBER E<br>ORDERED_NUMBER GET | > 0 |
| ITEM_NUMBER EM<br>ITEM_NUMBER E<br>ITEM_NUMBER SM | > 0, IS NUMERIC |
| BRANCH_CODE EM<br>BRANCH_CODE E | |
| CUSTOMER_CODE EM<br>CUSTOMER_CODE E | |
| SCHEDULED_DELIVERY_DATE EM<br>    (YEAR/MONTH/DAY)<br>SCHEDULED_DELIVERY_DATE E<br>    (YEAR/MONTH/DAY)<br>ORDERED_DATE EM<br>    (YEAR/MONTH/DAY)<br>ORDERED_DATE E<br>    (YEAR/MONTH/DAY)<br>DATE (YEAR/MONTH/DAY) | |
| ORDERED_QUANTITY EM<br>ORDERED_QUANTITY E<br>UNASSIGNED_INVENTORY_QUANTITY SM<br>ASSIGNED_INVENTORY_QUANTITY SM | |

FIG. 24

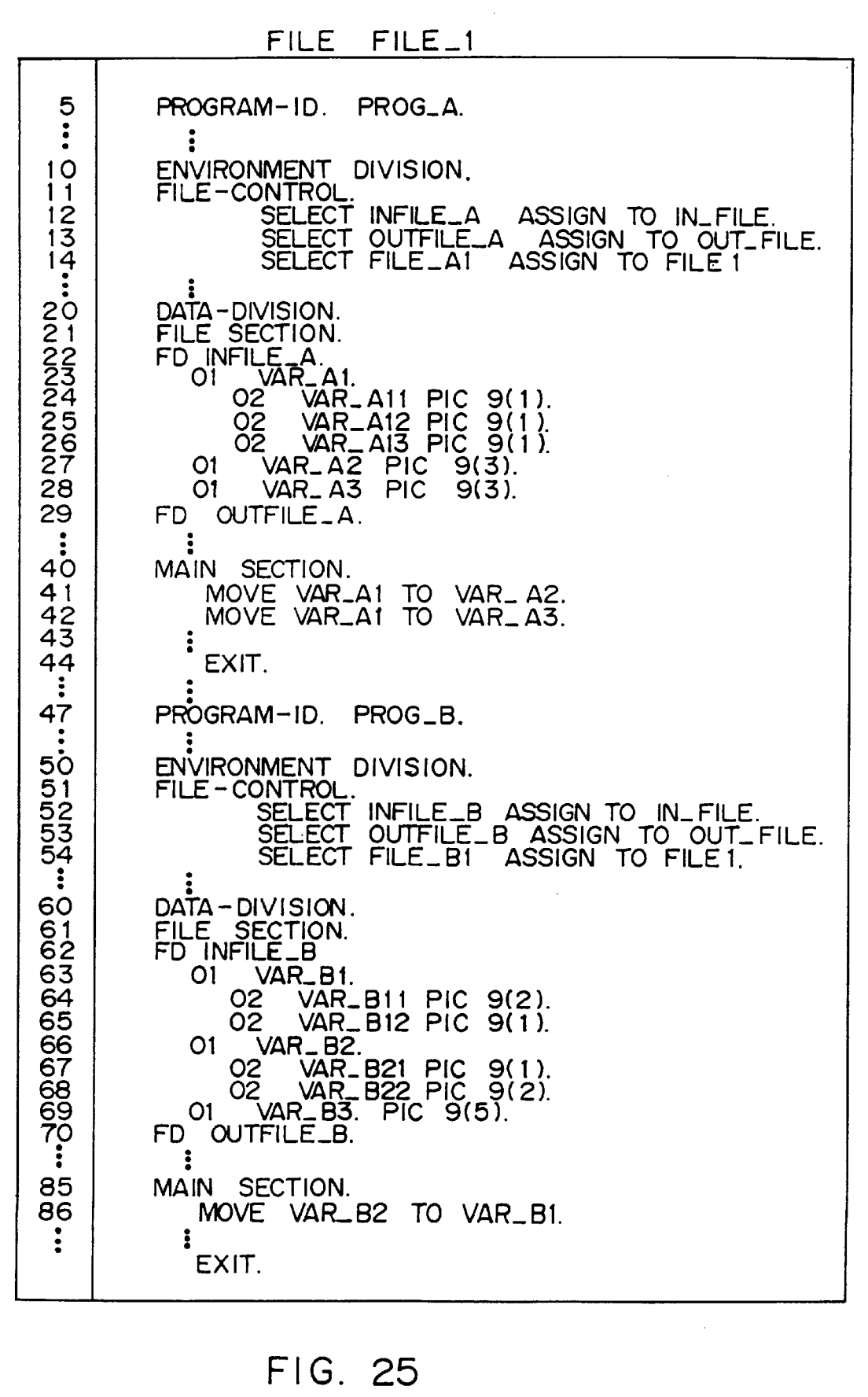

FILE  FILE_1

```
 5      PROGRAM-ID.  PROG_A.
        ⋮
10      ENVIRONMENT DIVISION.
11      FILE-CONTROL.
12           SELECT INFILE_A   ASSIGN TO IN_FILE.
13           SELECT OUTFILE_A  ASSIGN TO OUT_FILE.
14           SELECT FILE_A1    ASSIGN TO FILE1.
        ⋮
20      DATA-DIVISION.
21      FILE SECTION.
22      FD INFILE_A.
23         01   VAR_A1.
24            02   VAR_A11 PIC 9(1).
25            02   VAR_A12 PIC 9(1).
26            02   VAR_A13 PIC 9(1).
27         01   VAR_A2 PIC 9(3).
28         01   VAR_A3 PIC 9(3).
29      FD  OUTFILE_A.
        ⋮
40      MAIN SECTION.
41           MOVE VAR_A1 TO VAR_A2.
42           MOVE VAR_A1 TO VAR_A3.
43           ⋮
44           EXIT.
        ⋮
47      PROGRAM-ID.  PROG_B.
        ⋮
50      ENVIRONMENT DIVISION.
51      FILE-CONTROL.
52           SELECT INFILE_B  ASSIGN TO IN_FILE.
53           SELECT OUTFILE_B ASSIGN TO OUT_FILE.
54           SELECT FILE_B1   ASSIGN TO FILE1.
        ⋮
60      DATA-DIVISION.
61      FILE SECTION.
62      FD INFILE_B
63         01   VAR_B1.
64            02   VAR_B11 PIC 9(2).
65            02   VAR_B12 PIC 9(1).
66         01   VAR_B2.
67            02   VAR_B21 PIC 9(1).
68            02   VAR_B22 PIC 9(2).
69         01   VAR_B3. PIC 9(5).
70      FD  OUTFILE_B.
        ⋮
85      MAIN SECTION.
86           MOVE VAR_B2 TO VAR_B1.
        ⋮
             EXIT.
```

FIG. 25

LINE No.　　　　　　　　　FILE　FILE_2

```
10      PROGRAM-ID.  PROG_C
 ⋮          ⋮
15      ENVIRONMENT DIVISION.
16      FILE-CONTROL.
17              SELECT  INFILE_C     ASSIGN  TO  IN_FILE
18              SELECT  OUTFILE_C    ASSIGN  TO  OUT_FILE
19              SELECT  FILE_C1      ASSIGN  TO  FILE 1
 ⋮          ⋮
25      DATA-DIVISION.
26      FILE SECTION.
 ⋮          ⋮
30      MAIN SECTION.
 ⋮          ⋮
            EXIT.
```

FIG. 26

DOMAIN CATEGORY

| DOMAIN CATEGORY OF PROGRAM PROG_A |
| --- |
| DOMAIN DOMAIN_A1 = {[VAR_A1, VAR_A2], [VAR_A1, VAR_A3]}<br>                     = {[VAR_A1, VAR_A2, VAR_A3]}<br>⋮ |
| DOMAIN CATEGORY OF PROGRAM PROG_B |
| DOMAIN DOMAIN_B1 = {[VAR_B1, VAR_B2]}<br>⋮ |

FIG. 27

```
EXEC PRG = PROG_A
    ⋮
IN_FILE    FILE_2
OUT_FILE   ...
FILE 1     ...
    ⋮

EXEC PRG = PROG_B
    ⋮
IN_FILE    FILE_2
OUT_FILE   ...
FILE 1     ...
    ⋮
```

FIG. 28

| VAR_A1 | VAR_A11 |
|        | VAR_A12 |
|        | VAR_A13 |
| VAR_A2 |         |
| VAR_A3 |         |

FIG. 29A

| VAR_B1 | VAR_B11 |
|        | VAR_B12 |
| VAR_B2 | VAR_B21 |
|        | VAR_B22 |
| VAR_B3 |         |

FIG. 29B

| LINE No. | FILE  FILE_1 |
|---|---|
| 5 | PROGRAM-ID.  PROG_A |
| 10 | DATA DIVISION. |
| 15 | 01  VAR_X1. |
| 16 |   02 VAR_X11  PIC  9(2). |
| 17 |   02 VAR_X12  PIC  9(1). |
| 18 | 01  VAR_X2. |
| 19 | 01  VAR_X3. |
| 20 | 01  VAR_X4. |
| 25 | PROCEDURE DIVISION. |
| 30 |   CALL "SUB_PROGRAM" |
| 31 |       USING VAR_X1, VAR_X2, VAR_X3. |
| |   MOVE VAR_X3 TO VAR_X4. |
| |   EXIT. |
| 55 | PROGRAM-ID.  PROG_B |
| 58 | DATA-DIVISION. |
| 61 | 01  VAR_Y1. |
| 62 | 01  VAR_Y2. |
| 63 | 01  VAR_Y3. |
| 70 | PROCEDURE DIVISION. |
| 75 |   CALL "SUB_PROGRAM" |
| |       USING VAR_Y1, VAR_Y2, VAR_Y3. |
| |   COMPUTE VAR_Y3 = VAR_Y1 + VAR_Y2 * 10 |
| |   EXIT. |

FIG. 32

| LINE No. | FILE FILE_2 |
|---|---|
| 10 | PROGRAM-ID. SUB_PROG |
| ⋮ | ⋮ |
| 15 | DATA DIVISION |
| ⋮ | ⋮ |
| 20 | LINKAGE SECTION. |
| 21 | 01 VAR_A. |
| 22 | 01 VAR_B. |
| 23 | 01 VAR_C. |
| ⋮ | ⋮ |
| 30 | PROCEDURE DIVISION. |
| 31 | USING VAR_A, VAR_B, VAR_C. |
| ⋮ | ⋮ |
| 50 | SUBPROGRAM. |
| 51 | MOVE 10 TO VAR_A. |
| 52 | COMPUTE VAR_B = VAR_A + 10. |
| 53 | COMPUTE VAR_C = VAR_B * 20. |
| ⋮ | ⋮ |
|  | EXIT PROGRAM. |

FIG. 33

DOMAIN CATEGORY OF PROGRAM PROG_A

DOMAIN DOMAIN_A1 = { [ VAR_X3, VAR_X4 ] }
                  ⋮

DOMAIN CATEGORY OF PROGRAM PROG_B

DOMAIN DOMAIN_B1 = { [ VAR_Y3, VAR_Y, VAR_Y2] }
                  ⋮

DOMAIN CATEGORY OF PROGRAM SUB_PROG

DOMAIN DOMAIN_SUB1 = { [ VAR_B, VAR_A] [VAR_C, VAR_B ] }
              = { [ VAR_A, VAR_B, VAR_C] }
              ⋮

```
void Prog_A( ) { int x1, x2, x3, x4, x5;

x4=x1;
   x3=func(x1,x2);
   ...
}
int func(int a, int b) { int ans, c;
  c = a + 10;

ans = b * c;

return ans;
}
```

FIG. 37B

DOMAIN CATEGORY OF PROGRAM Prog_A

DOMAIN DOMAIN_A1= [x1,x4 ]
      :
      :

DOMAIN PROGRAM OF PROGRAM func

DOMAIN DOMAIN FUNC1 = [a,c]
      :
      :

FIG. 37C

| [x 1, a] |
| [x 2, b] |
| [x 3, res ] |

FIG. 37D

OBTAIN DOMAIN_A1 = DOMAIN_FUNC 1 WITH

CALL PARAMETER RELATION [x 1, a]

FILE FILE_1

LINE No.

| | |
|---|---|
| 5 | PROGRAM-ID.     PROGRAM1 |
| ⋮ | ⋮ |
| 10 | DATA DIVISION. |
| ⋮ | ⋮ |
| 16 | 01   DATE. |
| 17 | 01   MARKS. |
| 18 |    01   SUBJECT_DOMESTIC LANGUAGE   PIC 9(1). |
| 19 |    02   SUBJECT_MATHEMATICS         PIC 9(1). |
| 20 |    03   SUBJECT_FOREIGN LANGUAGE    PIC 9(1). |
| 21 | 01   TOTAL MARKS. |
| 22 | 01   AVERAGE. |
| ⋮ | ⋮ |
| 27 | MAIN SECTION. |
| 28 |    MOVE   SUBJECT_DOMESTIC LANGUAGE TO SUBJECT(1) |
| 29 |    MOVE   SUBJECT_MATHEMATICS TO SUBJECT(2). |
| 30 |    MOVE   SUBJECT_FOREIGN LANGUAGE TO SUBJECT(3). |
| 31 |    COMPUTE   TOTAL_MARKS<br>      = SUBJECT(1) + SUBJECT(2) + SUBJECT(3) |
| 32 |    COMPUTE   AVERAGE = TOTAL_MARKS / 3 |
| ⋮ | |

FIG. 39

FILE FILE_2

| LINE No. | |
|---|---|
| 5 | PROGRAM-ID.     PROGRAM2 |
| ⋮ | ⋮ |
| 10 | DATA DIVISION. |
| ⋮ | ⋮ |
| 18 | 01  DATE. |
| 19 | 01  MARKS. |
| 20 |     01  SUBJECT_DOMESTIC LANGUAGE    PIC 9(1). |
| 21 |     02  SUBJECT_MATHEMATICS          PIC 9(1). |
| 22 |     03  SUBJECT_NATURAL SCIENCE      PIC 9(1). |
| 23 |     03  SUBJECT_SOCIAL SCIENCE       PIC 9(1). |
| 24 |     03  SUBJECT_FOREIGN LANGUAGE     PIC 9(1). |
| 25 | 01  TOTAL MARKS. |
| 26 | 01  AVERAGE. |
| ⋮ | ⋮ |
| 30 | MAIN SECTION. |
| 31 |     MOVE   SUBJECT_DOMESTIC LANGUAGE    TO   SUBJECT(1). |
| 32 |     MOVE   SUBJECT_MATHEMATICS          TO   SUBJECT(2). |
| 33 |     MOVE   SUBJECT_NATURAL SCIENCE      TO   SUBJECT(3). |
| 34 |     MOVE   SUBJECT_SOCIAL SCIENCE       TO   SUBJECT(4). |
| 35 |     MOVE   SUBJECT_FOREIGN LANGUAGE     TO   SUBJECT(5). |
| 36 |     COMPUTE   TOTAL_MARKS<br>         = SUBJECT(1) + SUBJECT(2) + SUBJECT(3)<br>         + SUBJECT(4) + SUBJECT(5) |
| 37 |     COMPUTE   AVERAGE = TOTAL_MARKS / 5 |
| ⋮ | |

FIG. 40

```
DOMAIN CATEGORY OF PROGRAM PROGRAM1

DOMAIN DOMAIN1_1 = { [ DATE ] }
  DOMAIN DOMAIN1_2 = { [SUBJECT DOMESTIC LANGUAGE,
                        SUBJECT MATHEMATICS,
                        SUBJECT FOREIGN LANGUAGE] }
  DOMAIN DOMAIN1_3 = { [MARKS, TOTAL MARKS, AVERAGE ] }
               :
```

```
DOMAIN CATEGORY OF PROGRAM PROGRAM2

DOMAIN DOMAIN2_1 = { [ DATE ] }
  DOMAIN DOMAIN2_2 = { [SUBJECT DOMESTIC LANGUAGE,
                        SUBJECT MATHEMATICS,
                        SUBJECT NATURAL SCIENCE,
                        SUBJECT SOCIAL SCIENCE,
                        SUBJECT FOREIGN LANGUAGE] }
  DOMAIN DOMAIN2_3 = { [MARKS, TOTAL MARKS, AVERAGE ] }
               :
```

FIG. 41

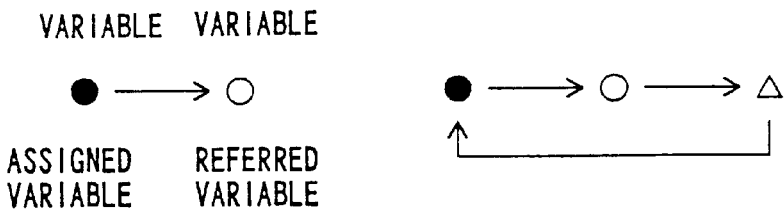
FIG. 43A
FIG. 43B
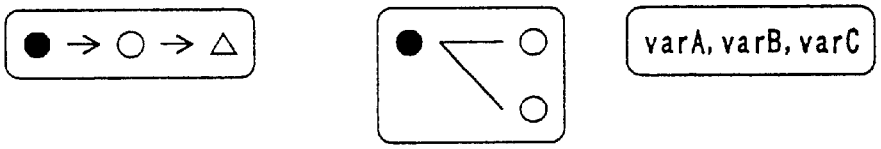
FIG. 43C
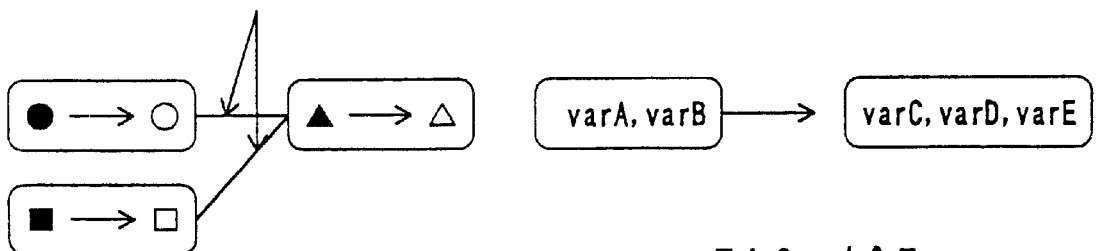
FIG. 43D
FIG. 43E
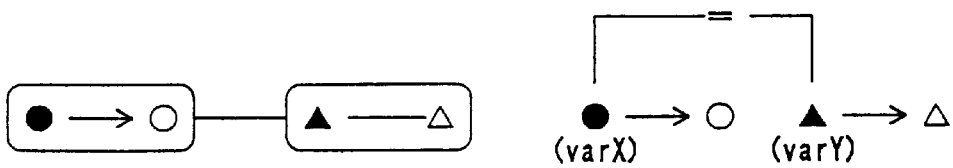
FIG. 43F

| (a) PROGRAM NAME | (b) VARIABLE NAME | (c) LINE NO. OF SOURCE PROGRAM | (d) UPDATE-TYPE EXPRESSION (ASSIGNED VARIABLE) | (e) DOMAIN ID |
|---|---|---|---|---|
| PROG_A | VAR_A1 | 41<br>42 | MOVE @ TO VAR_A2<br>MOVE @ TO VAR_A3 | DA1 |
| PROG_A | VAR_A2 | 41 | MOVE VAR_A1 TO @ | DA1 |
| PROG_A | VAR_A3 | 42 | MOVE VAR_A1 TO @ | DA1 |
| ... | ... | ... | ... | ... |
| PROG_B | VAR_B1 | 86 | MOVE VAR_B2 TO @ | DB1 |
| PROG_B | VAR_B2 | 86 | MOVE @ TO VAR_B1 | DB1 |
| ... | ... | ... | ... | ... |

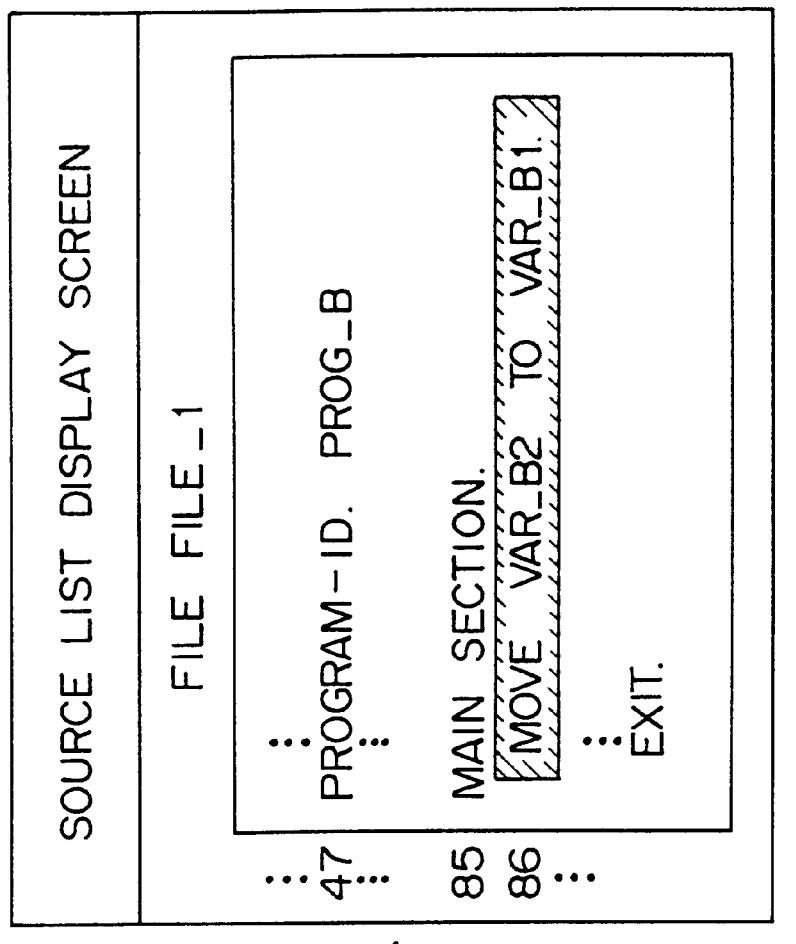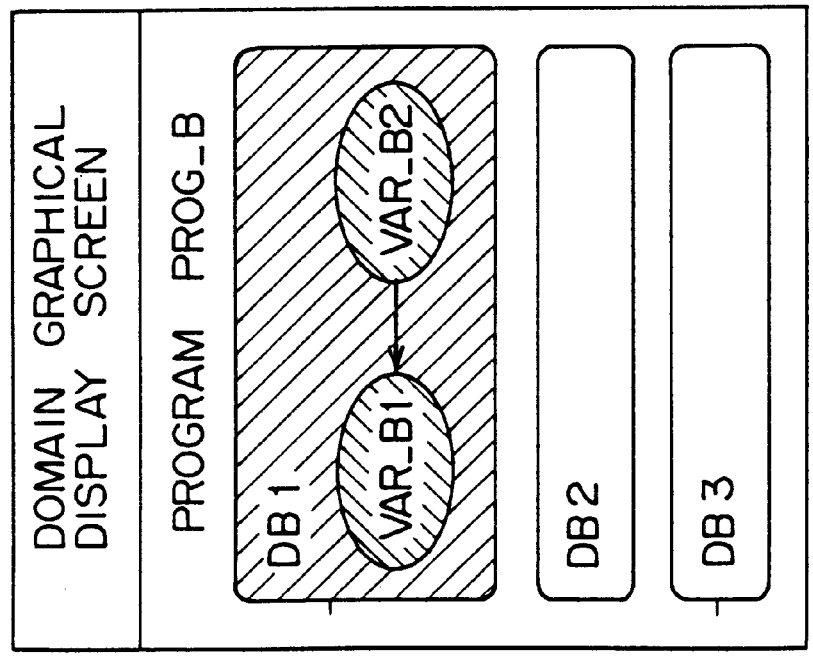
FIG. 51

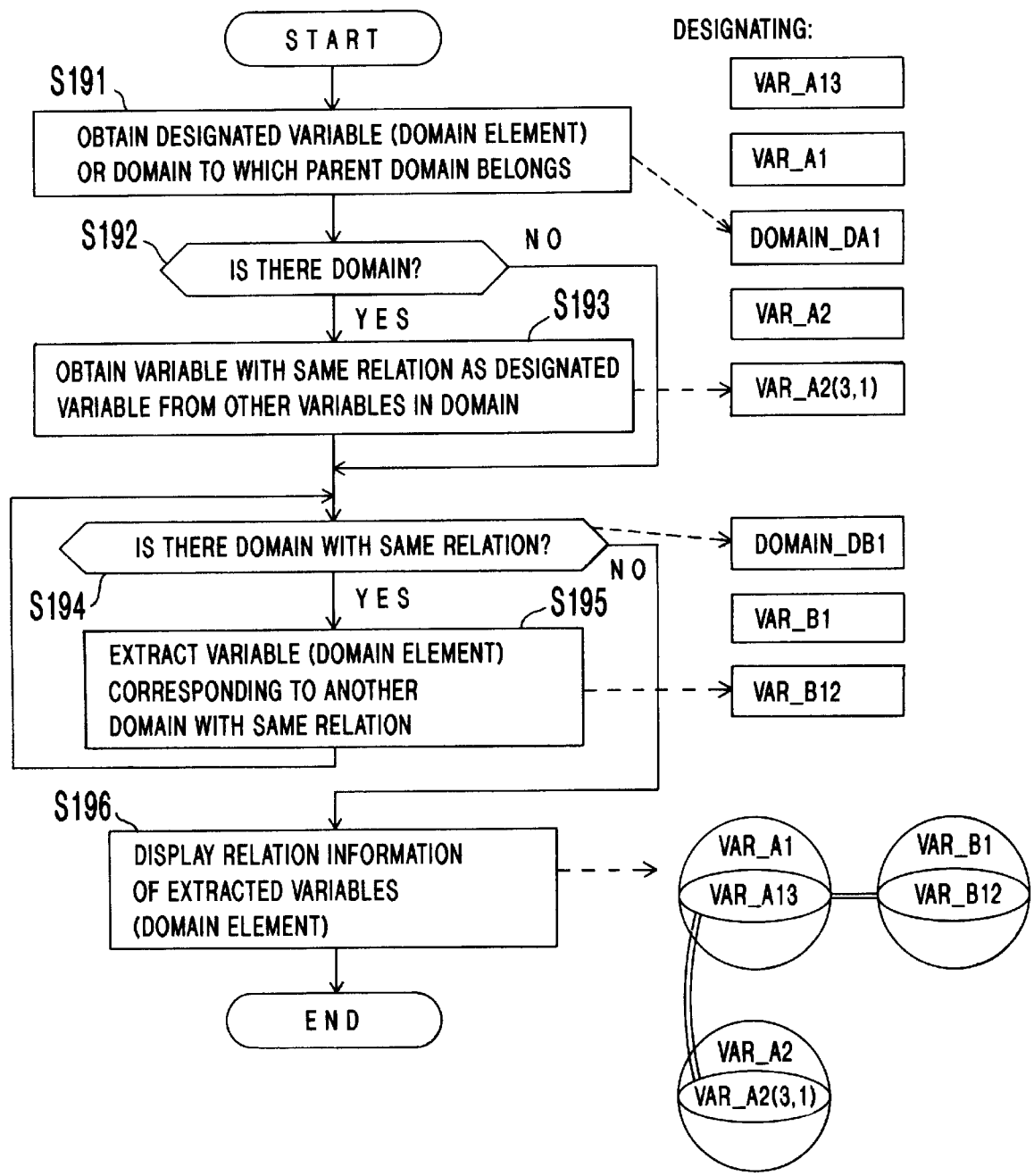
F I G. 5 3

PROGRAM ANALYZING APPARATUS WHICH CATEGORIZES VARIABLES INTO DOMAINS AND METHOD THEREOF

BACKGROUND OF THE INVENTION

1. Field of the Invention

The present invention relates to an apparatus for analyzing a program and displaying the analyzed result and a method thereof. In particular, the present invention relates to an apparatus for analyzing a program, categorizing variables used in the program corresponding to a predetermined condition, and displaying the categorized variables and a method thereof.

2. Description of the Related Art

To allow the user to understand the process of a program, it is important to analyze variables used therein. In particular, it is important to analyze information of declared variables and the values of the variables.

Conventionally, only static information such as the name, data type, and size of each declared variable is analyzed. Thus, in a large-scale program including many variables or in a system that operates in association with a plurality of programs, the analyzed result cannot be effectively used for maintaining and improving a program.

FIGS. 1A and 1B are schematic diagrams for explaining a related art reference. In the conventional program analysis, a data type and a data size are extracted from declaratives of data and the extracted data type and data size are analyzed. For example, information of data type and data size shown in FIG. 1B is obtained as the analyzed result of the data type from declaratives of each data field (variable) of a COBOL program shown in FIG. 1A.

With the analyzed result shown in FIG. 1B, it is clear that the data types and the data sizes (two digits) of "ORDERED MONTH", "ORDERED DATE", "DELIVERED MONTH", and "DELIVERED DATE" are the same. However, with the analyzed result, it is not possible to know the restricting condition (value range) of each data field.

For example, "ORDERED DAY" and "DELIVERED DAY" have a common restricting condition "1 or more or 31 or less" as a value range. In other words, these data fields belong to a domain "day: value range is 1 or more or 31 or less". Further, the data type and the data size of "ORDERED DAY" and "ORDERED MONTH" are the same. However, the restricting conditions of "ORDERED DAY" and "ORDERED MONTH" differ from each other. In other words, while the restricting condition of "ORDERED DAY" is "an integer of 1 or more or 31 or less", the restricting condition of "ORDERED MONTH" is "an integer of 1 or more or 12 or less". In other words, "ORDERED DAY" and "ORDERED MONTH" belong to different domains.

A domain means "a defined range" or "an area of certain knowledge or interest" in a broad sense or "an object characterized by a featured concept" in a narrower sense. For example, "ORDERED DATE" and "DELIVERED DATE" belong to the concept of "YEAR/MONTH/DAY". In this case, "YEAR/MONTH/DAY" becomes one domain. In addition, "YEAR/MONTH/DAY" can be divided into "YEAR", "MONTH", and "DAY". However, each of "YEAR", "MONTH", and "DAY" is also one domain.

A domain definition is how a domain is defined with a restricting condition (value range). For example, "DAY" is defined as "an integer of 1 or more or 31 or less". "MONTH" is defined as "an integer of 1 or more or 12 or less".

When such domain information (the restricting conditions of each variable) can be automatically extracted from a conventional program, it is considered that the program can be effectively understood, debugged, maintained, and modified. However, so far, variables have not been categorized from a view point of domains. In addition, restricting conditions for individual variables and restricting conditions featuring domains have not been extracted.

SUMMARY OF THE INVENTION

An object of the present invention is to provide an apparatus for automatically extracting restricting conditions of variables in a program and categorizing the variables from a view point of domains, and a method thereof.

Another object of the present invention is to provide an apparatus for obtaining information effective for understanding and modifying a program corresponding to the extracted results of restricting conditions of variables in a program and the categorized result of the variables, and a method thereof.

A further object of the present invention is to provide an apparatus for analyzing the relation among domains in a plurality of programs, representing the analyzed result in a manner that the user can easily understand it, and a method thereof.

A program analyzing apparatus of the present invention analyzes a program and outputs analyzed information about variables used in the program, and the apparatus includes:

error determination condition extracting unit for recognizing an error process portion of the program and extracting a condition of which the error process is executed;

conditional expression/restricting condition converting unit for analyzing an output of said error determination condition extracting unit and obtaining restricting conditions of the variables;

variable categorizing unit for analyzing the relation of a plurality of variables in an executable statement of the program corresponding to the type of the executable statement or the type of an operand thereof and for categorizing the variables from a view point of whether or not the variables belong to the same domain corresponding to the analyzed result; and domain definition extracting unit for outputting a restricting condition of the domain and variables that belong to the domain as domain definition information corresponding to outputs of said variable categorizing unit and said conditional expression/restricting condition converting unit.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1A is a schematic diagram showing an example of a data declarative for explaining a related art reference;

FIG. 1B is a schematic diagram showing an example of an analyzed result of a data type for explaining the related art reference;

FIG. 3 is a block diagram showing an example of the structure of a program analyzing/displaying apparatus according to the present invention;

FIG. 7A is a schematic diagram showing an example in which a conditional expression is converted into a restricting condition;

FIG. 7B is a schematic diagram showing another example in which a conditional expression is converted into a restricting condition;

FIG. 7C is a schematic diagram showing an example of a restricting condition table;

FIG. 12 is a flowchart for explaining an outlined operation of "process 1" executed at step S23 of FIG. 11;

FIGS. 15A and 15B are tables showing the relation of expressions written in COBOL and domains obtained therefrom;

FIGS. 16A and 16B are tables showing the relation of expressions written in C language and domains obtained therefrom;

FIG. 17 is an outline flowchart showing "process 2" of FIG. 11;

FIG. 18 is an outline flowchart showing "process 2" of FIG. 11;

FIG. 20 is a list (No. 1) showing an example of a program to be analyzed;

FIG. 21 is a list (No. 2) showing an example of a program to be analyzed;

FIG. 22 is a list (No. 3) showing an example of a program to be analyzed;

FIG. 24 is a table showing an example of an extracted result of domain definitions;

FIG. 25 is a list (No. 1) showing an example of a COBOL program to be analyzed;

FIG. 26 is a list (No. 2) showing an example of a COBOL program to be analyzed;

FIG. 27 is a schematic diagram showing an example in which variables of each program are categorized as domains;

FIG. 28 is a list showing an example of a job control language (JCL);

FIG. 29 is a schematic diagram showing examples of relative addresses of file records of a COBOL program;

FIG. 32 is a list showing an example of a COBOL program to be analyzed;

FIG. 33 is a list showing an example of a COBOL program to be analyzed;

FIG. 35 is a schematic diagram showing an example in which variables of each program are categorized as domains;

FIG. 37A is a list showing an example of a C language program to be analyzed;

FIG. 37B is a schematic diagram showing an analyzed result of variables of each program;

FIG. 37C is a schematic diagram showing an example of CALL information written in C language;

FIG. 37D is a schematic diagram showing an example of an analyzed result.

FIG. 39 is a list showing an example of a COBOL program to be analyzed;

FIG. 40 is a list showing an example of a COBOL program to be analyzed;

FIG. 41 is a schematic diagram showing an example of an analyzed result of each program;

FIGS. 43A, 43B, 43C, 43D, 43E, and 43F are schematic diagrams showing the relation among variables and the relation among domains;

FIG. 44 is a table (relation table) showing the relation of variables and domains;

FIG. 45 is a schematic diagram showing an example of domain relation information;

FIG. 51 is a schematic diagram showing an example of a graphical highlight display;

FIG. 53 is a flowchart showing a process for outputting the relation among domain elements.

DESCRIPTION OF THE PREFERRED EMBODIMENT

In an embodiment of the present invention, as a method for categorizing variables used in a program, "domains" are used. In an example shown in FIGS. 1A and 1B, a domain means "a defined range" or "an area of certain knowledge or interest" in a broad sense or "an object characterized by a featured concept" in a narrower sense. For example, "ORDERED_DATE" and "DELIVERED_DATE" belong to the concept of "YEAR/MONTH/DAY". In this case, "YEAR/MONTH/DAY" becomes one domain. In addition, "YEAR/MONTH/DAY" can be divided into "YEAR", "MONTH", and "DAY". However, each of "YEAR", "MONTH", and "DAY" is also one domain.

A program analyzed by the apparatus or method according to the embodiment of the present invention is not limited to a particular language. However, in the following description, as an example, the apparatus and method of the present invention is described with COBOL.

Figure 2:
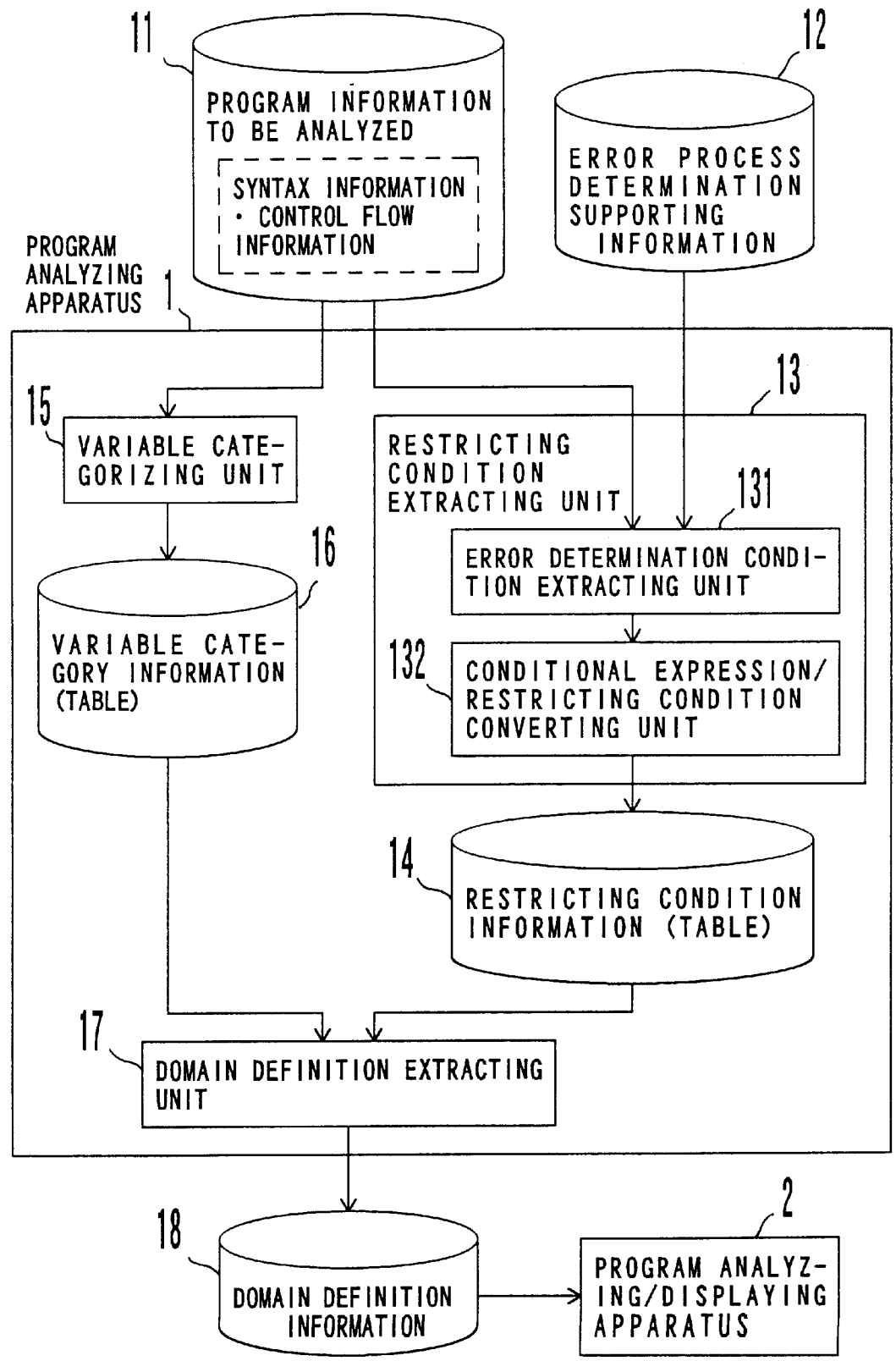
FIG. 2 is a block diagram showing an example of the structure of a program analyzing apparatus according to the present invention.

FIG. 2 is a block diagram showing the structure of a program analyzing apparatus according to the embodiment of the present invention. The program analyzing apparatus analyzes a given program and extracts variables used in the program. The program analyzing apparatus categorizes the extracted variables corresponding to restricting conditions and outputs variable groups that represent the same objects or similar objects. In other words, the program analyzing apparatus outputs information of domains to which variables belong and restricting conditions of the domains.

A program analyzing apparatus 1 uses program information to be analyzed 11 and error process determination supporting information 12 as information for analyzing the given program.

The program information to be analyzed 11 is composed of, for example, syntax information and control flow information. The syntax information is obtained by analyzing the syntax of the program. The control flow information represents the linkage of statements corresponding to the execution sequence of the program. The syntax information and the control flow information indicate at least statements of the program that have variables and conditions of these variables. Since these information can be obtained from the given program using a conventional technology, the description of the extracting method thereof is omitted.

The error process determination supporting information 12 is information about error process procedure names and line numbers of error processes. The error process determination supporting information 12 is created by a program creator or a program analyst corresponding to program design information and the source program.

The program analyzing apparatus 1 comprises a restricting condition extracting unit 13, a restricting condition table 14, a variable categorizing unit 15, a variable category table 16, and a domain definition extracting unit 17.

The restricting condition extracting unit 13 has an error determination condition extracting unit 131 and a conditional expression/restricting condition converting unit 132. The error determination condition extracting unit 131 recognizes an error processing portion of the given program corresponding to the program information to be analyzed 11 and the error process determination supporting information 12 and extracts a condition for executing the error process. The conditional expression/restricting condition converting unit 132 analyzes an output of the error determination condition extracting unit 131, converts a conditional expression into a restricting condition, and obtains a restricting condition for a particular variable. The restricting condition extracting unit 13 outputs extracted restricting condition information. The restricting condition information is stored in the restricting condition table 14. If necessary, the restricting condition information may be output to, for example, an external storage unit, a printer, and/or a display.

When a plurality of variables are used in a particular executable statement in the given program, the variable categorizing unit 15 analyzes the relation among the variables with the program information to be analyzed 11 corresponding to the type of the executable statement or the type of an operand thereof. The variable categorizing unit 15 categorizes variables corresponding to domains to which the variables belong and outputs variable category information as a categorized result. The variable category information is stored in the variable category table 16. If necessary, the variable category information can be output to, for example, the external storage unit, the printer, and/or the display.

The domain definition extracting unit 17 extracts definition information of variables that belong to each domain (definition information of objects represented by each domain) using the restricting condition information (the restricting condition table 14) obtained from the restricting condition extracting unit 13 and the variable category information (the variable category table 16) obtained from the variable categorizing unit 15, and outputs the definition information as the domain definition information 18.

The program analyzing apparatus 1 extracts a condition for executing an error process from the given program, analyzes the condition, and obtains a restricting condition of a predetermined variable. When an executable statement of the given program includes a plurality of variables, the program analyzing apparatus 1 analyzes the relation among the variables and categorizes the variables corresponding to domains to which the variables belong. With the restricting condition and the categorized result, the program analyzing apparatus 1 outputs definition information of the domains as the analyzed result of the program. Since the domain definition information is information in which the variables used in the given program are categorized corresponding to the restricting conditions, the user can easily understand the variable groups that represent the same objects or similar objects.

FIG. 3 is a block diagram showing the structure of a program analyzing/displaying apparatus according to the present invention. The program analyzing/displaying apparatus analyzes a plurality of given programs. Alternatively, the program analyzing/displaying apparatus receives the domain definition information for each program supplied from the program analyzing apparatus 1 shown in FIG. 2 and analyzes the relation among variables and the relation among domains used in the programs. The program analyzing/displaying apparatus displays the analyzed result in such a manner that the user can easily understand it.

The program analyzing/displaying apparatus 2 comprises a domain analyzing unit 21, a display processing unit 22, and a domain element information processing unit 23.

The domain analyzing unit 21 receives variable information 18' and job control language information 24, analyzes the relation among a plurality of domains obtained from a plurality of programs, and outputs the analyzed result as domain relation information 27. The variable information 18' is information about variables obtained by analyzing each program. As the variable information 18', the domain definition information 18 shown in FIG. 2 may be used. The job control language information 24 is information that represents the execution procedure for a program created by the user or for a utility program that has been provided beforehand. The job control language information 24 is written in the job control language.

When analyzing a plurality of programs, the domain analyzing unit 21 may use information that represents the calling relation of "CALL statements" in each program so as to examine the relation among domains obtained from a particular program and domains obtained from other programs. This information is referred to as CALL information 25.

In the case that a program is called with a CALL statement, with, for example, a "USING" statement in a COBOL program, the value of a variable of a called program can be passed to a variable in a calling program. At this point, when a plurality of variables are designated with a CALL statement, values are passed between variables in a "USING" statement of the calling program and variables in a "USING" statement of the called program in the order designated in the "USING" statement. In other words, variables that correspond to each other are the same. Thus, it is clear that domains to which the variables of the calling program belong are the same as domains to which the variables of the called program belong.

Thus, when the domain analyzing unit 21 obtains the call relation information (CALL information 25) among programs, it can analyze the relation among the domains of the programs.

The domain analyzing unit 21 uses user input information 26 so as to analyze the relation among the domains of the programs. Each program includes not only variables temporarily used, but variables defined for particular processes corresponding to predetermined naming rules. When the domain analyzing unit 21 receives conditions as the user input information 26 corresponding to the rules, it extracts variables corresponding to the conditions. When there are a plurality of domains to which the extracted variables belong, the domain analyzing unit 21 analyzes the relation among these domains.

The display processing unit 22 displays the domain relation information 27, which has been analyzed by the domain analyzing unit 21, and information that represents the update relation (assignment relation) of variables that belong to each domain on a display 28. The display processing unit 22 graphically displays the relation among domains of programs and the update relation of variables that belong to each domain so that the user can easily understand them.

The program analyzing/displaying apparatus 2 stores the following information (1) to (5) for each variable of each program so that they correlate each other.

(1) Variable name
(2) Program name of program using the variable
(3) Position of the variable in the program (line number)
(4) Update-type (assignment-type) expression including the variable (referred variable)
(5) Domain ID of the domain to which the variable belongs (domain ID)

Among these information, the program name, variable name, position of the variable in the program, and update-type expression can be obtained by a conventional technology when the syntax of the program is analyzed. The domain ID is an identifier assigned to each domain when the program analyzing apparatus 1 categorizes individual variables as domains.

The display processing unit 22 displays a graph representing information from a view point of domains or a graph representing information from a view point of the update relation of variables corresponding to the information (1) to (5) of the individual variables.

With the position of the variable in the program (line number) and information of the update-type expression (referred variable), when the user designates a particular element of the graph, the display processing unit 22 lists up the line number of the variable that the element represents in the source program and displays the line of the source program on the editor screen (source list displaying screen). In addition, when the user designates a particular line of the source program on the display, the display processing unit 22 graphically highlights an element that represents a variable included in the line. In other words, the color, brightness, luminance, or the like of the variable is changed on the screen so that the user can easily distinguish it from other elements.

When the user designates a variable as an element of a domain or a variable group as a part of elements of a domain, the domain element information processing unit 23 extracts a variable or a variable group corresponding to the designated variable or variable group in the domain that has the same relation as the domain to which the designated variable or variable group belongs corresponding to the analyzed domain relation information 27, and displays the designated variable or variable group and the extracted variable or variable group. At this point, the domain element information processing unit 23 highlights the relevant variable or variable group on the graphical display of the domain relation information 27 in association with the display processing unit 22.

Generally, in an application in which a plurality of programs operate in association, when domains of individual programs are analyzed, the user may not thoroughly understand all of the programs, or the analyzing efficiency may be low. When domains that are substantially the same are present in a plurality of programs, it is preferable to know this state so that the user can understand all of the programs.

The program analyzing/displaying apparatus 2 solves such a problem. In other words, the program analyzing/displaying apparatus 2 analyzes the relation among domains of a plurality of programs and displays the analyzed result. Thus, the program analyzing/displaying apparatus 2 can effectively analyze variables of a large-scale program. In addition, since the relation among domains and the update relation among variables are graphically displayed, the user can easily understand information about variables. Thus, the program analyzing/displaying apparatus 2 allows the user to understand complicated programs.

Figure 4:
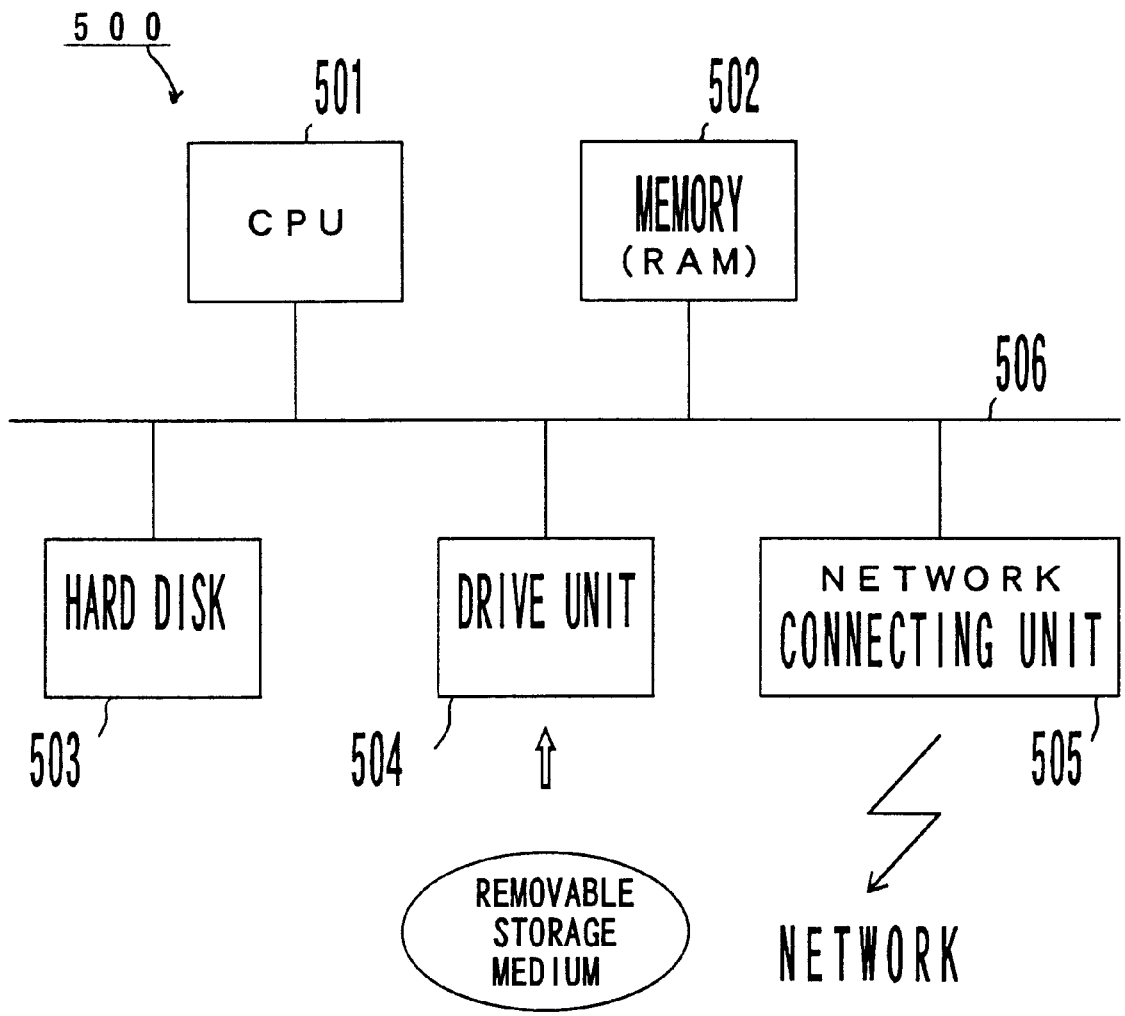
FIG. 4 is a schematic diagram showing the structure of an information processing apparatus that accomplishes the program analyzing apparatus shown in FIG. 2 or the program analyzing/displaying apparatus shown in FIG. 3.

The program analyzing apparatus 1 shown in FIG. 2 and the program analyzing/displaying apparatus 2 shown in FIG. 3 are accomplished by an information processing apparatus in the form of a personal computer or a workstation. FIG. 4 is a block diagram showing the structure of the information processing apparatus that accomplishes the program analyzing apparatus 1 shown in FIG. 2 or the program analyzing/displaying apparatus 2 shown in FIG. 3.

An information processing apparatus 500 shown in FIG. 4 comprises a CPU 501, a memory 502, a hard disk 503, a drive unit 504, and a network connecting unit 505 that are connected with a bus 506. The information processing unit 500 loads programs corresponding to the restricting condition determining unit 13, the variable categorizing unit 15, the domain definition extracting unit 17, the domain analyzing unit 21, the display processing unit 22, and the domain element information processing unit 23, to the memory 502. The CPU 501 executes these programs. The programs corresponding to these units are provided in one of the following manners.

(1) The programs are stored on the hard disk 503.
(2) The programs are supplied from a removable storage medium through the drive unit 504.
(3) The programs are downloaded from a network server through the network connecting unit 505.

The removable storage medium is, for example, a magnetic disk (such as a floppy disk), an optical disc (such as CD-ROM), or an optical-magnetic disc.

Next, the embodiment of the present invention will be described in detail.

Figure 5:
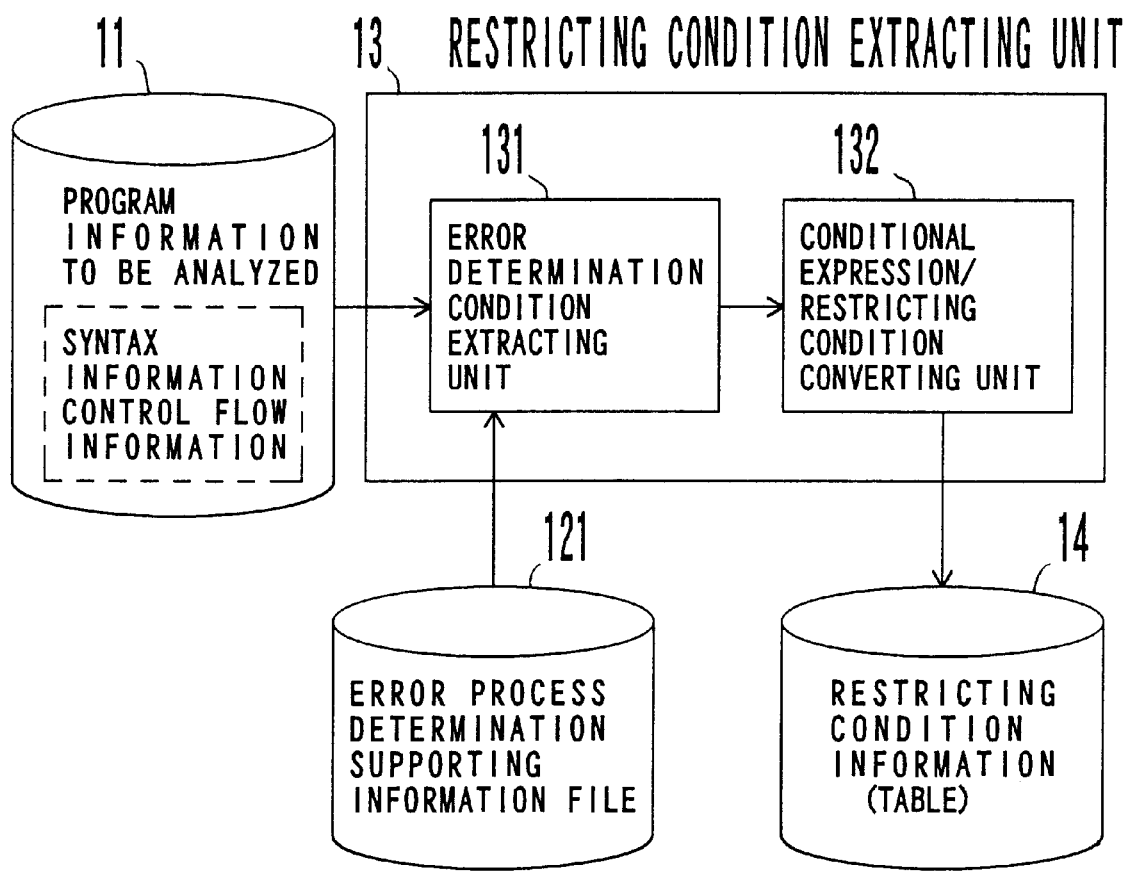
FIG. 5 is a block diagram showing an example of the structure of a restricting condition extracting unit.

FIG. 5 is a block diagram showing an example of the structure of the restricting condition extracting unit 13 shown in FIG. 2. Using the fact that an error determination conditional expression in a program tends to represent a restricting condition of a variable, the restricting condition extracting unit 13 extracts a restricting condition of a variable from an error determination conditional expression. In other words, in a business-use application program, it is determined whether or not input data is in a correct range. When data out of the correct range has been input, an error process is executed so that an error message is output or the user is prompted to enter correct data. For example, for a field "DAY", when the user inputs data other than "an integer of 1 or more or 31 or less", the error process is executed. The restricting condition extracting unit 13 analyzes the error determination conditional expression and automatically extracts a restricting condition of a variable so as to branch the control to the error process.

The error determination condition extracting unit 131 reads an error process determination supporting information file 121 that includes such as an error process procedure name and a line number of the error process, traverses control flow information of the program information to be analyzed 11 (namely, searches all executable statements in succession), and extracts an executable statement that performs the error process. Thereafter, the error determination condition extracting unit 131 reversely traverses the control flow information and extracts a conditional expression just preceding the extracted executable statement that performs the error process. The searching process can be accomplished by a conventional technology.

The error process determination supporting information file 121 corresponds to the error process determination supporting information 12 shown in FIG. 2. For example, the error process determination supporting information file 121 is created by a program creator, a program analyst, or the like with an editor or the like beforehand. Alternatively, when the user analyzes a program, he or she may input error process determination supporting information using an interactive process or the like.

The conditional expression/restricting condition converting unit 132 divides a conditional expression extracted by the error determination condition extracting unit 131 with a character in parentheses ( ) and logical character OR into partial conditional expressions. When there is a partial conditional expression that includes only one variable, the conditional expression/restricting condition converting unit 132 converts the partial conditional expression into a restricting condition form such as "data name: value range" and stores the resultant restricting condition in the restricting condition table 14. The restricting condition of a variable represents the value range of the variable.

As the above-described structure, the restricting condition determining unit 13 detects restricting conditions of variables used in a program to be analyzed. The detected restricting conditions are output as information for categorizing the variables.

Figures 6A, 6B, 6C:
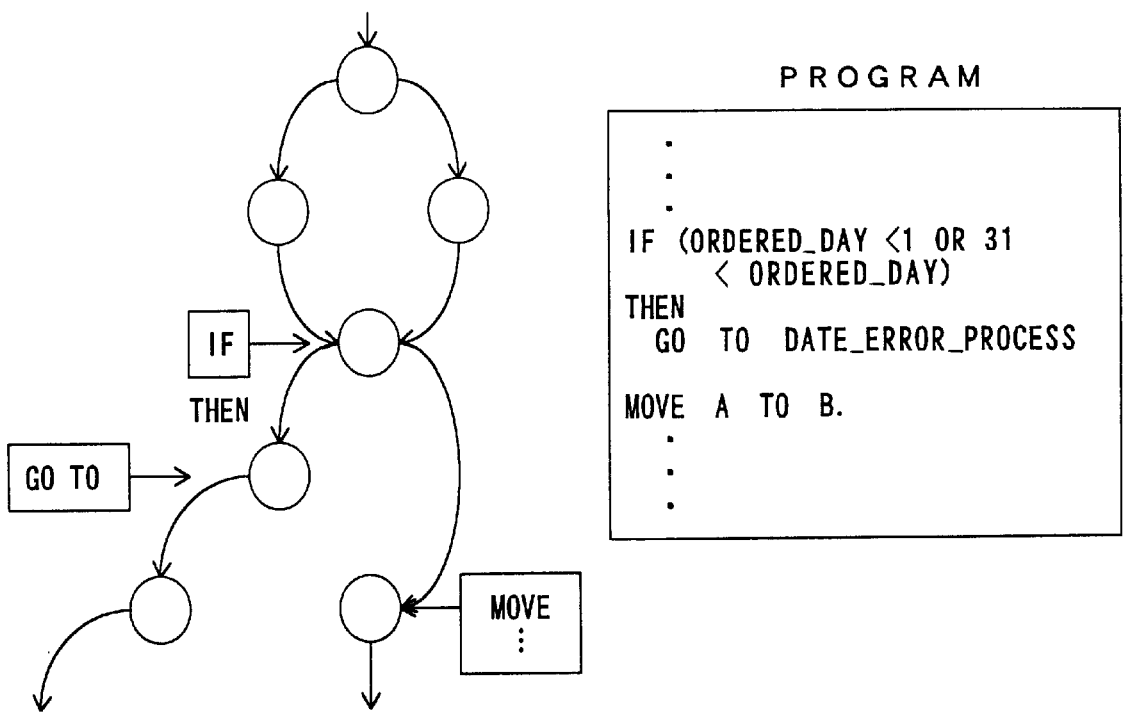
FIG. 6A is a schematic diagram showing an example of an error process determination supporting information file of an error determination condition extracting process.
FIG. 6B is an example of a control flowchart of the error determination condition extracting process.
FIG. 6C is a schematic diagram showing examples of an extracted executable statement and conditional expression of the error determination condition extracting process.

FIGS. 6A, 6B, and 6C are schematic diagrams showing an example of a process for extracting an error determination condition. FIG. 6A shows an example of the error process determination supporting information file 121. The error process determination supporting information file 121 includes an error process procedure name and a line number of the error process. The line 1 of the file 121 is "LABEL: DATE ERROR PROCESS" that causes a portion corresponding to "date error process" to be extracted from a program to be analyzed. When the position (line number) of the portion corresponding to the error process in the program to be analyzed is known, the line number is included in the file.

FIG. 6B shows an example of a control flow stored as the program information to be analyzed 11. When the error determination condition extracting unit 131 reads the line 1 of the error process determination supporting information file 121 shown in FIG. 6A, it extracts the portion corresponding to "date error process" from the program. Thus, as an error process executable statement, "GO TO DATE_ERROR_PROCESS" is extracted. Thereafter, the error determination condition extracting unit 131 reversely traverses the program from the extracted error process executable statement and extracts an IF statement just preceding the executable statement. A condition of an error process tends to be included in an IF statement. Thus, "ORDERED_DAY<1 OR 31<ORDERED_DAY" is obtained. The error determination condition extracting unit 131 passes the obtained conditional expression to the conditional expression/restricting condition converting unit 132. FIG. 6C shows an error process executable statement (executable statement A) extracted by the error determination condition extracting unit 131 and the IF statement (conditional statement B) just preceding the executable statement A.

In the above example, as the searched result of the portion "date error process", a "GO TO statement" is obtained. Alternatively, for example a "PERFORM statement" may be obtained.

FIGS. 7A, 7B, and 7C are schematic diagrams showing an example of a conditional expression/restricting condition converting process. FIG. 7A shows an example of a process of the conditional expression/restricting condition converting unit 132 that converts an error determination conditional expression into a restricting condition. With reference to a character in parentheses ( ) and a logical character OR, the conditional expression/restricting condition converting unit 132 creates partial conditional expressions C1 (ORDERED_DAY<1) and C2 (31<ORDERED_DAY) corresponding to the conditional expression B obtained from the error determination condition extracting unit 131. In addition, the conditional expression/restricting condition converting unit 132 obtains complementary set conditional expressions of the partial conditional expressions C1 and C2 and thereby obtains a restricting condition D1 {ORDERED_DAY, $1 \leq @ \leq 31$} (where @ represents a variable).

FIG. 7B shows an example of a converting process for converting an error determination conditional expression into a restricting condition in the case the conditional expression B includes a plurality of variables. In FIG. 7B, data (1) to data (3) are variables. When the conditional expression B is "(data (1)<data (2)) OR (data (3)<1), a partial conditional expression that includes a plurality of variables as with (data (1)<data (2)) is not treated as an object to be converted. Thus, the conditional expression/ restricting condition converting unit 132 treats only the partial conditional expression C1 (data (3)<1) as an object to be converted. In other words, the conditional expression/ restricting condition converting unit 132 creates the partial conditional expression C1 {data (3)<1} with the conditional expression B and converts the partial conditional expression C1 into the restricting condition D1 {data (3), 1≦@}. Such restricting conditions are stored in the restricting condition table 14 as shown in FIG. 7C.

Figures 8A, 8B, 8C:
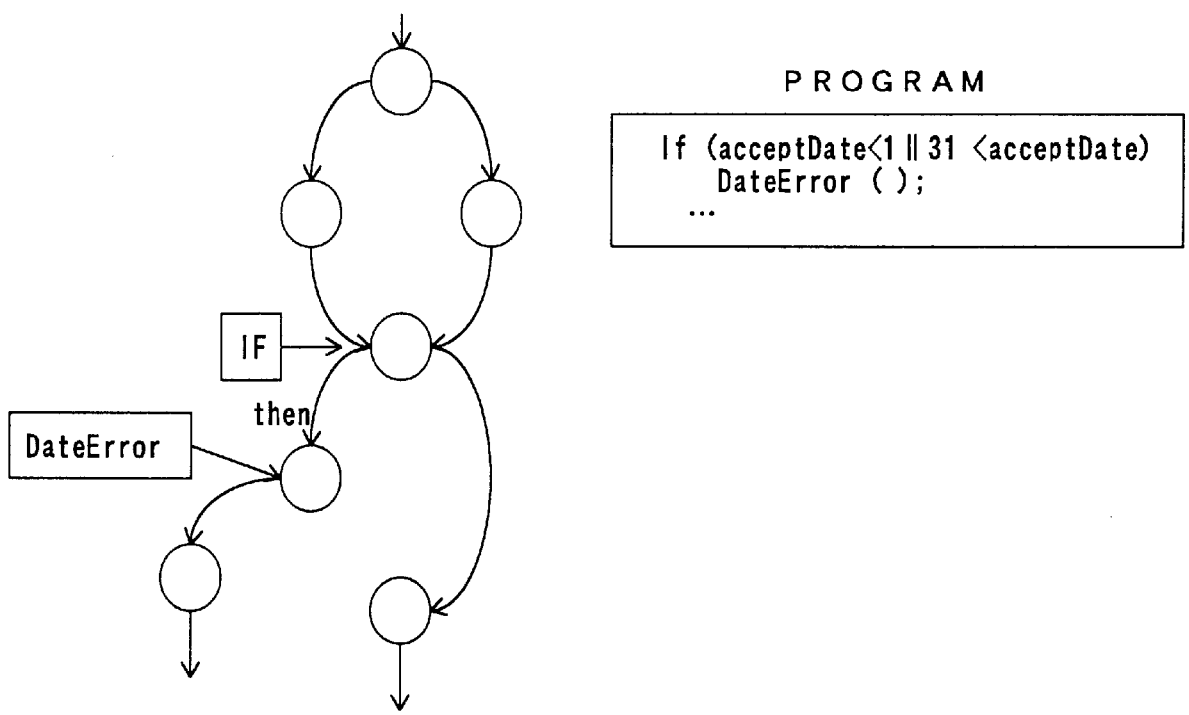
FIGS. 8A, 8B, and 8C are schematic diagrams showing the error determination condition extracting process written in C language corresponding to FIGS. 6A, 6B, and 6C, respectively.

Although FIGS. 6A to 6C and 7A to 7C show examples of programs written in COBOL, FIGS. 8A to 8C show an example of a program written in C language. The process for converting the conditional expression B into a restricting condition in a program written in C language is the same as that for a program written in COBOL.

Figure 9:
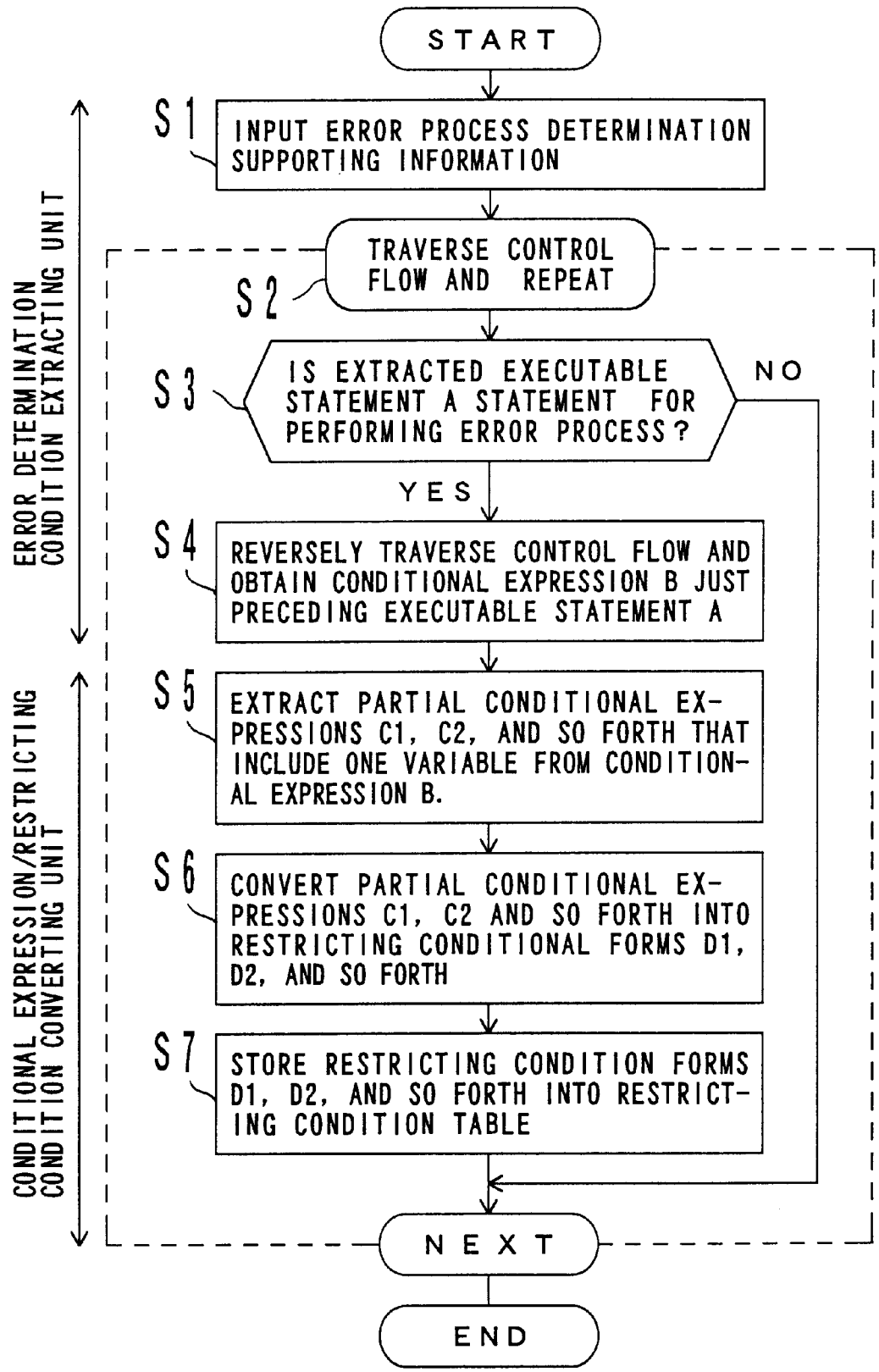
FIG. 9 is a flowchart showing the process of a restricting condition extracting unit.

FIG. 9 is a flowchart showing the process of the restricting condition extracting unit 13. In this flowchart, processes at steps S1 to S4 are executed by the error determination condition extracting unit 131. Processes at steps S5 to S7 are executed by the conditional expression/restricting condition converting unit 132.

At step S1, the error process determination supporting information file 121 is read and error process determination supporting information is obtained.

Step S2 is a step for executing steps S3 to S7 for all executable statements in the given program. At step S2, control flow information of the program information to be analyzed 11 is traversed (all executable statements are accessed) so that an executable statement that performs the error process is extracted.

At step S3, it is determined whether or not an extracted executable statement (executable statement A) is an executable statement that performs the error process. When the determined result is Yes, the flow advances to step S4. When the determined result is No, the flow advances to the process for the next executable statement. At step S4, the control flow information of the program information to be analyzed 11 is reversely traversed and the conditional expression B executed just before the executable statement A is extracted.

At step S5, the conditional expression B is divided into one or more partial conditional expressions. Among these partial conditional expressions, partial conditional expressions C1, C2, and so forth that include just one variable are extracted. At step S6, the partial conditional expressions C1, C2, and so forth are converted into restricting conditional forms D1, D2, and so forth. At step S7, the restricting conditional forms D1, D2, and so forth are stored in the restricting condition table 14. The processes from steps S3 to S7 are performed for all the executable statements.

Next, the process of the variable categorizing unit 15 will be described. When an executable statement in a given program includes a plurality of variables, the relation among the variables can be estimated with the type of the executable statement and the type of an operand thereof. Thus, the variable categorizing unit 15 analyzes the relation among a plurality of variables.

For example, in an update-type (assignment-type) expression, the concept of a referred variable must be the same as the concept of an assigned variable. Thus, it is assumed that the value range of the referred variable is the same as the value range of the assigned variable and that these variables belong to the same domain. For example, in an executable statement "MOVE INPUT_DAY TO DELIVERED_DAY", "INPUT_DAY" that is a referred variable and "DELIVERED_DAY" that is an assigned variable are variables that belong to the same concept. The value range of the referred variable is the same as the value range of the assigned variable. In other words, these variables belong to the same domain.

In a relational expression, since variables with the same concept are compared, it is assumed that the value ranges of these variables are the same and that these variables belong to the same domain. For example, in {UNIT_PRICE A<AMOUNT_OF_MONEY B", "UNIT_ PRICE A" and "AMOUNT_OF_MONEY B" are variables that belong to the same domain. The concept of this domain is "amount of money".

When an executable statement includes an update-type expression or a relational expression, the variable categorizing unit 15 categorizes these variables as variables that belong to the same domain. The user can designate a categorizing criterion of variables.

When the left side or right side of an executable statement includes a plurality of variables as in "COMPUTE A=B+C" or "(A+B)<(C+D)", it may not be stated that such a plurality of variables belong to the same domain. In other words, in "COMPUTE A=B+C", "B" and "C" do not always belong to the same domain. In "(A+B)<(C+D)", "A" and "B" do not always belong to the same domain. In addition, "C" and "D" do not always belong to the same domain.

In such cases, as, for example, "COMPUTE A=B+C", only when two variables on the right side belong to the same domain, is it assumed that all variables on both sides belong to the same domain. In other words, in the executable statement "COMPUTE A=B+C", when variables B and C belong to the same domain ∂, it is assumed that variables A, B, and C belong to the same domain ∂.

Figure 10:
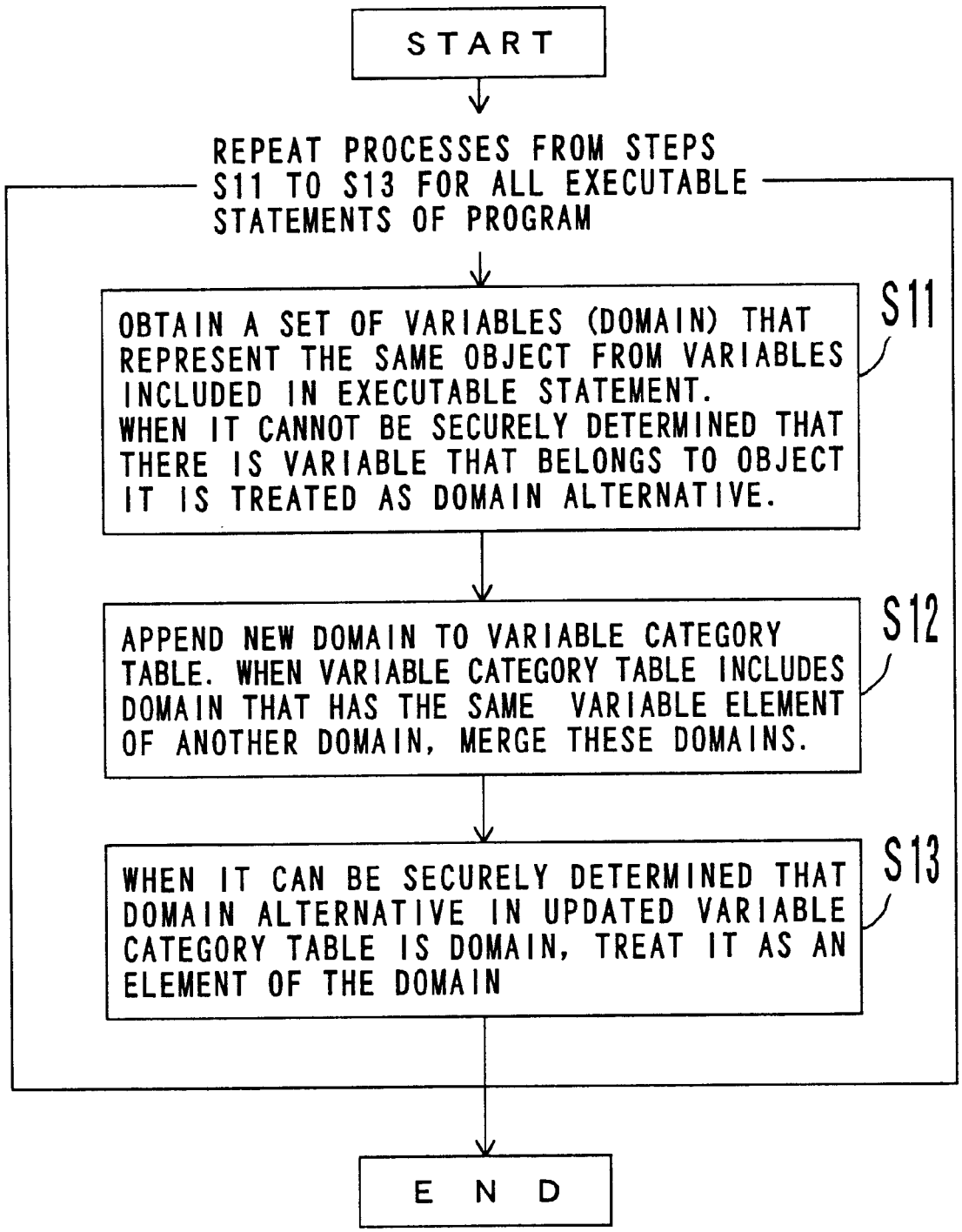
FIG. 10 is a flowchart for explaining an outlined operation of a variable categorizing unit.

FIG. 10 is a flowchart for explaining an outline operation of the variable categorizing unit. The variable categorizing unit executes processes from steps S11 to S13 for all executable statements of a given program. At step S11, a domain to which variables are included in an executable statement is obtained. Alternatively, when it cannot be securely stated that there is a variable that belongs to a domain, the variable is treated as a variable alternative of the domain.

At step S12, the domain obtained at step S11 is appended to the variable category table 16. At this point, when the variable category table 16 includes a domain to which the same variable as a variable that belongs to a newly appended domain, the domain that is newly appended and the domain that has been included in the variable category table 16 are merged.

At step S13, when it can be securely determined that a variable alternative belongs to a domain in the variable category table 16 that has been updated at step S12, the variable alternative is treated as an element of the domain.

Figure 11:
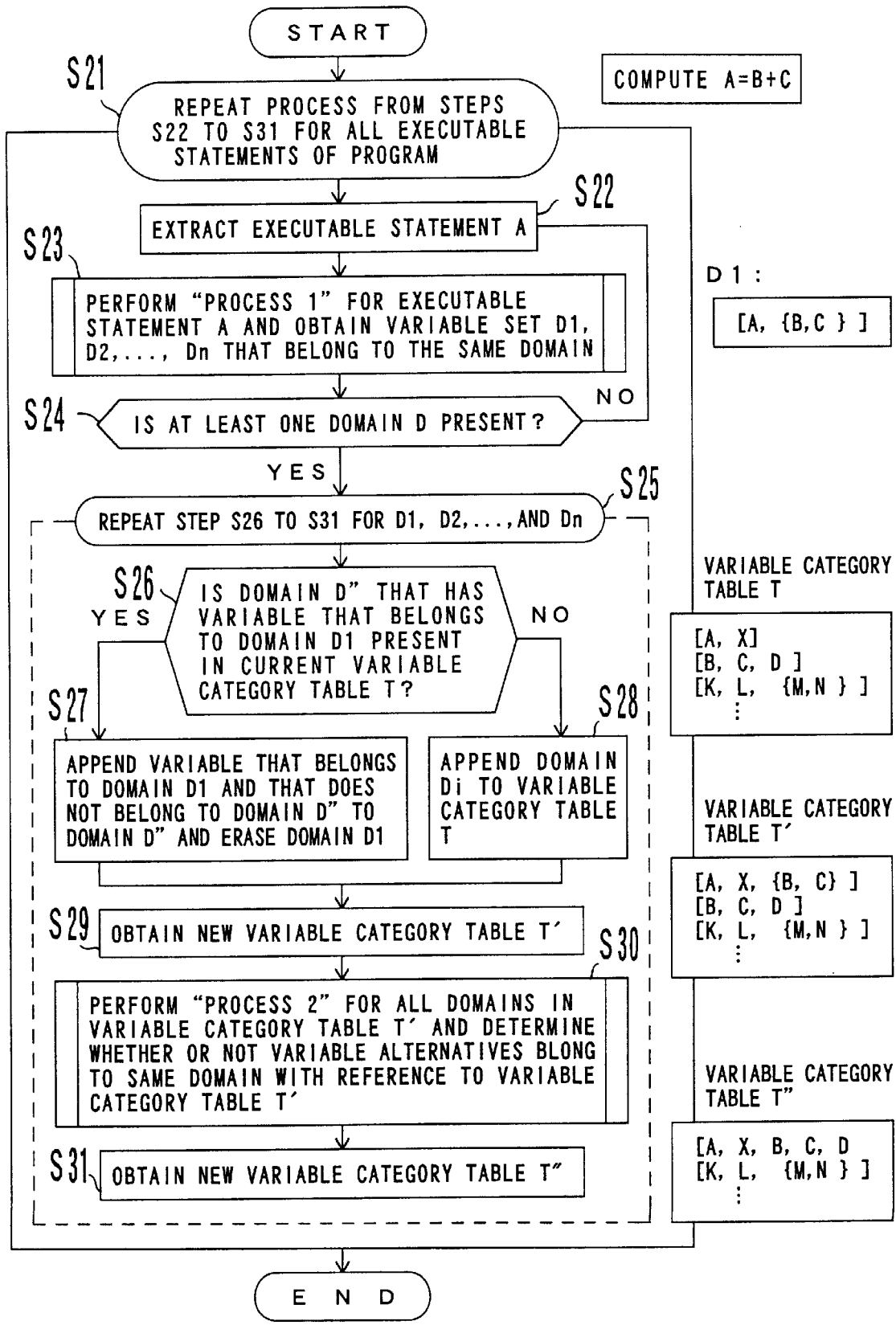
FIG. 11 is a flowchart showing the process of the variable categorizing unit and a schematic diagram showing the data structure thereof.

FIG. 11 is a flowchart showing the process of the variable categorizing unit 15 and a schematic diagram showing an example of the data structure of a variable category table. In FIG. 11, [ ] represents one domain, whereas { } represents a variable alternative that may belong to a domain. For example, [A, {B, C}] represents that when B and C belong to the same domain, A, B, and C are variables that belong to the same domain.

Step S21 is a step for executing steps S22 to S31 for all executable statements of a given program.

At step S22, one executable statement (executable statement A) is extracted from the given program. At step S23, "process 1" that will be described later is performed for the executable statement A and domains D1, D2, . . . , and Dn are obtained. At step S24, it is determined whether or not at least one domain D is present. When the determined result is Yes, the flow advances to step S25. When the determined result is No, the flow returns to step S22. At step S22, the next executable statement is extracted. Thereafter, the flow advances to step S23.

Step S25 is a step for executing steps S26 to S31 for the domains D1, D2, . . . , and Dn.

At step S26, it is determined whether or not the current variable category table T includes a domain D" including a variable that belongs to the domain Di. When the determined result is Yes, the flow advances to step S27. At step S27, a variable that belongs to the domain Di and that does not belong to the domain D" is appended to the domain D". In addition, at step S27, the domain Di is erased. On the other hand, when the determined result at step S26 is No, the flow advances to step S28. At step S28, the domain Di is appended to the variable category table T. At step S29, a variable category table T' updated at step S27 or S28 is obtained.

At step S30, "process 2" that will be described later is executed for all domains in the variable category table T' so as to determine whether or not variables as variable alternatives belong to the same domain. At step S31, a new variable category table T" is obtained.

Next, an example of the above process will be described. It is assumed that the variable category table T includes domains [A, X], [B, C, D], and [K, L, M, N]. At step S22, "COMPUTE A=B+C" is extracted as an execution statement A. At step S23, a domain D1: [A, {B, C}] is obtained. At this point, the variable category table T includes a domain D": [A, X] to which a variable "A" belongs (the variable "A" also belongs to the domain D1). Thus, at step S27, variable alternatives {B, C} of the domain D1 are appended to the domain D'. Thus, at step S27, a domain D" [A, X, {B, C}] is created and the domain D1 is erased. Consequently, a variable category table T' is obtained.

The variable category table T' includes a domain: [B, C, D] to which variable alternatives {B, C} belong. The variable alternatives {B, C} belong to the domain D": [A, X, {B, C}]. Thus, at step S30, it is determined that the variables "B" and "C" belong to the same domain. By merging the domain D": [A, X, {B, C}] and the domain: [B, C, D], a domain: [A, X, B, C, D] is obtained. On the other hand, in the domain: [K, L, {M, N}], it cannot be determined whether or not the variables "M" and "N" belong to the same domain. Thus, the domain: [K, L, {M, N}] remains unchanged. In such a manner, a variable category table T" is obtained.

FIG. 12 is a flowchart for explaining an outline operation of "process 1" executed at step S23 shown in FIG. 11.

At step S41, assuming that a referred variable and an assigned variable included in an executable statement that designates the update relation of variables belong to the same domain, they are categorized and stored in the variable category table. When it cannot be securely determined that these variables belong to the same domain, they are stored as variable alternatives that belong to the domain.

At step S42, assuming that variables on the left side of a relational character (such as an unequal character) and variables on the right side thereof belong to the same domain, they are categorized and stored in the variable category table. When it cannot be securely determined that these variables belong to a particular domain, they are stored as variable alternatives that belong to the domain.

Figure 13:
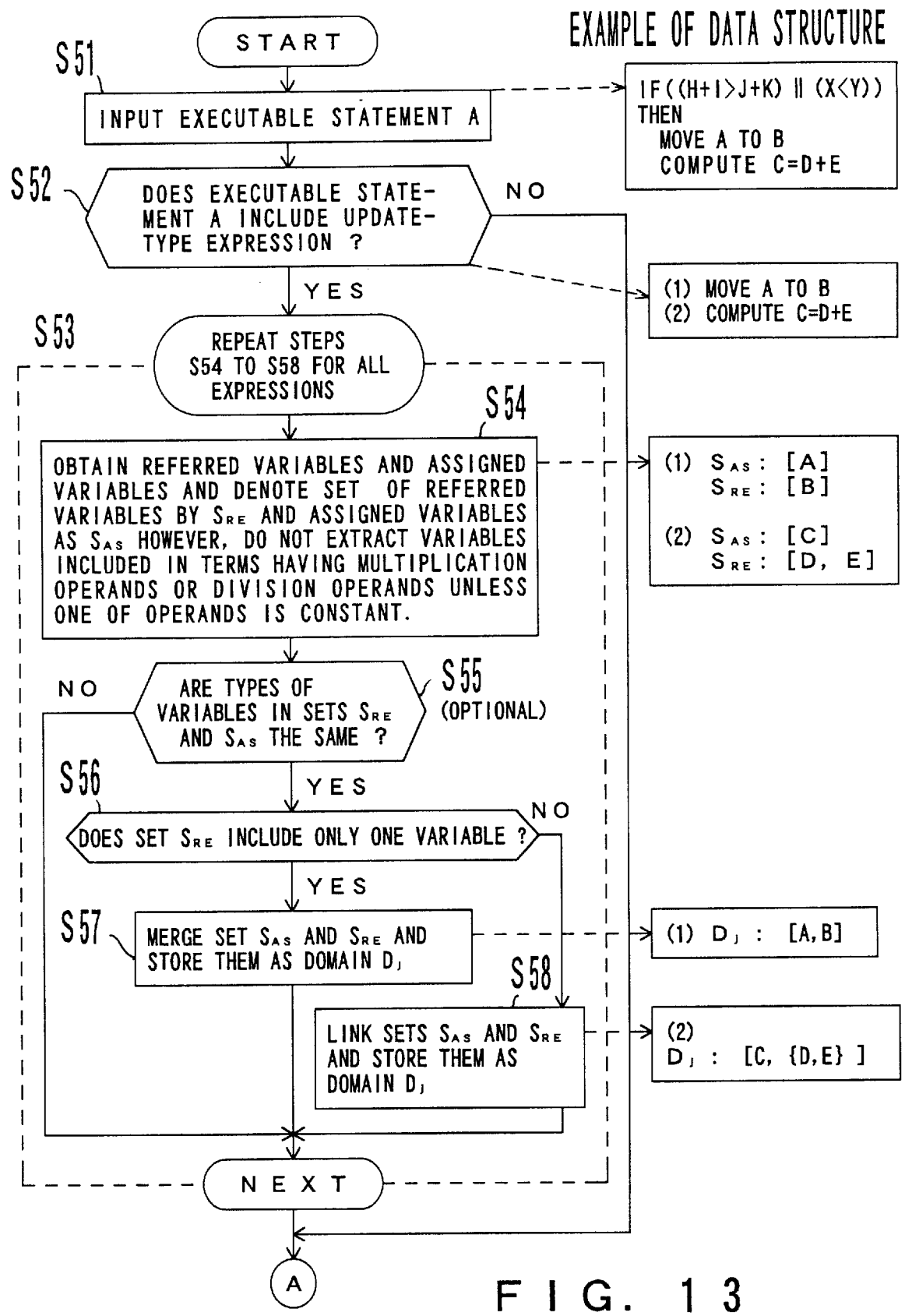
FIG. 13 is a detailed flowchart (No. 1) showing "process 1" of FIG. 11.
Figure 14:
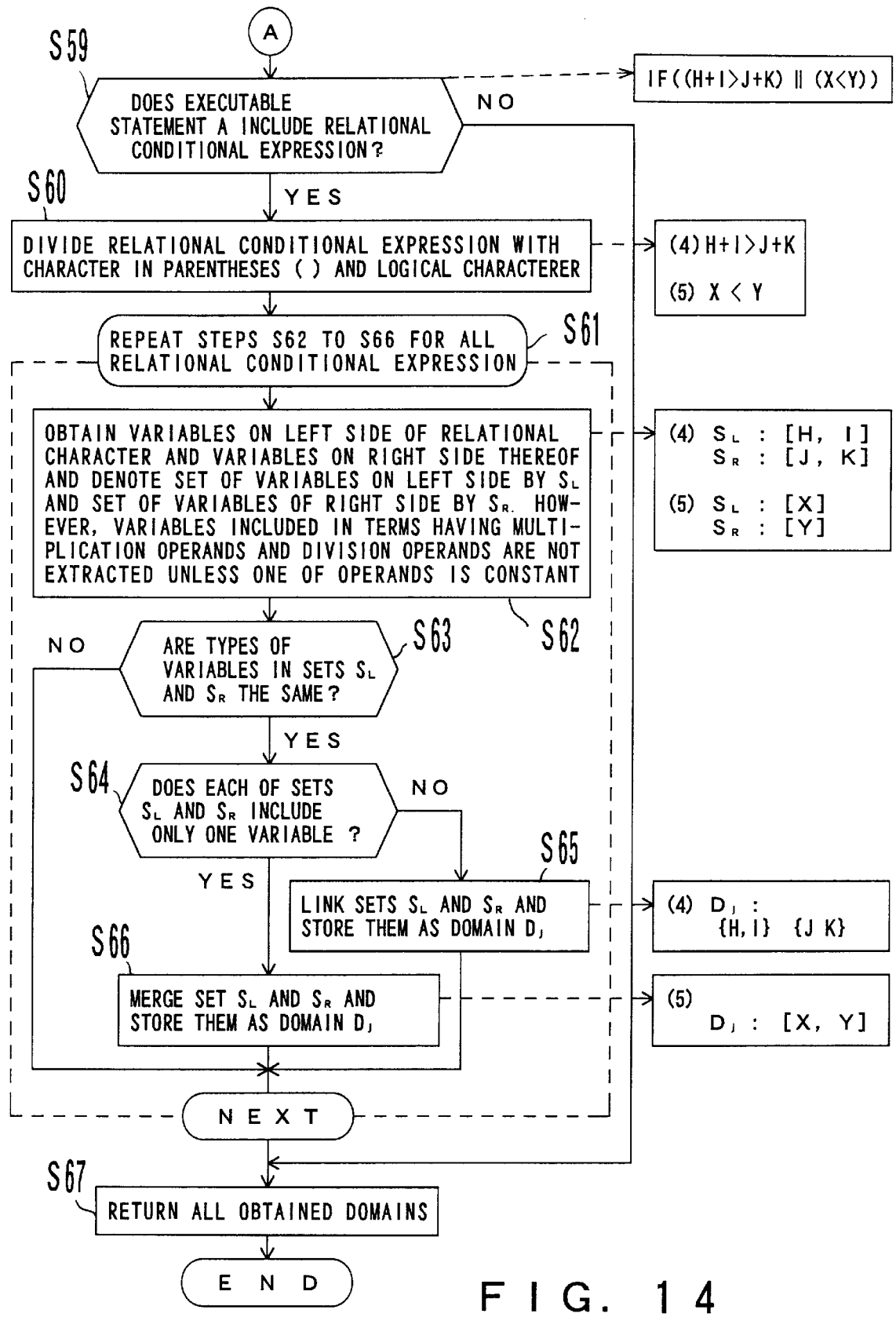
FIG. 14 is a detailed flowchart (No. 2) showing "process 1" of FIG. 11.

FIGS. 13 and 14 are flowcharts for explaining "process 1" executed at step S23 shown in FIG. 11.

At step S51, an executable statement A is input. At step S52, it is determined whether or not the executable statement A includes an update-type expression. When the determined result is Yes, the flow advances to step S53. When the determined result is No, the flow advances to step S59.

Step S53 is a step for executing steps S54 to S58 for all expressions.

At step S54, referred variables and assigned variables of the update-type (assignment-type) expression that has been input as the executable statement A are extracted. In this example, a set of referred variables is denoted by $S_{RE}$. A set of assigned variables is denoted by $S_{AS}$. When variables are multiplied or divided, they do not always belong to the same domain. Thus, variables in terms including multiplication operands or division operands are extracted unless one of the operands is constant.

Variables with the same concept may be assigned different data types. For example, "date" may be represented by a "character string" or an "integer". When variables with different data types are treated as those that belong to different domains, step S55 is executed.

Step S55 is an optional step. The user can designate whether or not to execute step S55. At step S55, it is determined whether or not the data types of variables of the sets $S_{AS}$ and $S_{RE}$ are the same with reference to the variable declarative of the program. When the data types of all the variables are the same, the flow advances to step S56. Otherwise, the next expression is processed.

At step S56, it is determined whether or not the set $S_{RE}$ includes only one variable. When the determined result is Yes, the flow advances to step S57. When the determined result is No, the flow advances to step S58. At step S57, the sets $S_{AS}$ and $S_{RE}$ are merged and thereby one domain is obtained. At step S58, the sets $S_{AS}$ and $S_{RE}$ are linked and thereby one domain is obtained. The definitions of "merge" and "link" will be described later.

Next, an example of the processes from step S51 to S58 will be described. In this example, it is assumed that an "IF statement" is input as the executable statement A and that the executable statement A includes the following two update-type expressions.

"MOVE A TO B" (1)

"COMPUTE C=D+E" (2)

With the expression (1), the set $S_{AS}$: [A] of assigned variables and the set $S_{RE}$: [B] of referred variables are obtained. When step S55 is executed, it is determined whether or not the data types of all variables are the same with reference to the variable declarative of the program. At step S56, it is determined whether or not the set $S_{RE}$ includes only one variable. When the determined result is Yes, the flow advances to step S57. At step S57, the sets $S_{AS}$ and $S_{RE}$ are merged and thereby domain Dj: [A, B] is obtained.

"Merge" is to obtain one set from a plurality of sets in such a manner that the resultant one set does not have a plurality of set elements that are the same. Thus, when a set including an element [A] and a set including elements [A, B] are merged, a set [A, B] is obtained.

When the same process is executed for the expression (2), a set $S_{AS}$: [C] and a set $S_{RE}$: [{D, E}] are obtained. {D, E} represents that it cannot be securely determined that [D] and [E] belong to the same domain. In other words, [D] and [E] are variable alternatives. At step S56, it is determined whether or not the set $S_{RE}$ includes one variable. When the determined result at step S56 is No, the flow advances to step S58. At step S58, the sets $S_{AS}$ and $S_{RE}$ are linked and thereby a domain Dj: [C, {D, E}] is obtained.

"Link" is to obtain one set from a plurality of sets in such a manner that elements included in each set are elements of the resultant one set. For example, when a set including an element [A] and a set including elements [A, B] are linked, a set [A, A, B] is obtained.

After the processes from steps S51 to S58 are executed for all the expressions, the flow advances to step S59.

At step S59, it is determined whether or not the executable statement A includes a relational conditional expression. When the determined result is Yes, the flow advances to step S60. When the determined result is No, the flow advances to step S67.

At step S60, the relational conditional expression is divided corresponding to a character in parentheses ( ) and a logical character. Step S61 is a step for executing steps S62 to S66 for each relational expression divided at step S60.

At step S62, variables on the left side of the relational character and variables on the right side thereof are obtained. In this example, a set of variables on the left side is denoted by $S_L$ and a set of variables on the right side is denoted by $S_R$. However, variables used in terms including multiplication operands or division operands are not extracted unless one of the operands is constant.

Step S63 is the same as step S55. In other words, at step S63, with reference to the variable declarative of the program, it is determined whether or not the data types of the variables are the same. When the data types of the sets $S_L$ and $S_R$ are the same, the flow advances to step S64. When the determined result is No, the processes from steps S62 to S66 are executed for the next expression.

At step S64, it is determined whether or not each of the sets $S_L$ and $S_R$ includes only one variable. When the determined result is Yes, the flow advances to step S66. Otherwise, the flow advances to step S65.

At step S65, as with step S58, the sets $S_L$ and $S_R$ are linked and thereby one domain is obtained. At step S66, as with step S57, the sets $S_L$ and $S_R$ are merged and thereby one domain is obtained.

At step S67, all domains D1, D2, ..., and Dn obtained at steps S51 to S66 are passed to the process at step S24 shown in FIG. 11.

Next, an example of processes from steps S59 to S66 will be described. In this example, it is assumed that an "IF statement" is input as the executable statement A and that the executable statement A includes the following relational conditional expression.

$$(H+I)>(J+K)\|(X<Y)$$

where "∥" represents "OR". When the relational conditional expression is divided by a character in parentheses ( ) and a logical character, the following two expressions are obtained.

$$(H+I)>(J+K) \quad (4)$$

$$X<Y \quad (5)$$

The set $S_L$ of variables on the left side and the set $S_R$ of variables on the right side are extracted for each divided relational expression. In other words, with formula (4), a set $S_L$: [H, I] and a set $S_R$: [J, K] are obtained. At this point, since each of the sets $S_L$ and $S_R$ has at least one variable, when the sets $S_L$ and $S_R$ are linked, a domain Dj [{H, I}, {J, K}] is obtained.

With the formula (5), a set $S_L$: [X] and a set $S_R$: [Y] are extracted. In this case, since each of the sets $S_L$ and $S_R$ includes only one variable, when the sets $S_L$ and $S_R$ are merged, a domain Dj [X, Y] is obtained.

In the case that step S63 is executed, after the sets $S_L$ and $S_R$ have been extracted, it is determined whether or not the data types of variables that belong to the sets $S_L$ and $S_R$ are the same.

FIGS. 15A and 15B are tables showing examples of domains obtained in the processes shown in the flowcharts of FIGS. 13 and 14. FIG. 15A shows examples of executable statements including one operand. FIG. 15B shows examples of executable statements including a plurality of operands.

In FIG. 15B, since an update-type expression "COMPUTE A=B·C" has multiplication operands, a domain is not generated. However, as in an expression "MULTIPLY I BY CONSTANT GIVING K (K=I·CONSTANT)", even if variables of a term include multiplication operands, when one of operands is constant, a domain is obtained.

FIGS. 16A and 16B are tables showing the relation of expressions and domains obtained thereof in the case that the expressions are written in C language.

FIG. 17 is an outline flowchart for explaining "process 2" executed at step S30 shown in FIG. 11. At step S71, when a variable category table is input, it is determined whether or not a domain D includes a set of variable alternatives (set S). When the determined result is Yes, a domain (domain D') that includes all elements that belong to the set S is extracted.

At step S72, the domains D and D' and the set S are merged and thereby the variable category table is updated. Steps S71 and S72 are executed for all domains in the variable category table.

FIG. 18 is a detailed flowchart for explaining "process 2" executed at step S30 shown in FIG. 11.

Step S81 is a step for executing steps S82 to S87 for domains D1, D2, ..., and Dn in the variable category table T' obtained at step S29. Next, the process for one of the domains D1, D2, ..., and Dn (namely, domain Di) will be described.

At step S82, it is determined whether or not the domain Di includes a set of variable alternatives (set S). The set of variable alternatives is a group of variables surrounded by { }. When the determined result is Yes, the flow advances to step S83. When the determined result is No, the process for the next domain is executed.

At steps S83 and S84, a domain D' that includes all variables that belong to the set S of variable alternatives in the domain Di is searched from the variable category table T'. When the variable category table T' includes such a domain D', the flow advances to step S85. When the variable category table T' does not include such a domain D', the process for the next domain is executed.

At step S85, variables that belong to the domain Di and that do not belong to the domain D' are appended to the domain D' and the domain Di is deleted.

At step S86, it is determined whether or not the variable category table T' includes a domain having a set of variable alternatives composed of variables that belong to the domain D' that has been updated at step S85. When the determined result is Yes, the flow advances to step S87. At step S87, all the relevant domains are merged to the domain D'.

After the processes from step S82 to S87 are executed for all the domains, the flow advances to step S88. At step S88, the variable category table is updated and output as a variable category table T''.

Next, an example of the processes from steps S81 to S88 is described. In this example, it is assumed that the following domains have been stored in the variable category table T'.

Domain D1: [A, {B, C}]
Domain D2: [B, C, D]
Domain D3: [K, L, {A, B}]

When the processes from step S81 to S88 are executed for the domain D1, although the set S of variable alternatives of the domain D1 is {B, C}, all the variables that belong to the set S are included in the domain D2. Thus, at step S84, "A" that is an element of the domain D1 is appended to the domain D2. Thus, a domain D2': [A, B, C, D] is generated and the domain D1 is deleted.

Although the set S of variable alternatives of the domain D3 is {A, B}, all variables that belong to the set S are included in the domain D2'. Thus, at step S87, the domain D3 is merged with the domain D2'. Thus, a domain [A, B, C, D, K, L] is obtained. This domain is stored in the variable category table T". At step S88, the variable category table T" is output.

Figure 19:
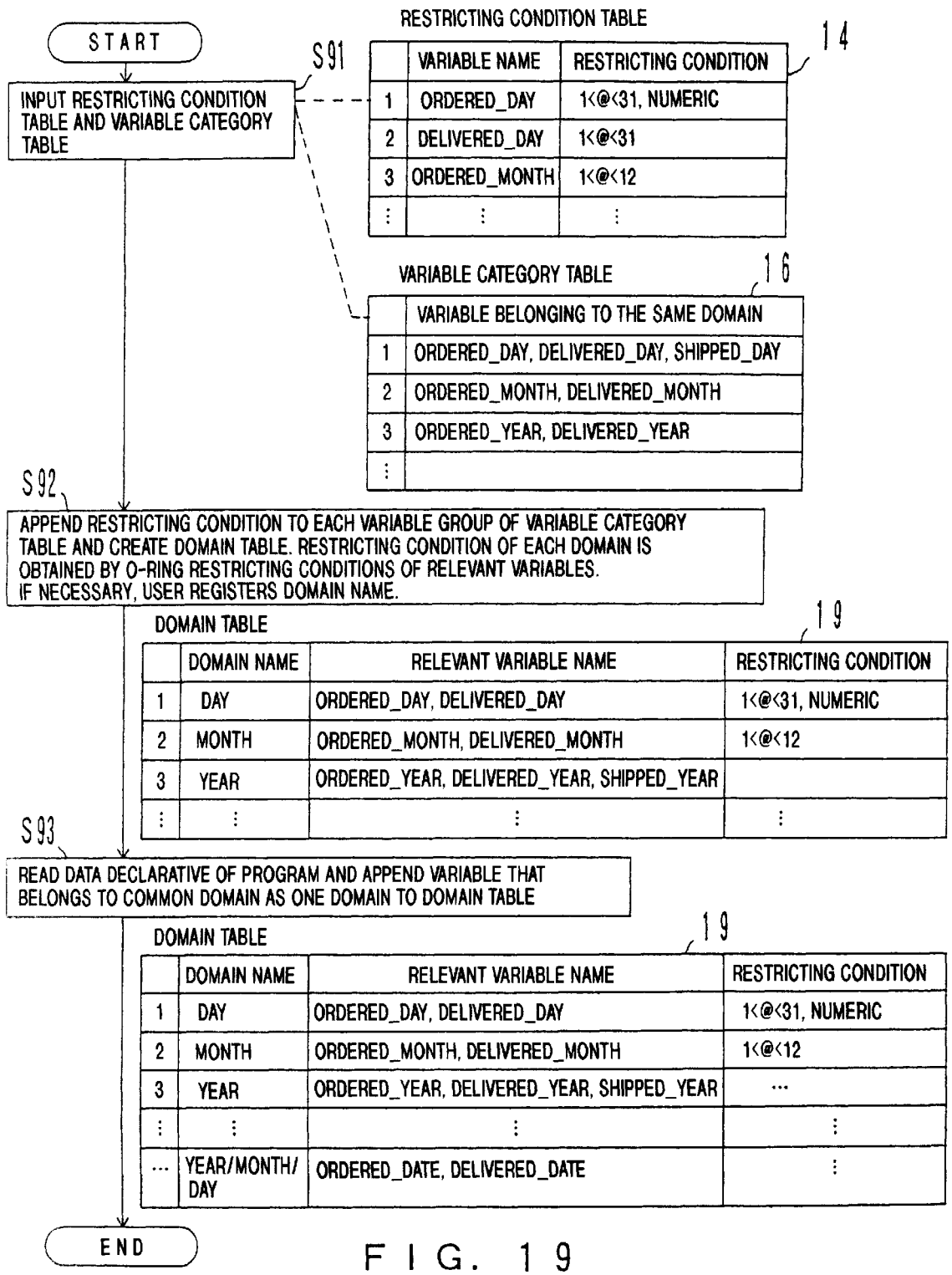
FIG. 19 is a flowchart showing of the process of a domain definition extracting unit and a schematic diagram showing the data structure thereof.

FIG. 19 is a flowchart showing the process of the domain definition extracting unit 17. The domain definition extracting unit 17 extracts definition information of variables that belong to each domain corresponding to restricting condition information obtained in the process shown in FIG. 9 and variable category information obtained in the process shown in FIG. 11, and outputs the extracted definition information as domain definition information.

At step S91, the restricting condition table 14 obtained from the restricting condition extracting unit 13 and the variable category table 16 obtained from the variable categorizing unit 15 are input.

At step S92, the restricting condition received in the restricting condition table 14 is appended to each variable group of the variable category table 16. Thus, a domain table 19 is created. The restricting condition of each domain is the OR of the restricting conditions of the relevant variables. If necessary, the user can register a domain name and so forth with an input device such as a keyboard.

At step S93, when a child variable that is subordinate to a parent variable and a child variable that is subordinate to another parent variable belong to a common domain, these parent variables are appended as one domain to the domain table 19. For example, in the COBOL program shown in FIG. 1A, since "ORDERED_DATE" and "DELIVERED_DATE" are composed of variables "DAY", "MONTH", and "YEAR", "ORDERED_DATE" and "DELIVERED_DATE" can be grouped with a higher concept "YEAR/MONTH/DAY". Thus, the domain with the concept of "YEAR/MONTH/DAY" is appended to the domain table 19.

Figure 23:
FIG. 23 is a schematic diagram showing an example of an error process determination supporting information file.

Next, a real example of the process of the program analyzing apparatus 1 will be described. FIGS. 20 to 22 are lists of a COBOL program as an object to be processed by the program analyzing apparatus 1. FIG. 23 is a schematic diagram showing an example of the error process determination supporting information file 121 according to the embodiment of the present invention. FIG. 24 is a table showing the extracted result of a domain definition that is output from the program analyzing apparatus 1.

As shown in FIG. 23, the error process determination supporting information file 121 includes a definition [LABEL: error process]. Corresponding to this definition, the restricting condition extracting unit 13 traverses the control flow of the COBOL program shown in FIGS. 20 to 22, detects an executable statement that includes "GO TO error process", and extracts a conditional expression just preceding the executable statement. With this process, the following conditional expressions are obtained.

"order number GET<=0" (1)

"item number<=0 OR item number IS NOT NUMERIC" (2)

"(ordered quantity E>unassigned inventory quantity SM) AND (commodity category SM=0)" (3)

"scheduled delivery date (YEAR/MONTH/DAY)<ordered date (YEAR/MONTH/DAY)+14) AND (commodity category SM=1)" (4)

With these conditional expressions, the following restricting conditions are obtained.

order number GET>0 (1)

item number>0 (2)

item number IS NUMERIC (3)

With the variable categorizing process performed by the variable categorizing unit 15, variable categories as shown in the left column of FIG. 24 can be obtained. With the variable categories and restricting conditions, domain definition information as shown in FIG. 24 can be obtained.

The domain definition information is very useful for interpreting a program. However, the above-described restricting conditions and variable categories are also satisfactorily useful for interpreting a program.

Next, the structure and operation of the program analyzing/displaying apparatus 2 shown in FIG. 3 will be described in detail. First of all, with reference to FIGS. 25 to 31, the process of the domain analyzing unit 21 that obtains the relation among domains with the job control language 24 will be described.

Figure 30:
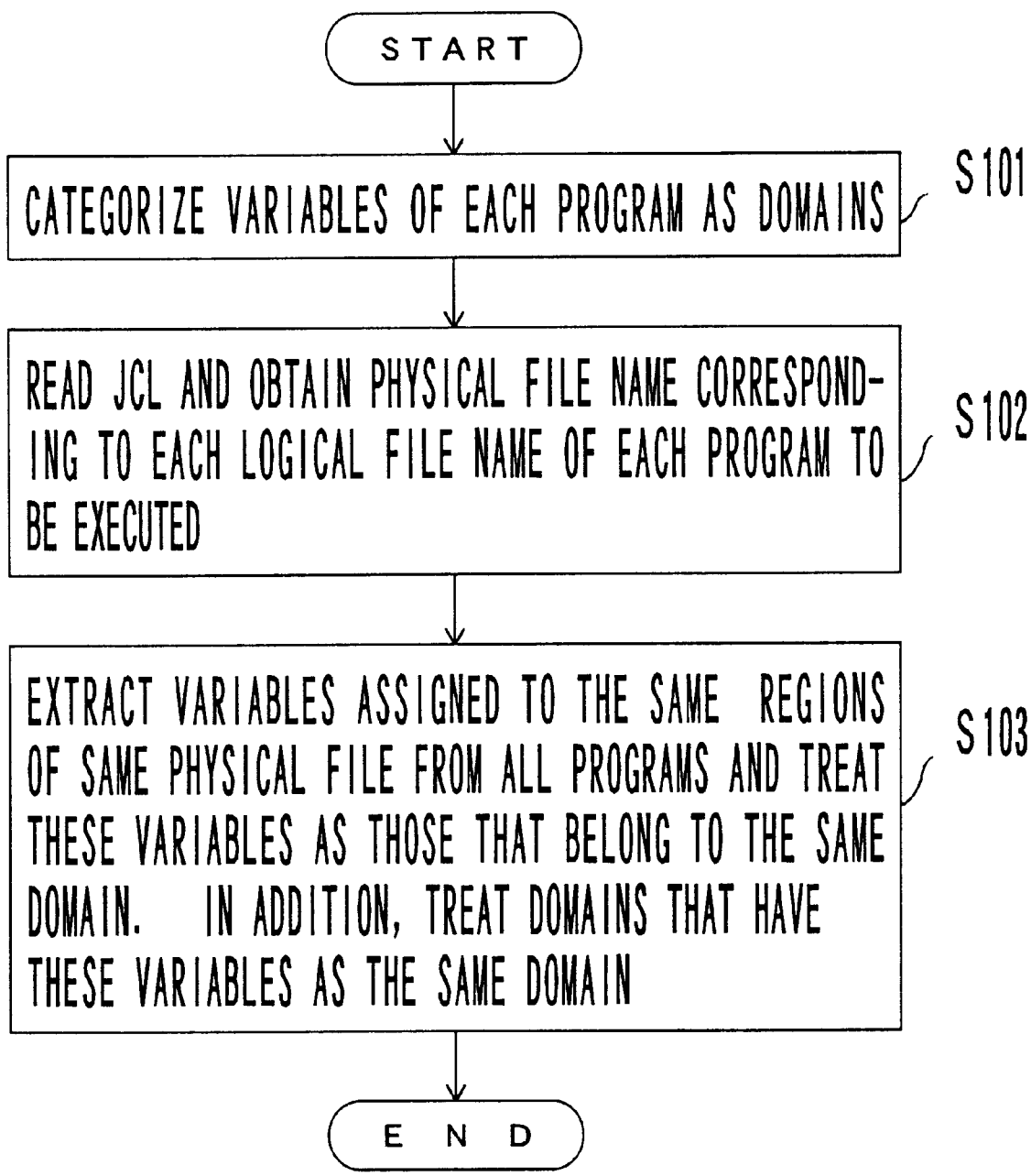
FIG. 30 is an outline flowchart showing a process for analyzing the relation among domains using the job control language.
Figure 31:
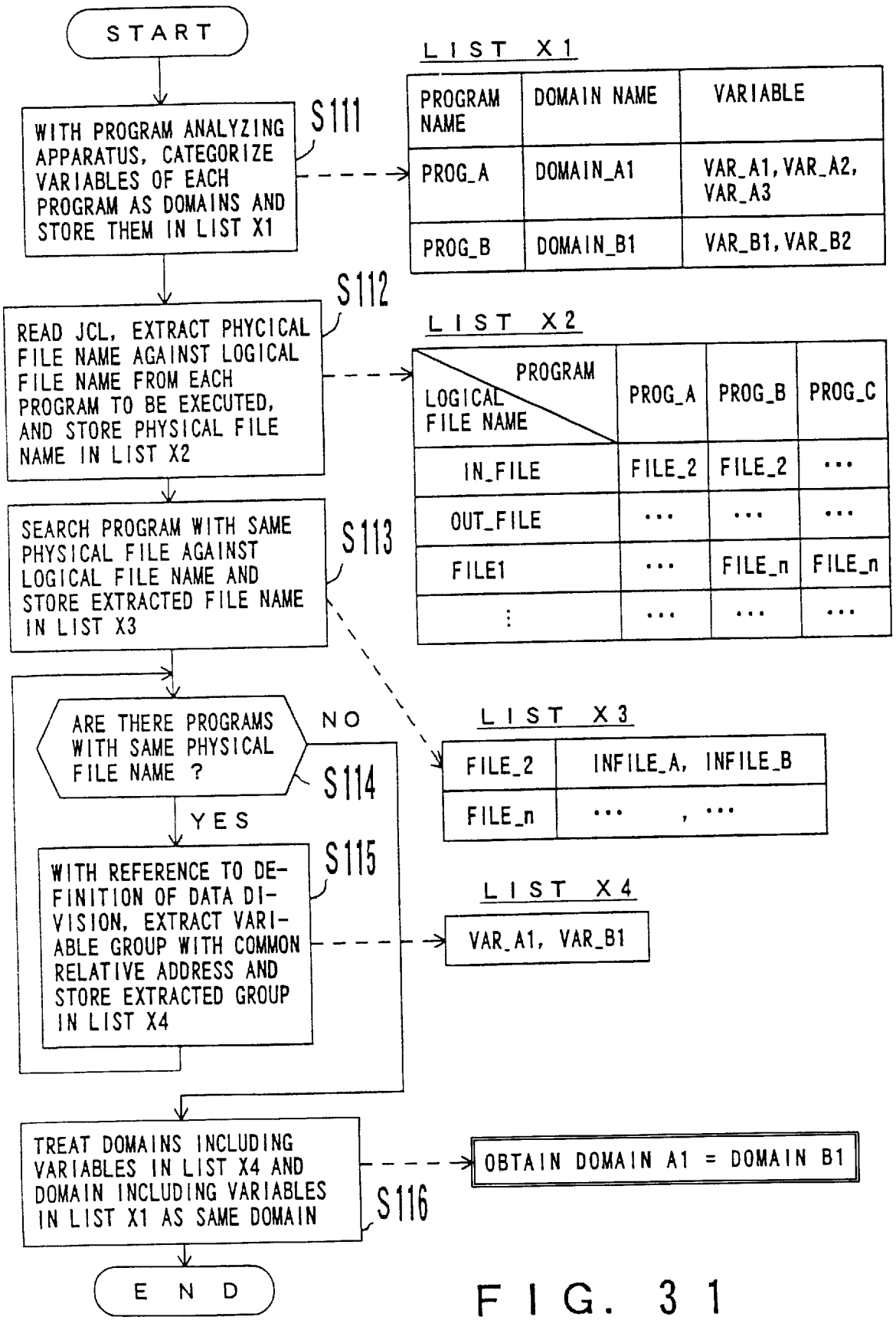
FIG. 31 is a detailed flowchart showing a process for analyzing the relation among domains using the job control language.

FIGS. 25 and 26 show examples of COBOL programs to be analyzed. FIG. 27 shows an example in which variables of each program are categorized as domains. FIG. 28 shows an example of the job control language (JCL). FIG. 29 shows examples of relative addresses of file records of a COBOL program. FIGS. 30 and 31 are flowcharts for explaining the process for analyzing the relation among domains with the job control language.

A file FILE_1 of a COBOL program shown in FIG. 25 includes programs PROG_A and PROG_B. A file FILE_2 shown in FIG. 26 includes a program PROG_C.

The analysis performed by the program analyzing apparatus 1 shows that variables VAR_A1 and VAR_A2 belong to the same domain due to the update relation of a statement of line 41 of the program shown in FIG. 25 and that variables VAR_A1 and VAR_A3 belong to the same domain due to the update relation of a statement of line 42 of the program. In other words, it is clear that all the variables VAR_A1, VAR_A2, and VAR_A3 belong to the same domain. Likewise, it is clear that variables VAR_B1 and VAR_B2 belong to the same domain due to the update relation of a statement of line 86 of the program.

FIG. 27 shows an analyzed result of the program analyzing apparatus 1. In the analysis by the program analyzing apparatus 1, domain category results of individual programs are obtained (namely, domains to which individual variables belong are analyzed). However, the relation among domains in a program and domains in another program cannot be analyzed.

To solve this problem, with the job control language (JCL) as shown in FIG. 28, the relation among domains is analyzed. JCL shown in FIG. 28 includes "process order of program PROG_A and program PROG_B".

In line 12 of FILE_1 shown in FIG. 25, INFILE_A is assigned to logical file IN_FILE. In line 52, INFILE_B is assigned to logical file IN_FILE. According to the JCL description shown in FIG. 28, input files (logical file name= IN_FILE) of programs PROG_A and PROG_B are "FILE_2". Thus, it is clear that INFILE_A of the program PROG_A is the same as INFILE_B of the program PROG_B.

When INFILE_A is the same as INFILE_B, if "length" and "relative address (offset)" of the variables of INFILE_A are the same as those of INFILE_B, it can be stated that these variables correspond to each other.

"Length" is the length of a variable. For example, the length of variable VAR_A11 of line 24 is "1". "Relative address" is an offset to a parent variable (for example, a parent variable of variables VAR_A11, VAR_A12, and VAR_A13 is VAR_A1). The offset is defined as the sum of the "lengths". For example, the length of each of variables VAR_A11 and VAR_A12 is "1". Thus, the relative address of variable VAR_A13 against variable VAR_A1 is 1+1=2.

FIG. 29 shows relative addresses of INFILE_A and INFILE_B. In FIG. 29, it is clear that the relative address of variable VAR_A13 of the program PROG_A is the same as the relative address of variable VAR_B12 of the program PROG_B. In addition, the length of variable VAR_A13 is the same as the length of variable VAR_B12. Thus, it is clear that variables VAR_A13 and VAR_B12 belong to the same domain.

FIG. 30 is an outline flowchart showing a process for analyzing the relation among domains with the job control language. This process is executed by the domain analyzing unit 21 shown in FIG. 3.

At step S101, variables of each program are analyzed and categorized as domains. This process may be executed by the program analyzing apparatus 1 shown in FIG. 2. At step S102, the JCL is read and a physical file name corresponding to a logical file name of each program to be analyzed is obtained. At step S103, the same physical files are obtained and variables assigned to the same regions of the physical files are extracted. The extracted variables are treated as variables that belong to the same domain. In addition, domains that include these variables are treated as the same domain.

FIG. 31 is a detailed flowchart showing a process for analyzing the relation among domains with the job control language.

At step S111, with the program analyzing apparatus 1, a domain to which each variable of each program belongs is analyzed. The analyzed result is stored as a list X1. The list X1 includes program names, domain names therein, variables that belong to each domain, and so forth.

Steps S112 to S116 are performed by the domain analyzing unit 21. At step S112, the JCL is read and physical file names (FILE_2, FILE_n, and so forth) assigned to individual logical files of individual programs to be analyzed are extracted. A list X2 includes information representing the relation between the physical file names and logical file names. In this example, it is determined that FILE_2 of each of programs PROG_A and PROG_B has been assigned to the logical file IN_FILE. The detected result is stored in the list X2.

At step S113, programs with the same physical file name are searched from individual logical file names and the obtained file names are stored in a list X3.

At step S114, with reference to the lists X2 and X3, it is determined whether or not a particular physical file is used in a plurality of programs. When the determined result is Yes, the flow advances to step S115. When the determined result is No, the flow advances to step S116.

At step S115, with reference to DATA DIVISION (data declarative) of each program, variables with the same relative address are extracted from individual programs and stored in a list X4. In this example, variables VAR_A1 and VAR_B1 are extracted as variables with the same relative address and stored in the list X4. After the process at step S115 has been completed, the flow returns to step S114. At step S114, the same process is performed for the next physical file.

At step S116, domains including variables in the list X4 are extracted from the list X1. These extracted domains are treated as the same domain. In this example, as a domain that includes variable VAR_A1, a domain A1 is extracted. As a domain that includes variable VAR_B1, a domain B1 is extracted. Thus, it is determined that the domains A1 and B1 are the same domain.

In such a manner, the program analyzing/displaying apparatus 2 analyzes the relation among domains in a plurality of programs with the JCL.

The program analyzing/displaying apparatus 2 can also analyze the relation among domains of a plurality of programs with the CALL information 25 shown in FIG. 3. The CALL information is used to evoke a program from another program. The CALL information is used in conventional programs.

Next, with reference to FIGS. 32 to 36, the process of the domain analyzing unit 21 that obtains the relation among domains with CALL information will be described.

Figure 34:
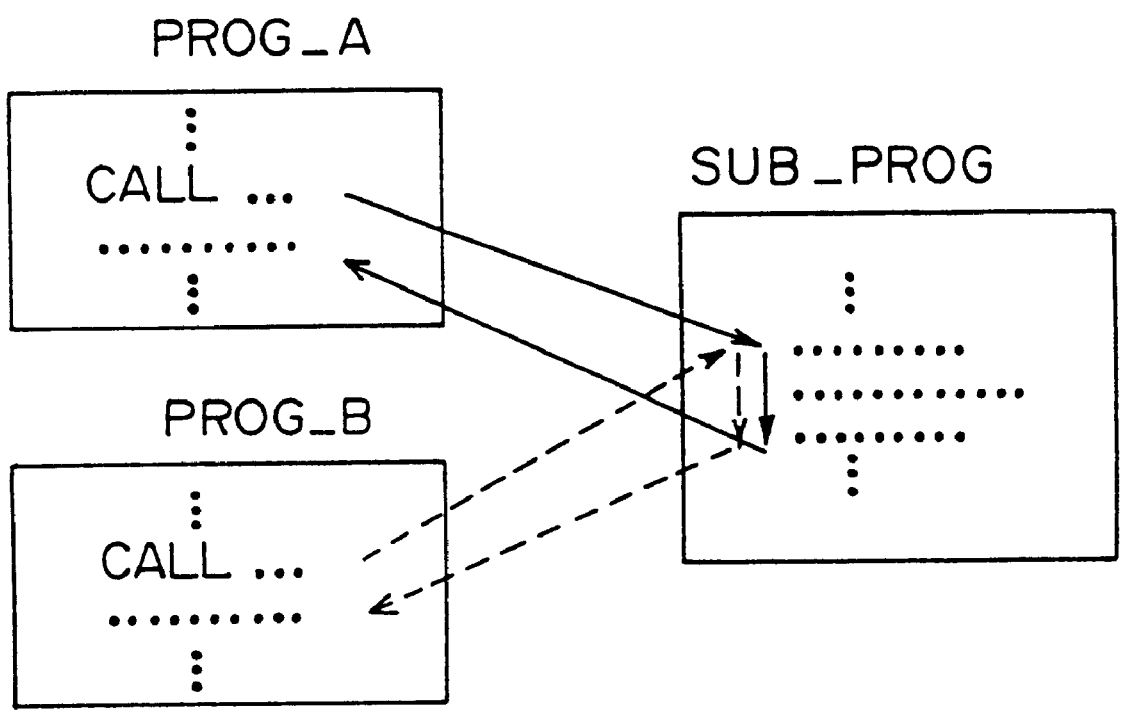
FIG. 34 is a schematic diagram showing an example of the calling relation of programs.
Figure 36:
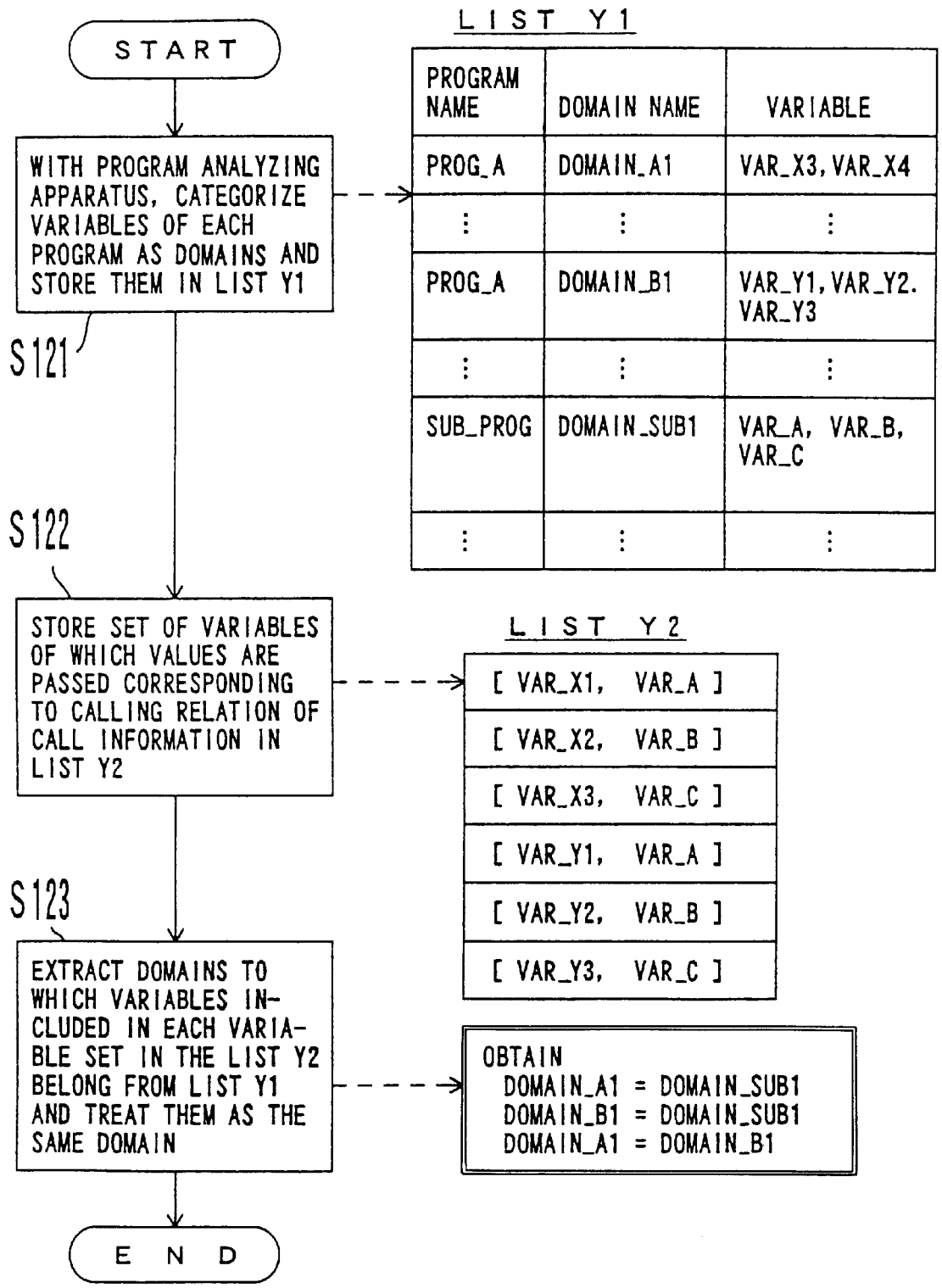
FIG. 36 is a flowchart showing a process for analyzing the relation of domains using CALL information (representing the calling relation of programs)

FIGS. 32 and 33 show an example of a COBOL program to be analyzed. FIG. 34 is a schematic diagram showing the calling relation of programs. FIG. 35 is a schematic diagram showing an example in which variables of each program are categorized as domains. FIG. 36 is a flowchart showing a process for analyzing the relation among domains with CALL information.

In the following description, it is assumed that programs PROG_A and PROG_B shown in FIG. 32 independently call a program SUB_PROG shown in FIG. 33. In this case, each program has the calling relation of programs as shown in FIG. 34. Information that represents the calling relation of programs is referred to as CALL information. CALL information is extracted from, for example, the statements of lines 30 and 75 shown in FIG. 32.

In the CALL information, "USING" statements are used (in lines 31 and 76 of FIG. 32). In the "USING" statement of line 31, values of variables VAR_X1, VAR_X2, and VAR_X3 in the program PROG_A are passed to variables VAR_A, VAR_B, and VAR_C of the program SUB_PROG. These variables are calculated by the program SUB_PROG. Likewise, in the "USING" statement of line 76, values of variables VAR_Y1, VAR_Y2, and VAR_Y3 in the program PROG_B are passed to variables VAR_A, VAR_B, and VAR_C of the program SUB_PROG. These variables are calculated by the program SUB_PROG.

On the other hand, the domains of each program have been analyzed by, for example, the program analyzing apparatus 1. FIG. 35 shows an example of the analyzed result of each program. In the example shown in FIG. 35, variables VAR_X3 and VAR_X4 of the program PROG_A belong to the same domain. Variables VAR_A, VAR_B, and VAR_C of the program SUB_PROG belong to the same domain.

With the "USING" statements, the variables VAR_X1, VAR_X2, VAR_X3 are substantially the same as the variables VAR_A, VAR_B, and VAR_C, respectively. Thus, as described above, when the variables VAR_A, VAR_B, and VAR_C belong to the same domain, the variables VAR_X1, VAR_X2, and VAR_X3 belong to the same domain. In other words, the following relations are satisfied.

DOMAIN_A1=[VAR_X3, VAR_X4]

↓

DOMAIN_A1=[VAR_X1, VAR_X2, VAR_X3, VAR_X4]

In addition, since the variables that belong to the domain DOMAIN_SUB1 are part of the variables that belong to the domain DOMAIN_A1, it can be stated that the domain DOMAIN_A1 is substantially the same as the domain DOMAIN_SUB1. In other words, the following relation is satisfied.

DOMAIN_A1=DOMAIN_SUB1

Further, the variables VAR_Y1, VAR_Y2, and VAR_Y3 of the program PROG_B belong to the same domain. Thus, with the "USING" statement, as with the case of the program PROG_A, the following relation is satisfied.

DOMAIN_B1=DOMAIN_SUB1

Consequently, the following relation is obtained.

DOMAIN_A1=DOMAIN_B1

FIG. 36 is a flowchart showing a process for analyzing the relation among domains with CALL information (calling relation of programs).

At step S121, as with step S111 shown in FIG. 31 with the program analyzing apparatus 1, a domain to which each variable of each program belongs is analyzed. The analyzed result is stored as a list Y1. As with the list X1, the list Y1 includes program names, domain names thereof, variables that belong to each domain, and so forth.

Steps S122 and S123 are performed by the domain analyzing unit 21. At step S122, corresponding to the calling relation of CALL information, information that is pair of variables on the calling side and variables on the called side is stored as a list Y2. In this example, the variables VAR_X1, VAR_X2, and VAR_X3 are paired with the variables VAR_A, VAR_B, and VAR_C, respectively. In addition, the variables VAR_Y1, VAR_Y2, and VAR_Y3 are paired with the variables VAR_A, VAR_B, and VAR_C, respectively.

At step S123, domains to which variables included in each variable set in the list Y2 belong are extracted from the list Y1. The extracted domains are treated as the same domain. In this example, in line 3 of the list Y2, since the variable VAR_X3 is paired with the variable VAR_C, the domain to which the variable VAR_X3 belongs and the domain to which the variable VAR_C belongs are treated as the same domain. In other words, the following relation is obtained.

DOMAIN_A1=DOMAIN_SUB1

Likewise, the following relation is obtained.

DOMAIN_B1=DOMAIN_SUB1

With these relations, the following relation is obtained.

DOMAIN_A1=DOMAIN_B1

In such a manner, the program analyzing/displaying apparatus 2 analyzes the relation among domains in a plurality of programs with CALL information. Thus, a program analysis can be integrally performed.

FIGS. 37A to 37D and 38 show an example of a process for analyzing a program written in C language with the above-described calling relation.

In FIGS. 37A to 37D, a program PROG_func is called from a program PROG_A. A variable x1 defined in the program PROG_A is passed to a variable a used in the program PROG_func so as to perform a calculation.

Figure 38:
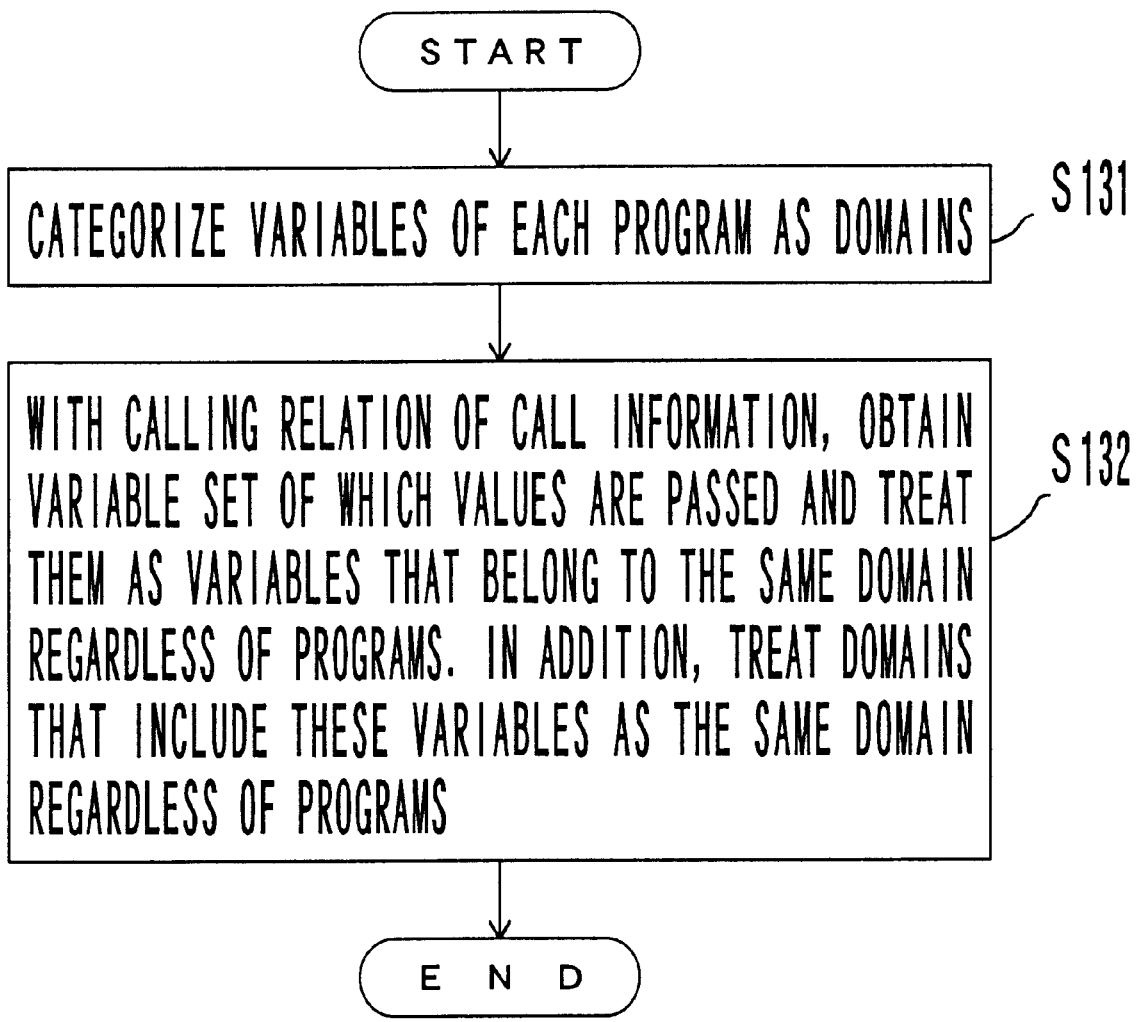
FIG. 38 is a flowchart showing a process for analyzing a program written in C language using CALL information.

FIG. 38 is a flowchart showing a process for analyzing a program written in C language with CALL information. At step S131, as with step S121, domains of each program are analyzed. An example of the analyzed result is shown in FIG. 37B. At step S132, corresponding to CALL information shown in FIG. 37C, variables on the calling side and variables on the called side are paired. Domains to which these variables belong are treated as the same domain.

The program analyzing/displaying apparatus 2 can analyze the relation among domains of a plurality of programs with the user input information 26 shown in FIG. 3. The user input information 26 is information that the user inputs with a keyboard, a mouse, and the like. For example, the user input information 26 is a search keyword. Next, with reference to FIGS. 39 to 42, the process of the domain analyzing unit 21 that obtains the relation among domains with the user input information will be described.

Figure 42:
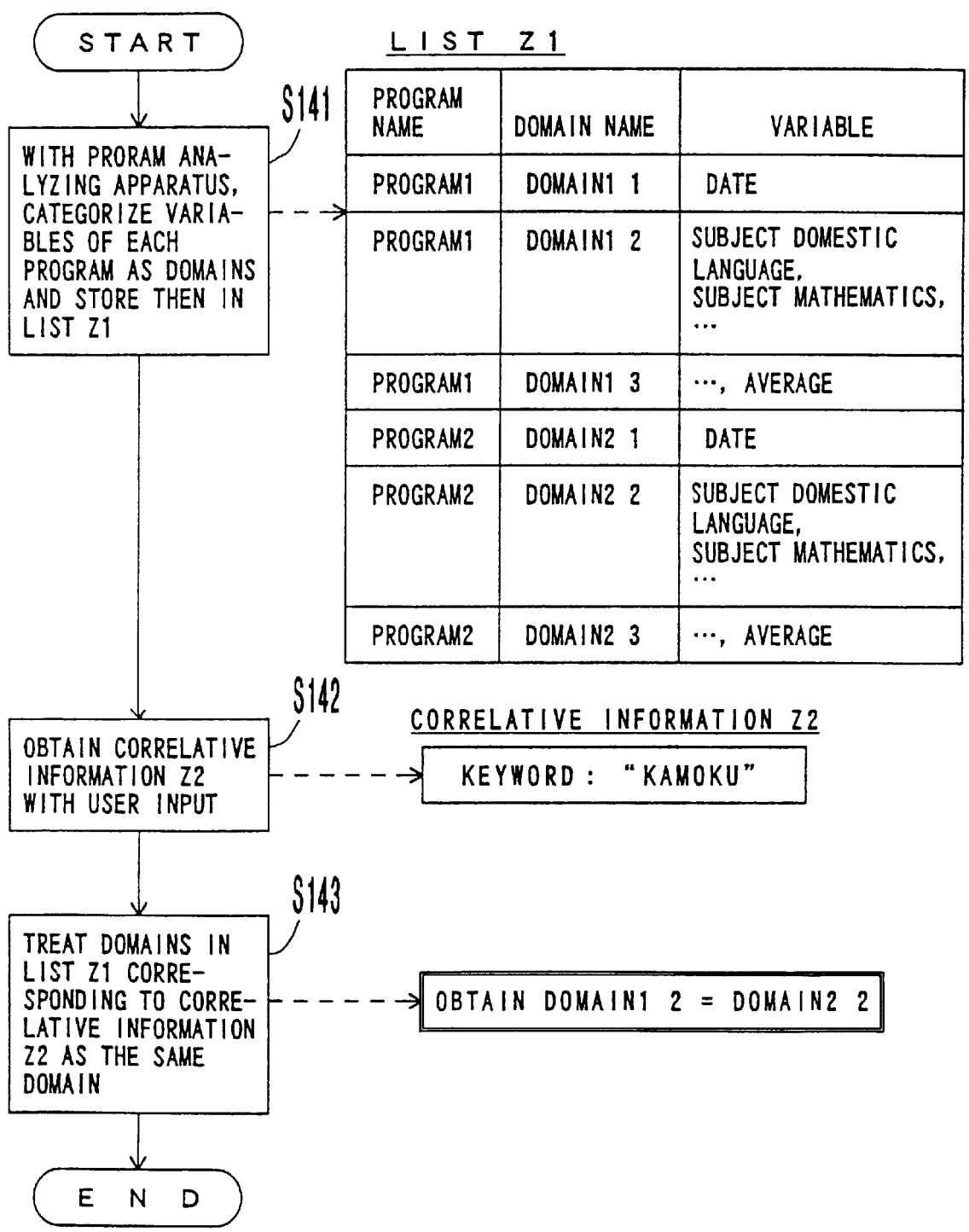
FIG. 42 is a flowchart showing a process for analyzing the relation among domains using user input information.

FIGS. 39 and 40 are schematic diagrams showing examples of COBOL programs to be analyzed. FIG. 41 is a schematic diagram showing an analyzed result of each program. FIG. 42 is a flowchart showing a process for analyzing the relation among domains with user input information.

Next, an example of a process for obtaining information about the relation among domains of a program PROGRAM1 in FILE_1 shown in FIG. 39 and a program PROGRAM2 in FILE_2 shown in FIG. 40 will be described. In this example, it is assumed that the analyzed result of each program has been obtained by the program analyzing apparatus shown in FIG. 2.

The program PROGRAM1 is a part of programs for calculating each score of three courses (domestic language, mathematics, and foreign language), total score thereof, and average thereof. The program PROGRAM2 is a part of programs for calculating each score of five courses (domestic language, mathematics, natural science, social science, and foreign language), total score thereof, and average thereof. When the user can easily understand the content of each program, he or she can estimate the concept that is commonly used in these programs. In this case, when the two programs are analyzed from view points of "date", "score of each course", and "average", the user can easily understand these programs. In this embodiment, when the user inputs such keywords as user input information, the program analyzing/displaying apparatus 2 analyzes the relation among domains of the programs corresponding to the user input information.

For example, assuming that the user inputs a keyword "SUBJECT" from a view point of "score of each course", the domain analyzing unit 21 extracts all variables with variable name including "SUBJECT" from the programs to be analyzed and treats domains to which each variable belongs as the same domain from the view point of "score of each course".

Next, with reference to a flowchart shown in FIG. 42, a process for analyzing the relation among domains with user input information will be described. At step S141, as with step S111, with the program analyzing apparatus 1, domains of each program are analyzed. The analyzed result is stored as a list Z1. FIG. 41 shows an example of the analyzed result by the program analyzing apparatus 1. As with the list X1, the list Z1 includes program names, domain names of each program, variables that belong to each domain, and so forth.

Step S142 and S143 are performed by the domain analyzing unit 21. At step S142, a keyword (correlative information) that is input by the user is stored as a list Z2. At this point, the user can issue a command for causing variables with variable name starting with "SUBJECT" to be extracted and for these variables to belong to one domain. As correlative information designated by the user, various conditions defined as naming rules of variable names, such as variable names including numeric characters in a predetermined range and variable names including particular characters, can be used.

At step S143, variables that satisfy the input correlative information Z2 are extracted from the list Z1 and the relevant domains are treated as the same domain. In this example, since domains that include "SUBJECT" are DOMAIN1_2 and DOMAIN2_2, from a view point of "SUBJECT", these two domains are treated as the same domain. In other words, the following relation is satisfied.

DOMAIN1_2=DOMAIN2_2

In such a manner, the program analyzing/displaying apparatus 2 analyzes the relation among domains of a plurality of programs with user input information.

Next, a graph displaying process performed by the display processing unit 22 shown in FIG. 3 will be described. The display processing unit 22 displays the domain relation information 27 analyzed by the domain analyzing unit 21 and information representing the update relation (assignment relation) of variables that belong to each domain on the display 28. In addition, the display processing unit 22 graphically displays the relation among domains of a plurality of programs and the update relation of variables that belong to each domain so that the user can easily understand them.

FIGS. 43A, 43B, 43C, 43D, 43E, and 43F are schematic diagrams graphically showing the relation among domains and the update relation of the variables. Next, with reference to FIGS. 43A to 43F, the displaying method will be described.

(1) Each variable is denoted by a shape such as a circle, a triangle, a square, or the like.

(2) The update relation of variables is denoted by an arrow directed from a figure representing a referred variable to a figure representing an assigned variable as shown in FIG. 43A. Alternatively, assuming that a figure representing a referred variable and a figure representing an assigned variable are disposed on the left side and right side, respectively, as shown in FIG. 43B, these figures are connected with a line.

(3) As shown in FIG. 43C, a frame that surrounds variables that belong to the same domain is displayed. In this case, in each frame, the update relation of variables that belong to a domain denoted by the frame may be displayed.

(4) As shown in FIG. 43D, the same domains are connected with a line. However, in a graphical display focused on domains, as shown in FIG. 43E, domains categorized as the same domain are connected with a line, and, the update relation of variables needs not displayed. Instead, variables that belong to the domain may be represented with variable names, simple figures, or the like. Of course, if necessary, detail information for each variable can be also displayed. In this case, information that is necessary for each variable is stored as additional items of variable information beforehand.

(5) In a graphical display focused on the update relation of variables, as shown in FIG. 43F, it is important to clearly draw a flow from a figure representing a referred variable to a figure representing an assigned variable. When a variable that belongs to a domain is the same as a variable that belongs to another domain or when a variable used in a program is the same as a variable used in another program, these variables are displayed in such a manner that the user can clearly know that they are the same. In this case, the same variables (varX and varY) are displayed by the same color or connected with a line together with a equal mark.

Figure 45:
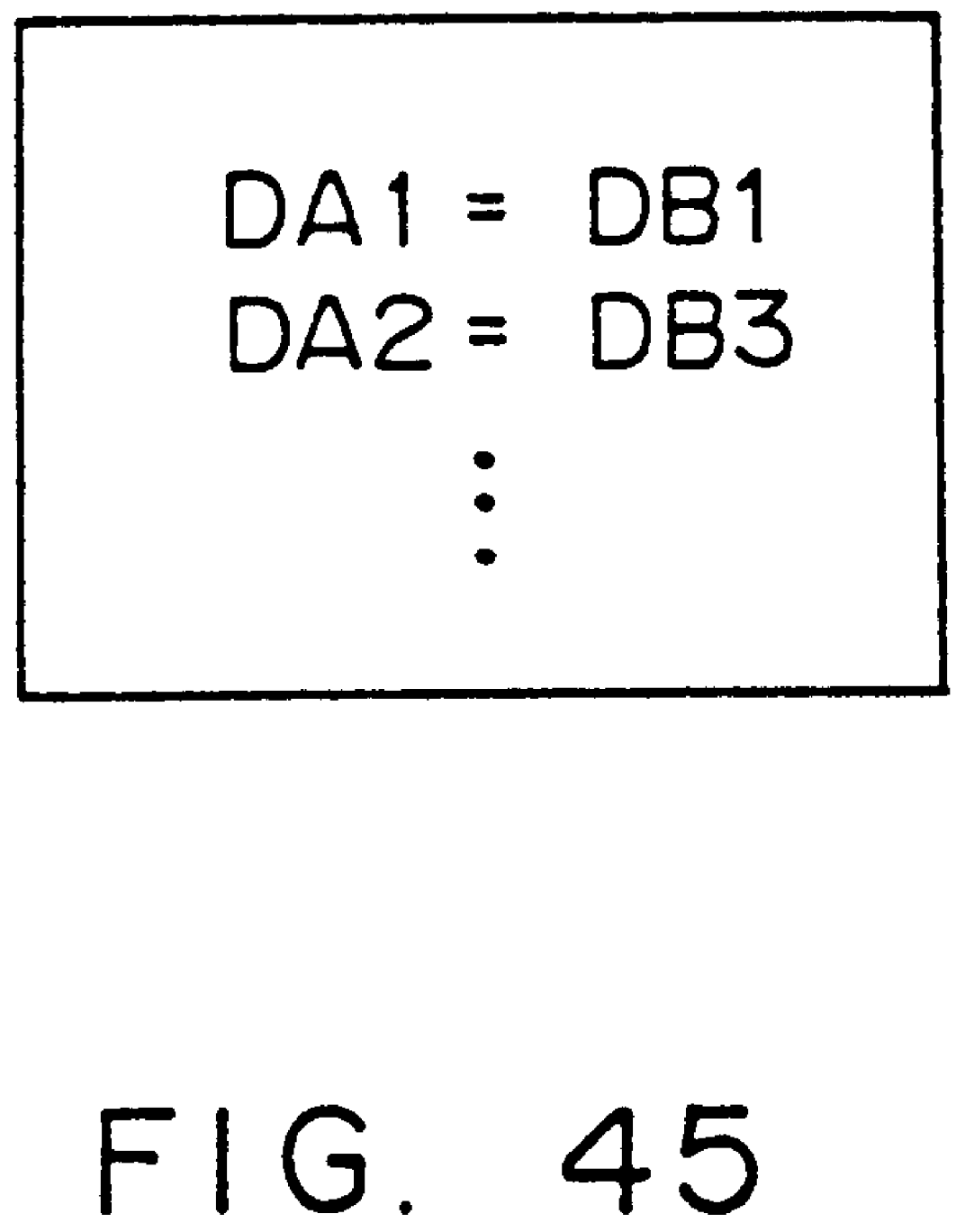

FIG. 44 is a table showing the relation between variables and information about domains. FIG. 45 is a schematic diagram showing an example of information representing the relation among domains.

The relation table shown in FIG. 44 is obtained by analyzing the COBOL programs shown in FIGS. 25 and 26 with the program analyzing apparatus 1 shown in FIG. 2. This relation table includes information about all variables and all domains of the programs. In addition, the relation table includes the line numbers of line which include the variables used in the programs and the update relation of the variables.

Corresponding to information stored in the relation table, with the domain analyzing unit 21, the relation among domains is analyzed. Thus, information representing the relation among domains as shown in FIG. 45 is obtained (namely, the domain relation information 27 shown in FIG. 3 is obtained).

Figure 46:
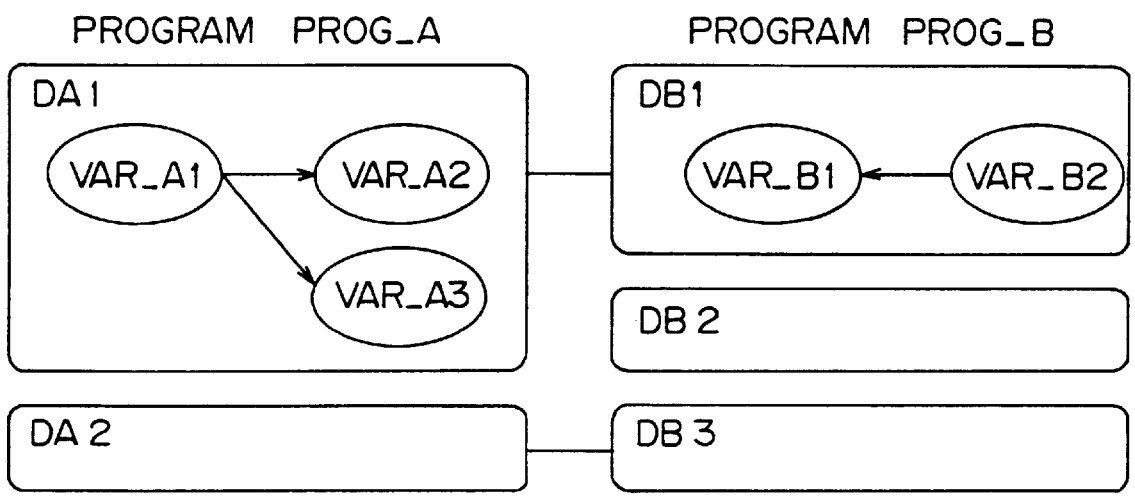
FIG. 46 is a schematic diagram graphically showing the relation among domains and the update relation among variables.

FIG. 46 is a schematic diagram showing the relation among domains in programs and the update relation of variables that belong to each domain with the information (shown in FIGS. 44 and 45) obtained by analyzing the COBOL programs shown in FIGS. 25 and 26. In FIG. 46, each ellipse represents one variable. An arrow that connects two ellipses represents the update relation of variables. A frame that surrounds a variable is a domain to which the variable belongs. Domains connected with a line represent the same domains.

In the example shown in FIG. 46, variables VAR_A1, VAR_A2, and VAR_A3 belong to the domain DA1 of the program PROG_A. Variable VAR_A1 is substituted to VAR_A2 and VAR_A3. In addition, variables VAR_B1 and VAR_B2 belong to a domain DB1 of the program PROG_B. The variable VAR_B2 is substituted to the variable VAR_BL. In addition, to allow the user to easily understand the domain relation information shown in FIG. 45, the domains DA1 and DB1 and the domains DA2 and DB3 are connected with lines.

Figure 47:
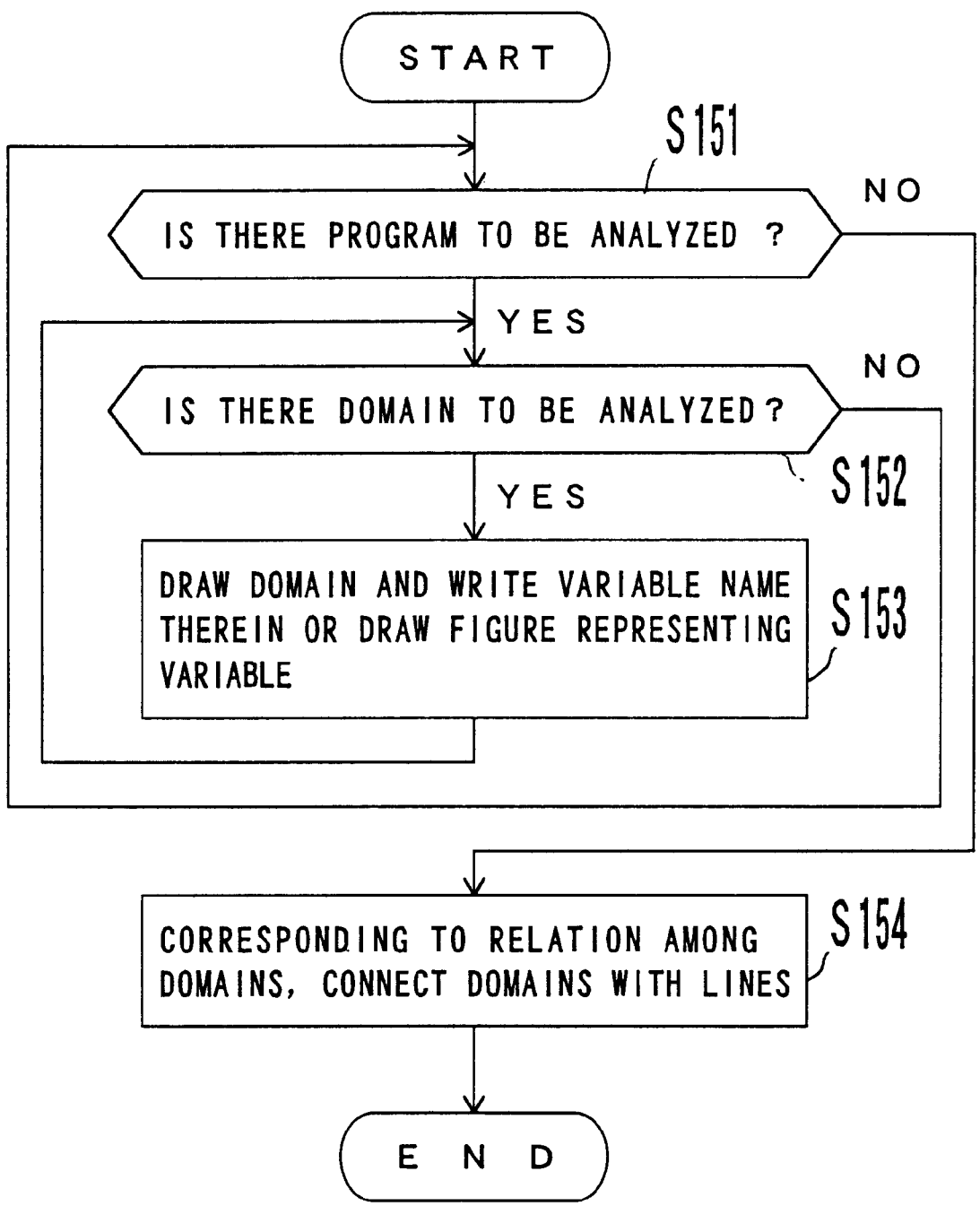
FIG. 47 is a flowchart showing a graphical displaying process from a view point of domains.

FIG. 47 is a flowchart showing a process of the display processing unit 22 focused on domains.

At step S151, with the relation table shown in FIG. 44, it is determined whether or not there is a program to be analyzed. When the determined result is Yes, one program is extracted. Thereafter, the flow advances to step S152. When all the programs have been processed, the flow advances to step S154.

At step S152, it is determined whether or not the extracted program has a domain that has not been processed. When the determined result is Yes, one domain is extracted. At step S153, a frame shape representing the domain is drawn. The variable name of a variable that belongs to the domain is written in the frame (or a figure that represents the variable is drawn). Thereafter, the flow returns to step S152. On the other hand, when the determined result at step S152 is No, the flow returns to step S151.

At step S154, with reference to the relation among domains shown in FIG. 45, the same domains are connected with lines. In this example, the domain DA1 in the program PROG_A is the same as the domain DB1 in the program PROG_B. When a plurality of domains in one program are the same (for example, although the domain names are different, the domains are a set with the same concept), these domains are connected with lines.

Figure 48:
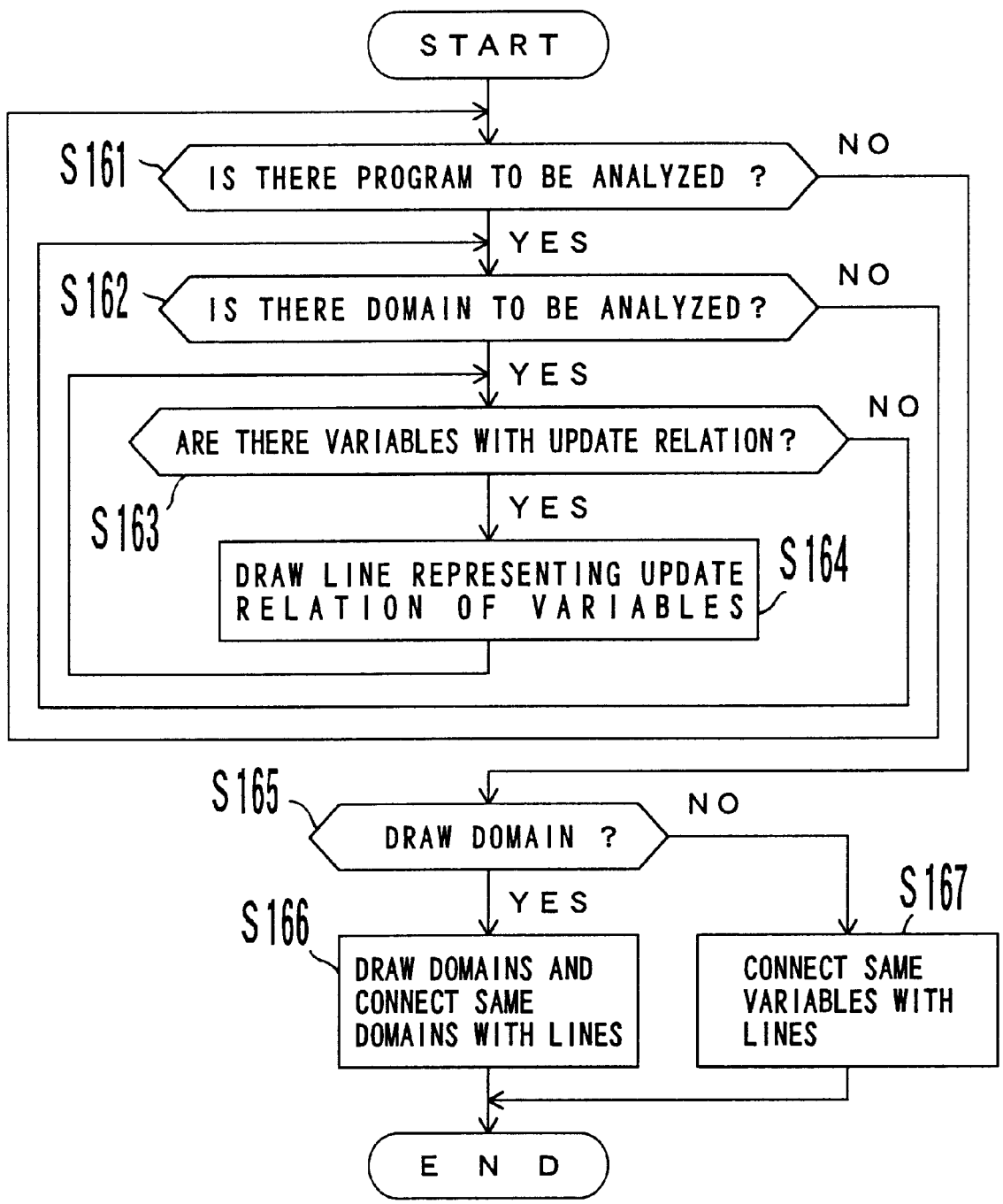
FIG. 48 is a flowchart showing a graphical displaying process from a view point of variables.

FIG. 48 is a flowchart showing a process of the display processing unit 22 focused on variables.

Step S161 and S162 are the same as steps S151 and S152 shown in FIG. 47, respectively. At steps S161 and S162, programs and domains that have not been processed are extracted from the relation table shown in FIG. 44.

At step S163, it is determined whether or not variables with the update relation belong to the domain extracted at step S162. When the determined result is Yes, the variables are extracted, and at step S164, "update relation" is drawn. In other words, an arrow is drawn from a referred variable to an assigned variable. Thereafter, the flow returns to step S163. At step S163, it is determined whether or not there are variables with the update relation. When the determined result at step S163 is No, the flow returns to step S162.

At step S161, when the determined result is No, the flow advances to step S165. At step S165, it is determined whether domains or variables are to be drawn. It is assumed that the user has assigned domains or variables to be drawn. When domains are to be drawn, the flow advances to step S166. At step S166, domains extracted at step S162 are drawn. The same domains are connected with lines.

When variables are to be drawn, at step S167, the same variables are connected with lines. For example, when variables varX and varY are the same, at step S167, as shown in the right portion of FIG. 43F, figures that represent the variables varx and varY are connected with an "=(equals)" character.

Next, a process for displaying a particular portion of a source code corresponding to a user's command will be described. This process is controlled by the display processing unit 22 shown in FIG. 3.

Figure 49:
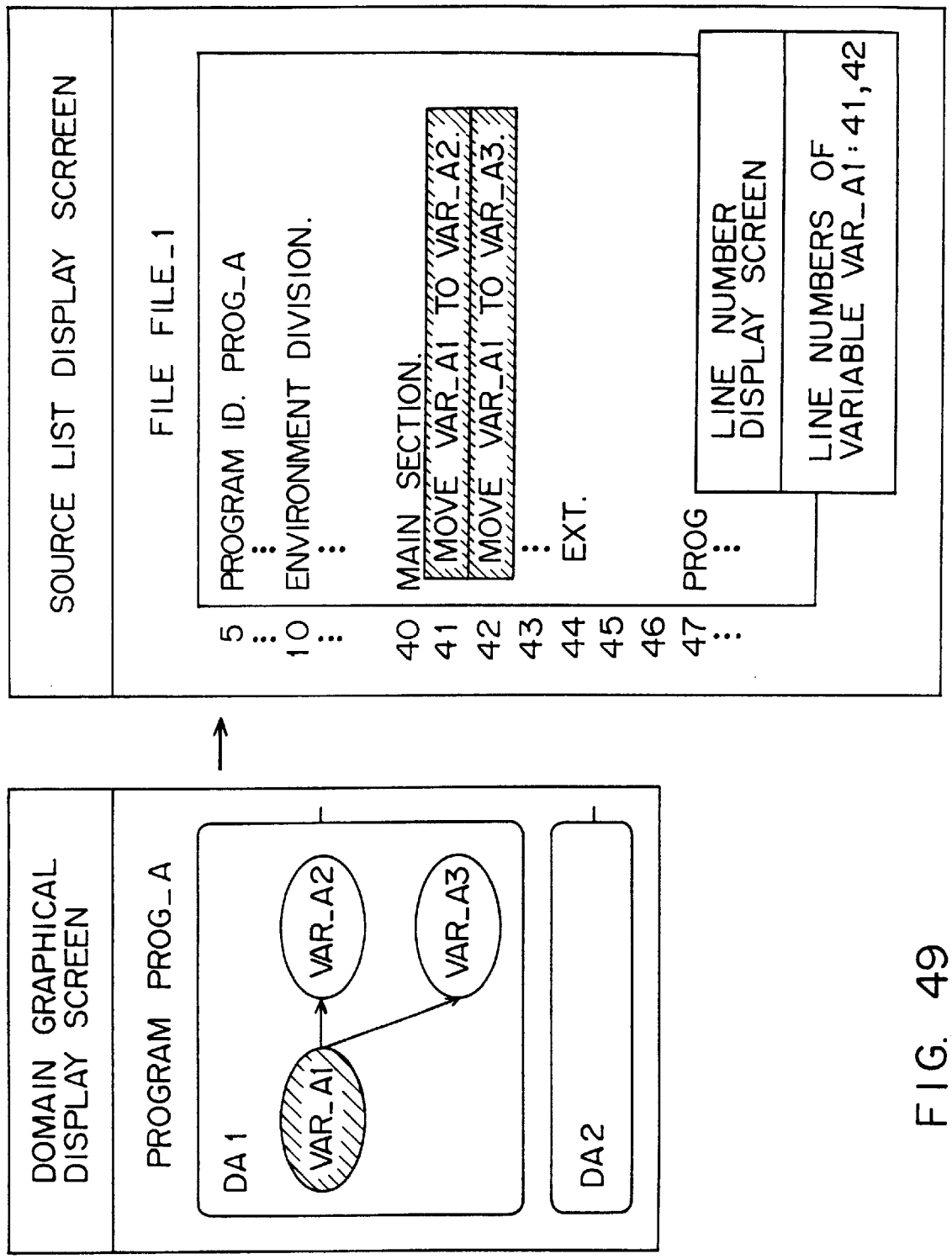
FIG. 49 is a schematic diagram showing an example in which source codes and line numbers are displayed.

FIG. 49 is a schematic diagram showing a display example of source codes and line numbers. In the display screen shown in FIG. 46, it is assumed that the user has obtained information about variable VAR_A1. In this case, the user selects, for example, a figure that represents the variable VAR_A1 on the display screen with a pointing device such as a mouse.

When the display processing unit 22 recognizes the selecting operation, it references the relation table shown in FIG. 44, and displays a source code of the program in which the selected variable VAR_A1 exists on the display 28. At this point, when the display processing unit 22 recognizes the position of the variable VAR_A1, it displays the source code of the program along with the position thereof. In addition, the display processing unit 22 highlights the position of the variable VAR_A1. Alternatively, the display processing unit 22 displays a list of the line numbers of the variable VAR_A1 in the source code as with the line number display screen shown in FIG. 49. If necessary, both the source code and the line numbers of the relevant variable may be displayed.

Thus, since the user can easily know the position of a desired variable in the source code, he or she can easily debug variables.

Figure 50:
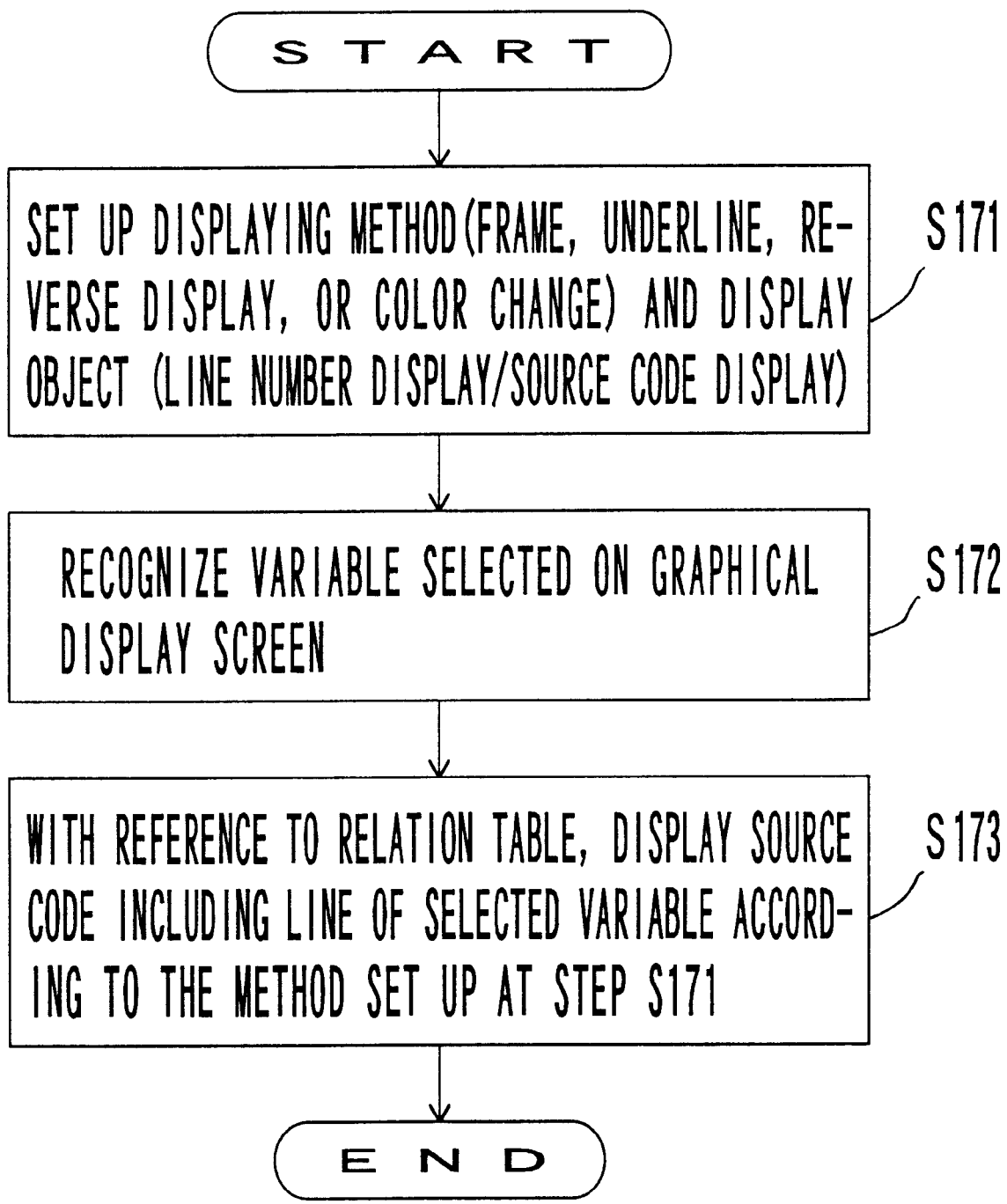
FIG. 50 is a flowchart showing a source code displaying process.

FIG. 50 is a flowchart showing a source code displaying process performed by the display processing unit 22.

At step S171, with environmental setup information that is input by the user or that has been predetermined, as a highlight displaying method, a frame, an underline, a reverse display, a color change, or the like can be used. To display the position of a designated variable, the user can select a source code display mode or a line number display mode.

At step S172, a variable designated by the user on the graphical display screen is recognized. At step S173, with reference to the relation table shown in FIG. 44, a source code that includes the line of the selected variable is displayed corresponding to the setup information selected at step S171. Alternatively, the line number of the selected variable is displayed.

In the above-described example, the user selects a variable on the display screen shown in FIG. 46. However, when the user selects a domain, substantially the same process is performed. In other words, when the user selects a domain DA1 on the display screen, the display processing unit 22 recognizes that variables that belong to the domain DA1 are variables VAR_A1, VAR_A2, and VAR_A3 and highlights the positions of these variables.

Unlike with the source code displaying process shown in FIG. 49, when a user designates a variable or a domain on the source list display screen the display processing unit 22 can highlight the variable or the domain designated by the user on a domain graphical display screen.

FIG. 51 is a schematic diagram showing an example of a graphical highlight display. The example of the displaying process in FIG. 51 shows the case that while a source code of a program is being displayed, the user clicks a line number 86 with the mouse. In this case, a variable and a domain to which the variable belongs are highlighted. In other words, the display processing unit 22 references the relation table shown in FIG. 44 and recognizes that the statement of line 86 includes the variables VAR_B1 and VAR_B2. When the display processing unit 22 recognizes that these variables belong to the domain DB1, it highlights ellipses that represent the variables and a frame that represents the domain.

Figure 52:
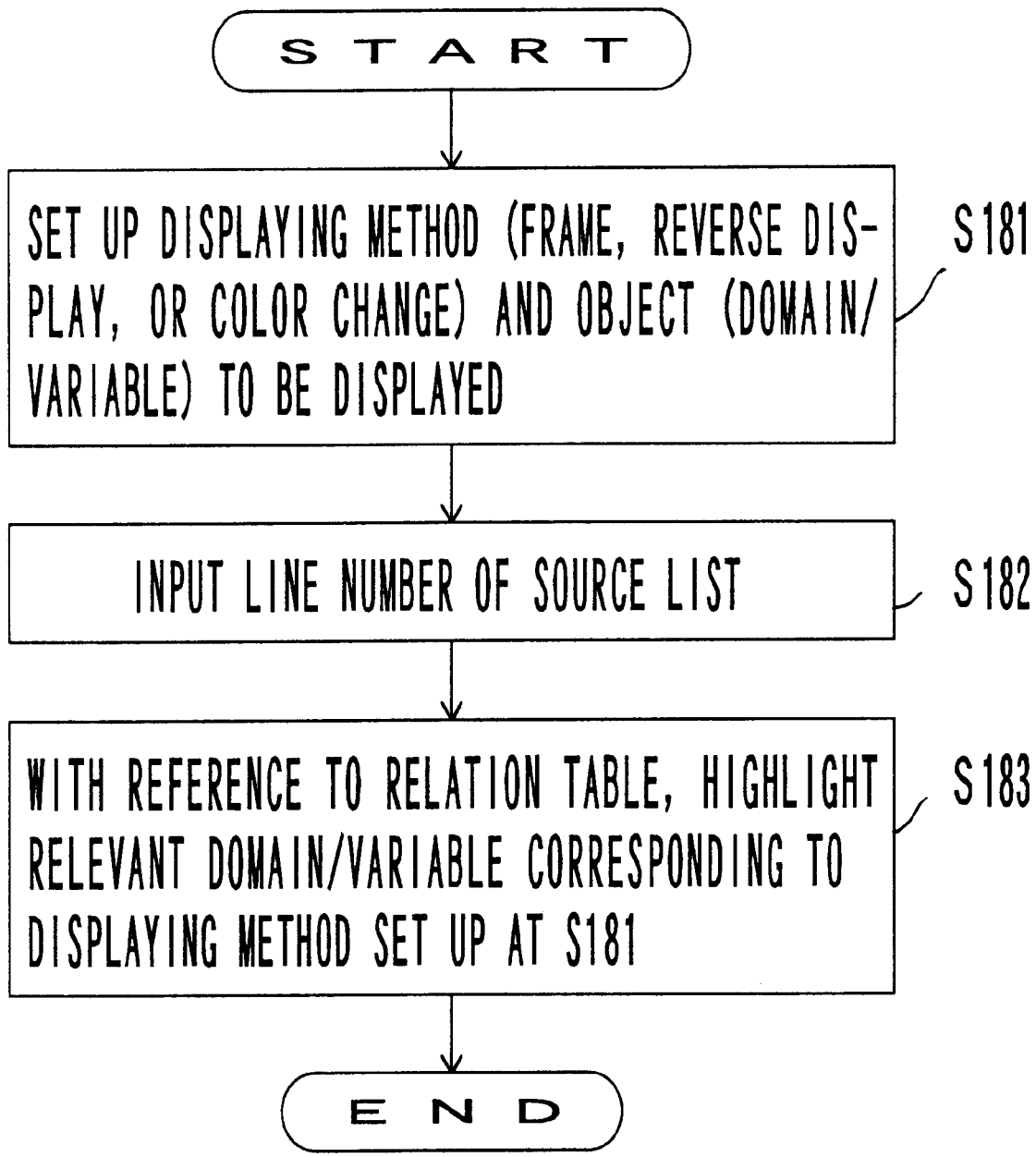
FIG. 52 is a flowchart showing a domain/variable highlight displaying process.

FIG. 52 is a flowchart for explaining the displaying process shown in FIG. 51. Each step of the flowchart is executed by the display processing unit 22.

At step S181, as a highlight displaying method, a frame, underline, reverse display, or color change is set up corresponding to user input or predetermined environmental setup information. As a highlight displaying mode, only-domain displaying mode, only-variable displaying mode, or both-domain-and-variable displaying mode is selected.

At step S182, the line number of a line selected by the user on the source list display screen with an editor or the like is recognized. At step S183, with reference to the relation table shown in FIG. 44, a domain or a variable in the selected line number is highlighted corresponding to the displaying method that has been set up at step S181.

With such a display, while seeing a source code, the user can easily know the update relation of a particular variable and a domain to which the variable belongs.

Next, the process of the domain element information processing unit 23 that outputs the relation among domain elements shown in FIG. 3 will be described. This process is effective when variables corresponding to a particular variable are extracted from all programs to be analyzed. In reality, when variables used in programs to be analyzed are hierarchically structured and variables "YEAR", "MONTH", and "DAY" are defined as lower hierarchical variables of a variable "YEAR/MONTH/DAY", the domain element information processing unit 23 automatically extracts, for example, all variables corresponding to the variable "YEAR" with relation information of a domain to which the higher hierarchical variable "YEAR/MONTH/DAY" belongs.

FIG. 53 is a flowchart showing a process for outputting the relation information among domain elements. In this example, with the COBOL programs shown in FIGS. 25 and 26, the process will be described. In addition, it is assumed that the relation table shown in FIG. 44 has been created.

At step S191, a variable (domain element) designated by the user or a domain to which a parent variable of the designated variable belongs is obtained. For example, in the program shown in FIG. 25, when a variable VAR_A13 is designated, since a parent variable of the variable VAR_A13 is a variable VAR_A1, with reference to the relation table shown in FIG. 44, a domain DA1 is obtained as a domain to which the variable VAR_A13 belongs.

At step S192, it is determined whether or not there is a domain to which the designated variable belongs. Step S192 is provided because all variables do not always belong to a particular domain. When the determined result is Yes, the flow advances to step S193. When the determined result is No, the flow advances to step S194. In this example, since the domain D1 is present, the process at step S193 is executed.

At step S193, other variables that belong to the domain obtained at step S191 are extracted. Among the extracted variables, the same variable as the variable designated by the user is obtained. In this case, the domain element information processing unit 23 interprets the data declarative of the source program shown in FIG. 25 and obtains the length of the designated variable (namely, the variable VAR_A13) and the relative address thereof with respect to the parent variable. The length of the variable VAR_A13 is "1". In addition, since the length of each of the variables VAR_A11 and VAR_A12 is "1", the relative address of the variable VAR_A13 with respect to the parent variable VAR_A1 is "3".

Next, with reference to the domain relation information shown in FIG. 45, the domain element information processing unit 23 extracts variables that belong to the domain DA1. In this example, although variables VAR_A2 and VAR_A3 are extracted, only the case in which the variable VAR_A2 is extracted is described. The domain element information processing unit 23 extracts variables whose length is "1" and whose relative address with respect to the variable VAR_A2 is "3" as the variable the same as the variable VAR_A13 from low hierarchical variables of the variable VAR_A2. When no variable satisfies such conditions, the position and length of the variable are displayed in such a manner that the user can easily understand them. For example, in this example, "VAR_A2 (3, 1)" is displayed.

At step S194, with reference to the domain relation information shown in FIG. 45, it is determined whether or not there are domains that are the same as the domain obtained at step S191. When the determined result is Yes, the flow advances to step S195. When the determined result is No, the flow advances to step S196. In this example, since there is a domain (domain DB1) that is the same as the domain DA1, the process at step S195 is executed.

At step S195, a variable (domain element) corresponding to a designated variable in the domain obtained at step S194 is obtained. In this example, a variable VAR_B1 as a variable that is the same as a variable VAR_A1 that belongs to the domain DB1 is extracted. In addition, a variable VAR_B12 as a variable that is the same as a variable VAR_A13 of lower hierarchical variables of the variable VAR_B1 is obtained. In this process, the "length" and "relative address" of each variable defined in the data declarative of the source program are considered.

Thereafter, the flow returns to step S194. At step S194, the process for all domains that are the same as the domain obtained at step S191 is executed.

At step S196, the relation of variables (domain elements) obtained at steps S193 and S195 is displayed. In this example, as shown in FIG. 53, the variables VAR_A13 and VAR_B12 are displayed as the same variables.

In this case, the variables VAR_A13 and VAR_B12 belong to the same concept. In other words, these two variables structure a pseudo domain. For example, assuming that the variable VAR_A1 is "ORDERED_DATE (YEAR/MONTH/DAY)", the variable VAR_B1 is "DELIVERED_DATE (YEAR/MONTH/DAY)", the variable VAR_A11 is "ORDERED_DAY", the variable VAR_A12 is "ORDERED_MONTH", the variable VAR_A13 is "ORDERED_YEAR", the variable VAR_B11 is "DELIVERED_MONTH and DAY", and the variable VAR_B12 is "DELIVERED_YEAR", "ORDERED_YEAR" and "DELIVERED_YEAR" belong to the same domain. In other words, the "ORDERED_YEAR" and "DELIVERED_YEAR" are categorized as the concept of "YEAR". In this case, programs can be easily modified against the problem of "the year 2000".

The program analyzing/displaying apparatus 2 shown in FIG. 3 can analyze and display not only the identical relation of variables, but the implicative relation (hierarchical relation) of variables using domain category information. For example, the variables VAR_A11 to VAR_A13 can be analyzed and displayed as lower hierarchical variables of the variable VAR_A1.

Even if a particular variable does not belong to a concept in common with another variable in individual programs, in a system that operates in association with a plurality of programs, the particular variable may be categorized as a concept in common with a variable used in another program. In this case, a structure in which the program analyzing apparatus 1 generates a domain to which only the above-described variable belongs and assigns a domain ID to the domain, may be used. Alternatively, if necessary, the program analyzing/displaying apparatus 2 may assign a domain ID to a unique variable in each program. For example, in a plurality of programs, external variable names with the same name can be treated as the same domain. This applies to variables with the same database schema name.

To allow the user to understand a program he or she is developing or correcting, the above-described domain definition is effective. However, in a conventional program, domain definition information may not have been defined. Alternatively, even if domain definition information has been created, since it has been created by a program designer, it may not be correct.

However, according to the program analyzing apparatus of the present invention, a conventional program without domain definition information is analyzed and domain definition information can be automatically extracted therefrom. The extracted domain definition information is accurate and thereby the user can understand the program therewith.

For example, when the number of digits of variables that represent "YEAR" is changed from two to four, the variables that represent "YEAR" can be easily extracted from the program. In other words, when a conventional program is debugged, maintained, or modified, since information in which variables with various names (such as "ORDERED_YEAR", "DELIVERED_YEAR", and "SCHEDULED_DELIVERY_YEAR") are categorized corresponding to restricting conditions is used, the user can quickly and easily create and understand a program.

In addition, a large-scale program is composed of a plurality of programs corresponding to the content of the process. In most cases, since individual programs are created by different people, even if program creating rules (such as naming rules of variables) are used, it is difficult for the user to know the flow of the overall process of the program.

However, according to the program analyzing/displaying apparatus of the present invention, the relation of variables represented by different character strings in a plurality of programs is analyzed. In other words, a variable group with the same relation in a plurality of programs is automatically extracted and the analyzed result is graphically displayed. Thus, the user can easily understand the flow of a sequence of processes composed of many programs.

In addition, since the user can easily understand the position of a particular variable in the source list (source code) or a variable that has a particular relation with a variable in the source list, the program analyzing/displaying apparatus is effective as a technology for helping the user to understand a program.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A program analyzing apparatus comprising:
   an error determination condition extractor recognizing an error process portion of a program and extracting a condition which causes the error process to be executed; and
   a conditional expression/restricting condition converter analyzing an output of said error determination condition extractor and obtaining restricting conditions of variables used in the program.

2. The program analyzing apparatus, as set forth in claim 1, further comprising:
   a categorizer categorizing the variables used in the program corresponding to the restricting conditions.

3. A program analyzing apparatus comprising:
   an error determination condition extractor recognizing an error process portion of a program and extracting a condition which causes the error process to be executed;
   a conditional expression/restricting condition converter analyzing an output of said error determination condition extractor and obtaining restricting conditions of variables used in the program;
   a variable categorizer analyzing the relation of a plurality of variables in an executable statement of the program based on a type of the executable statement or a type of an operand and categorizing the variables based on domains of the variables; and
   a domain definition extractor outputting a restricting condition of each domain and variables that belong to each domain as domain definition information based on outputs of said variable categorizer and said conditional expression/restricting condition converter.

4. An apparatus for analyzing relations among domains, comprising:
   a categorizer that categorizes variables, used in a plurality of programs, into domains;
   an interpreter interpreting a job control language describing an execution procedure of the plurality of programs and obtaining physical file names corresponding to logical file names defined for each of the plurality of programs;
   an extractor extracting variables from files having the same physical file name; and
   a domain analyzer analyzing relations among the domains of the plurality of programs according to the domains for each of the programs and an output of said extractor.

5. An apparatus for analyzing relations among domains in a first and a second program, the second program being called by the first program, comprising:
   a categorizer categorizing variables used in the first and second programs into domains;
   a first detector detecting call relation information for calling the second program from the first program;
   a second detector detecting a first variable in the first program and a related second variable in the second program according to the call relation information; and
   a domain analyzer analyzing the relation among domains of the programs according to the domains for each of the programs and the first and second variables.

6. An apparatus for analyzing the relation among domains, which defines a range of permissible values for variables, comprising:
   a categorizer categorizing variables used in a first program into domains and categorizing variables used in a second program into domains;
   a recognizer recognizing an input keyword;
   a detector detecting variables which include the keyword among variables used in the first and second program; and
   a domain analyzer analyzing the relation among domains according to the detected variables, and categorizing domains to which the variables detected by said detectorbelong into one domain.

7. An apparatus for analyzing the relation among domains, which defines a range of permissible values for variables, comprising:
   an analyzer analyzing domains to which variables used in a plurality of programs belong;
   a checker checking for an identical relation among domains in the programs;
   an extractor extracting a variable corresponding to a first variable belonging to a first domain in a first program from a second domain in a second program when the first domain in the first program is the same as the second domain in the second program; and
   an output outputting information representing that the first variable is the same as the variable extracted by said extractor.

8. An apparatus for displaying an analyzed result of a plurality of programs, comprising:
   a categorizer categorizing variables used in a first program into domains and categorizing variables used in a second program into domains;
   a domain display unit displaying domains, each of which defines a range of permissible values for variables, in the programs using figures of predetermined shapes;
   a detector detecting the relationships among the displayed domains; and
   a domain relation display unit graphically displaying the detected relationships among the domains.

9. The apparatus as set forth in claim 8, further comprising:
   a variable display unit displaying variables that belong to the domains in the figures that represent the domains.

10. The apparatus as set forth in claim 9, further comprising:

a storage storing the update relation among variables used in the programs, wherein said variable display unit graphically displays the update relation among the variables stored in said storage.

11. The apparatus as set forth in claim 9, further comprising:

a storage storing information that represents the positions of statements or expressions in the programs that include the variables; and a display processor referencing information stored in said storage and displaying at least part of a source program having a statement or an expression that includes a selected one of the variables being displayed.

12. The apparatus as set forth in claim 9, further comprising:

a storage storing information that represents the positions of statements or expressions in the programs that include variables; and a display processor referencing information stored in said storage and displaying information about the position of a statement or an expression in a program that includes a selected one of the variables being displayed.

13. The apparatus as set forth in claim 9, further comprising:

a storage storing information that represents the positions of statements or expressions in the programs that include variables; and a display processor referencing information stored in said storage and displaying at least part of a source program having a statement or an expression that includes a variable that belongs to a selected one of the domains being displayed.

14. The apparatus as set forth in claim 9, further comprising:

a storage storing information that represents the positions of statements or expressions in the programs that include variables; and a display processor referencing information stored in said storage and displaying information about the position of a statement or an expression in a program that includes a variable that belongs to a selected one of domains being displayed.

15. The apparatus as set forth in claim 9, further comprising:

a storage storing information that represents the positions of statements or expressions in the programs that include variables;

a source code displaying unit displaying a source code of a program; and a display processor highlighting a variable in a designated statement or a designated variable in the source code of the displayed program.

16. The apparatus as set forth in claim 15, wherein said display processor highlights a figure that represents a domain to which the variable belongs.

17. The apparatus as set forth in claim 9, further comprising:

an extractor extracting a variable corresponding to a designated variable from variables that belong to a domain that is the same as a domain to which the designated variable belongs; and a display processor displaying the variable extracted by said extractor.

18. A program analyzing method for analyzing a program for information about variables used in the program, comprising the steps of:

recognizing an error processing portion of the program to be analyzed;

extracting a condition in which the error process is executed;

analyzing the extracted condition and obtaining restricting conditions of the variable used in the program to be analyzed; and categorizing the variables corresponding to the restriction conditions.

19. A computer readable storage medium storing a program causing a computer to perform the following actions:

recognizing an error process portion of a program;

extracting a condition in which the error process portion is executed;

analyzing the extracted condition and obtaining restricting conditions of variables used in the program; and categorizing the variables corresponding to the restricting conditions.

20. A program analyzing apparatus, comprising:

an analyzer analyzing the relation of a plurality of variables in an executable statement with an assignment operation of a program based on the assignment operation; and a variable categorizer categorizing the plurality of variables used in the analyzed assignment operation into one domain based on the analysis performed by said analyzer.

21. A program analyzing apparatus, comprising:

an analyzer analyzing the relation of a plurality of variables in an executable statement with a comparison operation of a program based on the comparison operation; and a variable categorizer categorizing the plurality of variables used in the analyzed comparison operation into one domain based on the analysis performed by said analyzer.

* * * * *